US012812641B2

(12) United States Patent
Bae et al.

(10) Patent No.: US 12,812,641 B2
(45) Date of Patent: Nov. 24, 2026

(54) SEMI-PERSISTENT CONFIGURATIONS ENHANCEMENTS

(71) Applicant: Samsung Electronics Co., Ltd., Suwon-si (KR)

(72) Inventors: Jung Hyun Bae, San Diego, CA (US); Mohammed Karmoose, San Diego, CA (US); Hamid Saber, San Diego, CA (US); Mohamed Awadin, San Diego, CA (US); Philippe Sartori, Naperville, IL (US)

(73) Assignee: SAMSUNG ELECTRONICS CO., LTD. (KR)

( * ) Notice: Subject to any disclaimer, the term of this patent is extended or adjusted under 35 U.S.C. 154(b) by 612 days.

(21) Appl. No.: 17/887,405

(22) Filed: Aug. 12, 2022

(65) Prior Publication Data

US 2023/0092206 A1 Mar. 23, 2023

Related U.S. Application Data

(60) Provisional application No. 63/331,703, filed on Apr. 15, 2022, provisional application No. 63/327,790, (Continued)

(51) Int. Cl.
*H04W 72/12* (2023.01)
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
CPC ............. H04W 72/1273; H04W 72/23; H04W 72/232; H04W 72/0446; H04W 72/11; H04W 72/21
See application file for complete search history.

(56) References Cited

U.S. PATENT DOCUMENTS

| | | | |
|---|---|---|---|
| 9,510,335 | B2 | 11/2016 | Ko et al. |
| 10,057,916 | B2 | 8/2018 | Barabell et al. |

(Continued)

FOREIGN PATENT DOCUMENTS

| | | | |
|---|---|---|---|
| CN | 112822782 | A | 5/2021 |
| TW | 201935955 | A | 9/2019 |
| WO | 2021198988 | A1 | 10/2021 |

*Primary Examiner* — Hoang-Chuong Q Vu

(74) *Attorney, Agent, or Firm* — Renaissance IP Law Group LLP

(57) ABSTRACT

A system and a method are disclosed for providing enhancements to Semi-Persistent Scheduling (SPS) to match traffic, while also providing power savings, resource utilization and HARQ enhancements related to traffic and SPS configurations. A SPS configuration may include one or more occasions in a Physical Downlink Shared Channel (PDSCH) of a wireless network for traffic for a wireless device. In response to the SPS configuration, the wireless device receives the traffic in the scheduled occasions. The SPS configuration may include one or more occasions in at least one time slot in a SPS period. At least one occasion may align with a target periodicity of the traffic. The SPS configuration may include different configuration states, and a Downlink Control Information (DCI) message may be used to indicate to a wireless device which SPS configuration state to use to receive the traffic.

15 Claims, 23 Drawing Sheets

Related U.S. Application Data filed on Apr. 5, 2022, provisional application No. 63/315,972, filed on Mar. 2, 2022, provisional application No. 63/291,312, filed on Dec. 17, 2021, provisional application No. 63/242,016, filed on Sep. 8, 2021.

(56) References Cited

U.S. PATENT DOCUMENTS

| | | | | |
|---|---|---|---|---|
| 10,516,514 | B2 | 12/2019 | Park et al. | |
| 10,624,118 | B2 | 4/2020 | Park et al. | |
| 10,708,088 | B2 | 7/2020 | Park et al. | |
| 10,958,321 | B2 | 3/2021 | Park et al. | |
| 10,979,186 | B2 | 4/2021 | Park et al. | |
| 11,153,900 | B2 | 10/2021 | Kim et al. | |
| 12,185,325 | B2 * | 12/2024 | Zewail | H04L 5/0048 |
| 2020/0044712 | A1 * | 2/2020 | Manolakos | H04L 5/005 |
| 2020/0084759 | A1 * | 3/2020 | Liu | H04L 1/1671 |
| 2020/0154364 | A1 | 5/2020 | Rahman et al. | |
| 2021/0185706 | A1 | 6/2021 | Park et al. | |
| 2021/0289525 | A1 | 9/2021 | Khoshnevisan et al. | |
| 2021/0336664 | A1 | 10/2021 | Yang et al. | |
| 2021/0377986 | A1 * | 12/2021 | Awoniyi-Oteri | H04L 1/1812 |
| 2022/0039122 | A1 | 2/2022 | Park et al. | |
| 2022/0045813 | A1 | 2/2022 | Karmoose et al. | |
| 2022/0046678 | A1 * | 2/2022 | Yang | H04W 72/1273 |
| 2022/0061048 | A1 * | 2/2022 | Yang | H04W 72/23 |
| 2022/0094484 | A1 * | 3/2022 | Babaei | H04W 72/1263 |
| 2022/0095333 | A1 | 3/2022 | Takeda et al. | |
| 2022/0095360 | A1 * | 3/2022 | Kim | H04W 72/23 |
| 2022/0116178 | A1 | 4/2022 | Go et al. | |
| 2022/0124741 | A1 * | 4/2022 | Elshafie | H04L 5/0094 |
| 2022/0256564 | A1 * | 8/2022 | Pocovi | H04W 80/02 |
| 2022/0264614 | A1 * | 8/2022 | Yu | H04L 1/1825 |
| 2022/0272738 | A1 * | 8/2022 | Liu | H04L 1/1812 |
| 2023/0008854 | A1 * | 1/2023 | Lee | H04W 76/28 |
| 2023/0027895 | A1 * | 1/2023 | Lin | H04W 72/232 |
| 2024/0195536 | A1 * | 6/2024 | Kittichokechai | H04W 72/11 |
| 2024/0298318 | A1 * | 9/2024 | Andersson | H04W 72/1273 |
| 2024/0306189 | A1 * | 9/2024 | Wang | H04W 72/23 |
| 2024/0333656 | A1 * | 10/2024 | Wang | H04W 72/11 |
| 2024/0349266 | A1 * | 10/2024 | Zhang | H04L 1/1887 |
| 2024/0381373 | A1 * | 11/2024 | Bagheri | H04L 5/0055 |
| 2025/0038893 | A1 * | 1/2025 | Kim | H04L 1/1854 |
| 2025/0126614 | A1 * | 4/2025 | Pradas | H04W 72/115 |

* cited by examiner

SEMI-PERSISTENT CONFIGURATIONS ENHANCEMENTS

CROSS-REFERENCE TO RELATED APPLICATIONS

This application claims the priority benefit under 35 U.S.C. § 119(e) of U.S. Provisional Patent Application No. 63/242,016, filed on Sep. 8, 2021, U.S. Provisional Application No. 63/291,312, filed on Dec. 17, 2021, U.S. Provisional Patent Application No. 63/315,972, filed on Mar. 2, 2022, U.S. Provisional Patent Application No. 63/327,790, filed on Apr. 5, 2022, U.S. Provisional Patent Application No. 63/331,703, filed on Apr. 15, 2022, and the disclosures of which are incorporated herein by reference in their entirety.

TECHNICAL FIELD

The subject matter disclosed herein generally relates to wireless communication systems. More specifically, the subject matter disclosed herein relates to enhancements to Semi-Persistent Scheduling (SPS) to match XR traffic, which include power savings and/or resource utilization when delivering XR traffic, and Hybrid Automatic Repeat Request (HARQ) enhancements related to XR traffic and SPS configurations.

BACKGROUND

In the 3rd Generation Partnership Project (3GPP) standard for New Radio (NR), a User Equipment (UE) may be designed to receive different downlink (DL) signals from a base station (gNB). In NR, a UE receives a DL transmission to retrieve a variety of information from the gNB. In particular, the UE receives user data from the gNB in a particular configuration of time and frequency resources known as the Physical Downlink Shared Channel (PDSCH). Specifically, the Multiple Access (MAC) layer provides user data that are intended to be delivered to the corresponding layer at the UE side. The Physical (PHY) layer of the UE takes the physical signal received on the PDSCH as an input to the PDCSH processing chain, the output of which is input to the MAC layer. Similarly, the UE receives control data from the gNB in what is referred to as the Physical Downlink Control Channel (PDCCH). The control data is referred to as the Downlink Control Information (DCI) and is converted into the PDCCH signal through a PDCCH processing chain on the gNB side. Conversely, a UE sends uplink (UL) signals to convey user data or control information, respectively referred to as Physical Uplink Shared Channel (PUSCH) and Physical Uplink Control Channel (PUCCH). Specifically, the PUSCH is used by the UE MAC layer to deliver data to the gNB. Additionally, the PUCCH is used to convey control data referred to as the Uplink Control Information (UCI), which is converted to the PUCCH signal through a PUCCH processing chain at the UE side.

A UE may be scheduled a PUSCH transmission (possibly with repetition) by a Dynamic Grant (DG), a Configured Grant Type 1 (CG1) or a Configured Grant Type 2 (CG2). In addition, a PUSCH may be scheduled for transmission with repetition. There are two repetition mechanisms for PUSCH transmission in Rel-16. In a Type A repetition, the UE is scheduled with a set of K repetitions, and the UE attempts to transmit K PUSCH transmissions in K consecutive slots. If one of the K slots is not available for UL transmission, the transmission is dropped. In a Type B repetition, the UE is scheduled with a set of K nominal repetitions. The UE determines a set of K actual PUSCH transmission occasions that may not be in different slots. If one of the K slots is not available for UL transmission, the transmission is dropped.

Additionally, a UE may be scheduled a PDSCH transmission (possibly with repetition) by a Dynamic Grant (DG) or a Semi-Persistent Scheduling (SPS) PDSCH. Additionally, a PDSCH may be scheduled for transmission with repetition. Rel-16 allows the scheduling of PDSCH with Type A repetitions. Namely, in a Type A repetition, the UE is scheduled with a set of K repetitions, and the UE may attempt to receive K PDSCH transmissions in K consecutive slots. If one of the K slots is not available for DL transmission, the transmission is dropped.

SUMMARY

An example embodiment provides a method for receiving traffic in a wireless network in which the method may include: receiving, by a wireless device in the wireless network, a SPS configuration for one or more occasions in a PDSCH of the wireless network for traffic for the wireless device; and receiving, by the wireless device, the traffic in the one or more occasions. In one embodiment, the SPS configuration may include one or more occasions in at least one time slot in a SPS period. In another embodiment, the SPS configuration may include at least one occasion that aligns with a target periodicity of the traffic. In still another embodiment, the traffic may include one or more packets of traffic in which each packet may include a same packet size, or a packet size that is different from another packet. In yet another embodiment, the SPS configuration may include a plurality of different configuration states, and the method may further include receiving, by the wireless device, a DCI message that indicates to the wireless device which SPS configuration state to use to receive the traffic. In one embodiment, the wireless device receives the DCI message a predetermined period of time prior to receiving the traffic that may be within a delay limit of the traffic. In another embodiment, the SPS configuration may be a configuration for each slot of a plurality of slots of a SPS period, and the method may further include receiving, by the wireless device, a DCI message that indicates one or more occasions in at least one slot for the wireless device to receive traffic. In still another embodiment, the wireless device receives the DCI message a predetermined period of time prior to receiving the traffic that may be within a delay limit of the traffic. In yet another embodiment, the DCI message may include a field of bits in which a position of a bit in the field of bits corresponds to a slot of the plurality of slots of the SPS period, and a predetermined value of a bit in the field of bits may indicate whether the wireless device is to use the one or more occasions in the slot corresponding to the position of the bit in the field of bits. In one embodiment, the SPS configuration may include a configuration for at least one slot of a plurality of slots of a SPS period, and at least one DCI message for the wireless device may be multiplexed with the SPS configuration.

An example embodiment provides a method for receiving traffic in a wireless network in which the method may include: receiving, by a wireless device in the wireless network, a SPS configuration for one or more occasions in at least one slot of a plurality of slots having a SPS period in a PDSCH of the wireless network for traffic for the wireless device; receiving, by the wireless device, the traffic in the one or more occasions; and generating, by the wireless device, a feedback message indicating a type of success of decoding a packet of the traffic based on the wireless device decoding the packet of the traffic in the at least one slot. In one embodiment, generating, by the wireless device, the feedback message may further include: reserving, by the wireless device, for each serving cell one bit for each subgroup over overlapping Start and Length Indicators for a time-domain allocation for a PDSCH; and receiving, by the wireless device, a maximum number of Code Block Groups that may be received per Transport Block in a PDSCH in each serving cell. In another embodiment, generating, by the wireless device, the feedback message may further include: reserving, by the wireless device, a first predetermined number of bits for each subgroup in a slot that does not include a SPS occasion; and reserving, by the wireless device, a second predetermined number of bits for each subgroup that contain a SPS occasion. In still another embodiment, generating, by the wireless device, the feedback message may further include reserving, by the wireless device, a first predetermined number of bits for each SPS occasion of an SPS configuration index participating in a codebook. In yet another embodiment, generating, by the wireless device, the feedback message may further include mapping, by the wireless device, a feedback message into a PUCCH for each Transport Block that is received by the wireless device in a same periodicity of the SPS configuration; and transmitting, by the wireless device, each feedback message in the PUCCH. In one embodiment, generating, by the wireless device, the feedback message may further include: determining, by the wireless device, a feedback message identification for a single Transport Block received in an SPS PDSCH occasion based on a location of a first SPS PDSCH occasion in a bundled set of SPS PDSCH occasions. In another embodiment, generating, by the wireless device, the feedback message further comprises determining, by the wireless device, a feedback message identification based on at least one DCI message for the wireless device that is multiplexed with the SPS configuration.

An example embodiment provides a method for receiving traffic in a wireless network in which the method may include: receiving, by a wireless device in the wireless network, a Dynamic Grant PDSCH that schedules one or more PDSCHs of the wireless network for traffic for the wireless device; receiving, by the wireless device, the traffic in one or more occasions; and generating, by the wireless device, a feedback message corresponding to the received one or more PDSCHs. In one embodiment, the traffic may include one or more video frames. In another embodiment, the wireless device sends the feedback message that may be dependent on a type of at least one video frame and a success or a failure of decoding of the at least one video frame.

BRIEF DESCRIPTION OF THE DRAWING

In the following section, the aspects of the subject matter disclosed herein will be described with reference to exemplary embodiments illustrated in the figures, in which.

DETAILED DESCRIPTION

Figure 1A:
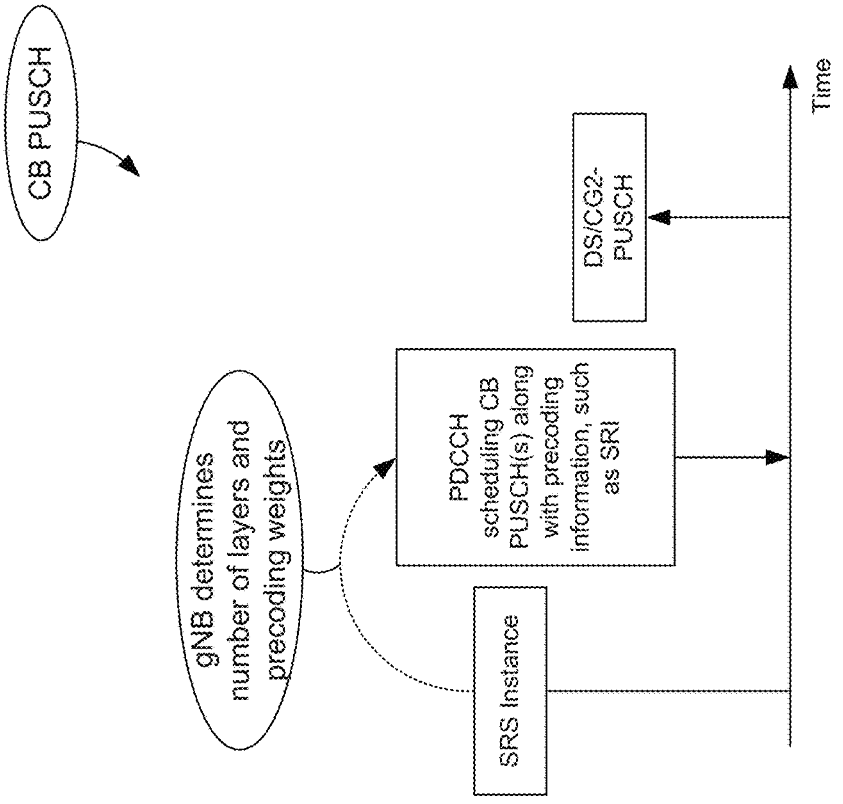
FIGS. 1A and 1B respectively depict example embodiments of a process for determining the number of layers and precoding weights for PUSCH for CB and NCB types.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

FIGS. 1-36, described below, and the various embodiments used to illustrate the subject matter disclosed herein are only by way of example and should not be construed in any way to limit the scope of the subject matter disclosed herein. It should be understood that the subject matter disclosed herein may be implemented in any suitably arranged system or device.

At least the following documents are hereby incorporated by reference into the present disclosure as if fully set forth herein: 3GPP TS 38.211 v15.6.0, "NR; Physical channels and modulation;" 3GPP TS 38.212 v15.6.0, "NR; Multiplexing and Channel coding;" 3GPP TS 38.213 v15.6.0, "NR; Physical Layer Procedures for Control;" 3GPP TS 38.214 v15.6.0, "NR; Physical Layer Procedures for Data;" 3GPP TS 38.321 v15.6.0, "NR; Medium Access Control (MAC) protocol specification;" and 3GPP TS 38.331 v15.6.0, "NR; Radio Resource Control (RRC) Protocol Specification."

PUSCH Scheduling with Repetition

In Rel-16, a UE may be scheduled to transmit a PUSCH with repetition, that is, the same TB is transmitted in multiple PUSCHs that are all scheduled using the same scheduling instance (e.g., same DCI or CG). There are two types of PUSCH repetitions, Type A and Type B. The repetition type dictates the mechanism for determining the time resources for the PUSCH transmissions. In both types, a scheduled PUSCH with repetition is associated with a start symbol S and duration L that are used to determine the time resources for the PUSCH transmissions.

In a Type A PUSCH repetition, a UE is configured with a set of K repetitions. The UE then attempts to transmit the PUSCH on K consecutive slots. If one slot of the K consecutive slots is not available for the PUSCH transmission, the PUSCH transmission is dropped. Determining whether a slot is available/unavailable for PUSCH transmission is subject to many aspects. For example, a slot is available for transmission if the time resources starting at symbol S within the slot and for a duration of L consecutive symbols are available for UL transmission (based on semi-static and/or dynamic TDD configurations and slot formats).

In a Type B PUSCH repetition, a UE is configured with a set of K nominal repetitions. The K nominal repetitions may be determined as follows, starting at slot $K_s$ in which the PUSCH is scheduled to start, and starting from symbol S, consecutive sets of L symbols are determined in which each set of L symbols corresponds to a nominal PUSCH repetition. If the time resources of a nominal repetition consist of some invalid symbols, the set of resources is split into multiple sets of consecutive symbols around the set of invalid symbols in which in each set an actual transmission may be made. The determination of invalid symbols is based on semi-static TDD configurations as well as semi-static and dynamic information given to the UE related to determination of invalid symbols for type B PUSCH repetition. This information is in the form of an additional invalidation pattern which the UE can apply to determine invalid symbols.

In both types of PUSCH scheduling, the actual PUSCH transmission is governed by other factors. For example, a PUSCH transmission follows the dynamically indicated SFI. In the case of a DG-PUSCH and CG2-PUSCH, a UE is not expected to receive an SFI that specifies a slot format that conflicts with the DG-PUSCH. In the case of a CG1-PUSCH, a UE does not transmit the PUSCH on symbols unless the UE receives an SFI explicitly indicating that such symbols are available for UL transmission. A PUSCH transmission obeys particular timelines that ensures correct UE behaviour taking into account UE processing capability. Such timelines include switching timeline between UL/DL. A PUSCH transmission satisfies particular constraints with respect to other transmissions/receptions, such as monitoring of PDCCHs and receptions of Synchronization Signals Blocks (SSBs).

TDD Configurations

In Rel-16, the network may provide the UE with a set of configurations (both semi-statically, e.g., RRC, or dynamically) that indicates a particular configuration for UL slots and resources that dictates the possible transmission directions on these slots and resources. The configuration of the resources is referred to as the TDD configuration.

In particular in a TDD configuration, each OFDM symbol (OS) in the UL frame structure may have one of three possible indications: Uplink (UL), Downlink (DL) or Flexible (F). If the OS has an indication to be UL or DL, then the possible direction of transmission on this symbol may only be by UL or DL respectively, while if the indication is F then both transmission directions on the OS, with the actual transmission being dependent on other factors such as the scheduling type of the transmission.

Indicating the TDD configuration may be done in a semi-static manner. Namely, the UE may be provided with RRC configurations which indicates a particular slot structure that repeats with a configured periodicity. The slot structure may span one or more slots, and it provides a configuration of UL/DL/F indications for the OS in those slots. The semi-static TDD configuration may either be a common configuration for all UEs in the cell or dedicated configurations for each UE. When both common and dedicated TDD configurations are present, the role of dedicated configurations is to only override the indication of OS indicated as F in the common configuration. In this case, the overall indication of the OS for the UE would be specified as: UL if the common TDD configuration provides an UL indication, or common TDD configuration provides a F indication and dedicated TDD configuration provides an UL indication; DL if the common TDD configuration provides a DL indication, or common TDD configuration provides a F indication and dedicated TDD configuration provides a DL indication; or F if both common and dedicated TDD configurations provide F indications.

Additionally, the UE may be provided with a dynamic TDD configuration. The dynamic TDD configuration is referred to as Slot Format Indication (SFI). Providing a dynamic TDD configuration is performed by first configuring the UE with an indication that the UE should monitor for DCI format 2_0 carrying SFI field. The SFI field indicates one UL/DL/F configuration for one or more slots. The UL/DL/F configuration is meant to override the indication of OS in those slots that are semi-statically indicated as being F. Therefore, if UE is configured to monitor for SFI, the overall indication of the OS for the UE would be specified as: UL if it is semi-statically indicated as UL, or F and dynamic TDD configuration provides an UL indication; DL if it is semi-statically indicated as DL, or F and dynamic TDD configuration provides an DL indication; or F if both semi-static and dynamic TDD configuration indicates it as F.

The actual transmission in the OSs depends on the transmitted signals (e.g., PDSCH, PUSCH, PDCCH, PUCCH, RS, etc) and the scheduling type (e.g., dynamic scheduling, configured grant Type 1 or Type 2, semi-persistent scheduling, scheduling with repetitions Type A or Type B). For PUSCH transmission, the PUSCH UL transmission may be cancelled due to a conflict with the TDD configuration of the OSs allocated for the PUSCH.

Cancellation Indication

In Rel-16, the network may provide a UE with a dynamic indication that UL transmissions are cancelled/prohibited in particular resources. The network may opt to perform such cancellation of UL transmission of some UEs in order to free the corresponding resources for the use of other transmissions (e.g., transmissions of data with low-latency). A UE receives such indication of cancellation via a DCI format 2_4 that contains an indication of which time/frequency resources in which the UE should cancel/refrain from UL transmission.

UL Precoding Determination for PUSCH Transmission

For PUSCH transmission, a UE determines the precoding to be applied for the layers of the PUSCH based on the use of Channel State Information Reference Signal (CSI-RS) and Sounding Reference Signal (SRS). Namely, a UE sends to the gNB one or more SRS transmissions that a gNB uses to inform the UE of the number of layers and the precoding to be used for the layers of the PUSCH. The indicated information from a gNB to a UE regarding the precoding information may be in the form of fields such as the SRS Resource Indication (SRI) field in the scheduling DCI: the SRI indicates which SRS resources in the SRS transmission correspond to the precoding of the gNB.

Figure 1B:
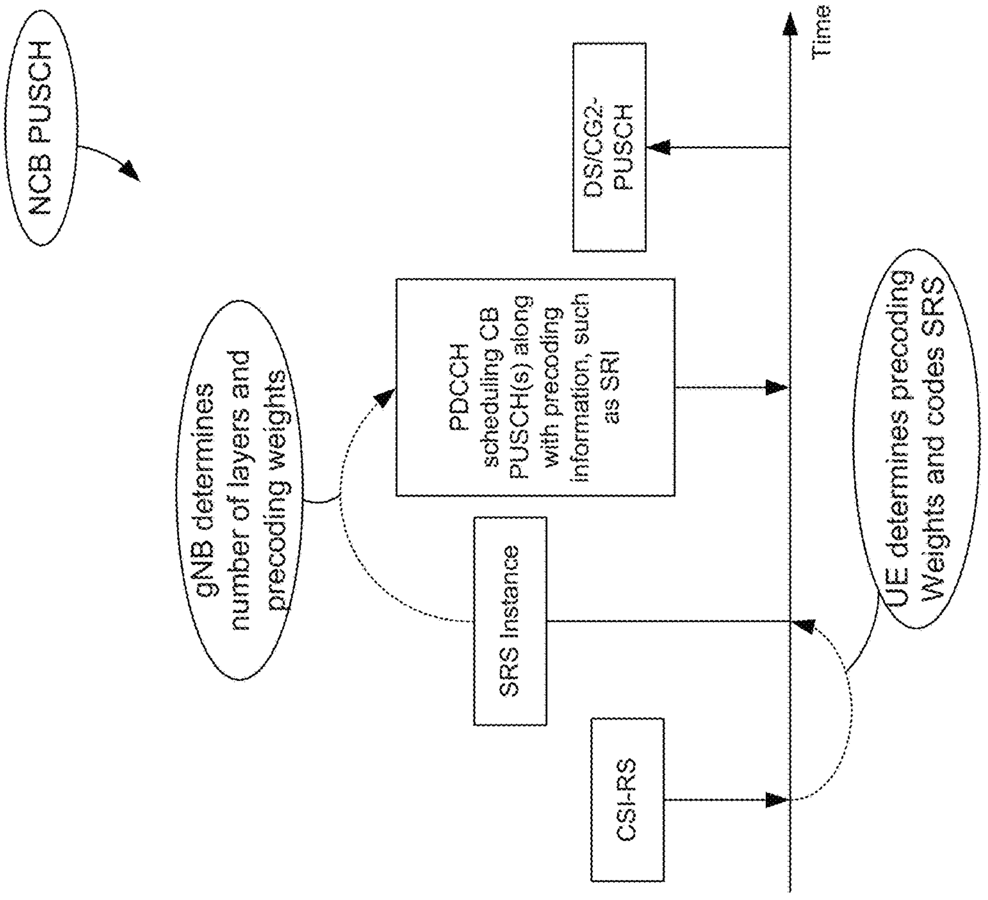

FIGS. 1A and 1B respectively depict example embodiments of a process for determining the number of layers and precoding weights for PUSCH for CB and NCB types.

Use of a SRS differs based on the precoding type of the PUSCH. Namely, in case of codebook-based (CB) PUSCH (FIG. 1A), the precoding that is to be used by a UE for the layers of the PUSCH is based on a set of predefined precoding weights in the specification. In this case, a gNB selects the appropriate precoding weights to be used based on the received set of SRS transmissions. The gNB informs a UE of the weights to be used via the scheduling PDCCH of the PUSCH in case the PUSCH has a scheduling DCI.

In case of non-codebook-based (NCB) PUSCH (FIG. 1B), the precoding that is to be used by the UE for the layers of the PUSCH is computed on the UE side and may not follow a predefined precoding weight. When computing the precoding weights in NCB PUSCH, a UE may obtain the UL channel information. In this case, the UE assumes channel reciprocity, and uses a CSI-RS signal transmitted by a gNB to obtain the information. The UE then uses this information to determine precoding weights. The UE then uses the weights to precoding the SRS signals transmitted to a gNB for number of layer and precoding weights selection. Based on the transmitted SRS, the gNB sends a scheduling PDCCH with indication of the number of layers to be used and the precoding weights to be used for each layer of the PUSCH.

When a PUSCH with repetition is scheduled via a DCI, the Rel-16 specification states that the precoding weights that are to be used for all repetitions of the PUSCH are associated with the latest SRS transmission instance that happens before the PDCCH containing the DCI scheduling the PUSCH repetitions.

Figure 2A:
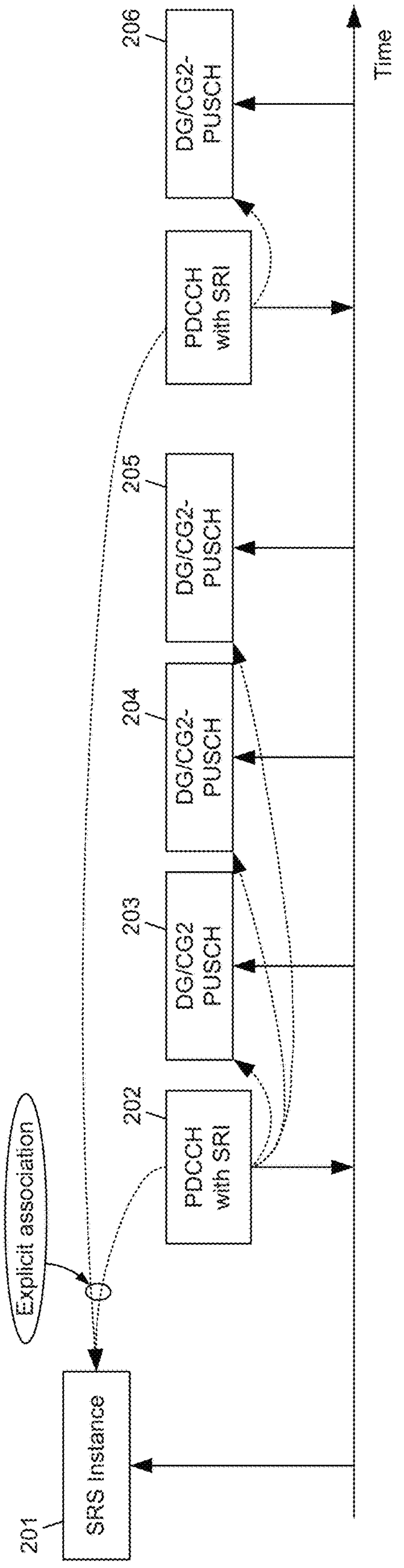
FIGS. 2A and 2B respectively depict how the association works for the determination of the precoding of a PUSCH scheduled with a PDCCH and the SRS instance.
Figure 2B:
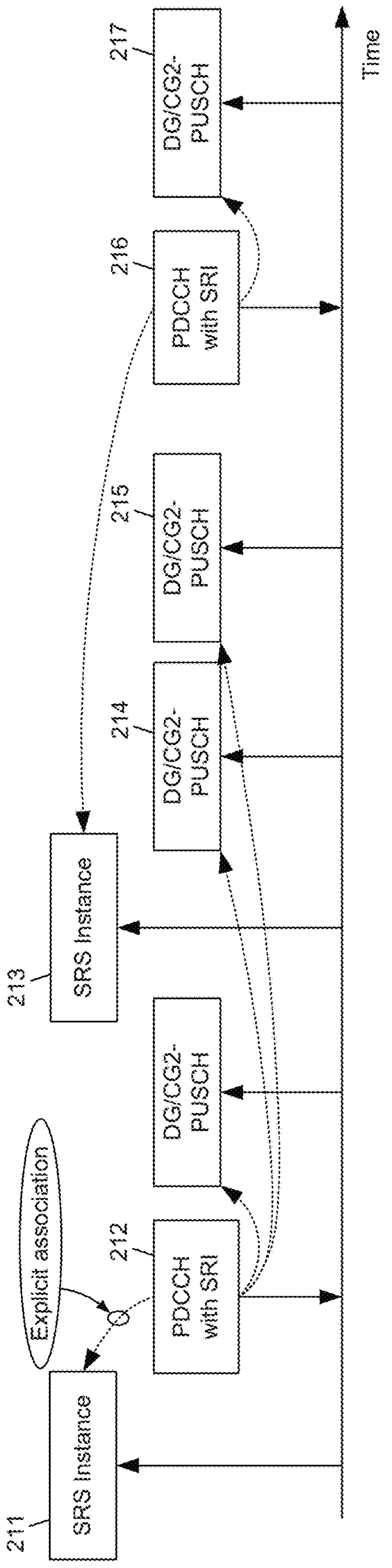

FIGS. 2A and 2B respectively depict how the association works for the determination of the precoding of a PUSCH scheduled with a PDCCH and the SRS instance. In the first case depicted in FIG. 2A, the precoding information included in the PDCCH corresponds to the SRS instance at 201 because it is the latest SRS instance before the scheduling PDCCH at 202. This leads to a UE using the corresponding precoding matrix for the precoding of the scheduled PUSCH transmissions at 203-206. In the second case depicted in FIG. 2B, the first PDCCH at 212 indicates precoding information that corresponds to the SRS instance at 211, and all PUSCHs scheduled with the PDCCH at 212 would use the same precoding matrix despite the fact that another SRS instance at 213 exists before some PUSCH transmissions at 214 and 215. The second PDCCH at 216 indicates precoding information that corresponds to the latest SRS instance at 213 before the PDCCH at 216, which is used for precoding the scheduled PUSCH at 217.

For CG1-PUSCH, a UE is not mandated to use the latest SRS before the SRI-carrying PDCCH because there is no such thing. A UE has the freedom to choose a precoding matrix that may possibly change for each CG1-PUSCH transmission. This does not yet prevent a UE from maintaining the use of the same precoding matrix across many transmissions. In fact, a logical choice of a precoding matrix would be to use the precoding matrix used in association with the latest SRS transmission.

PUSCH/PDSCH Processing Chain

Figure 3:
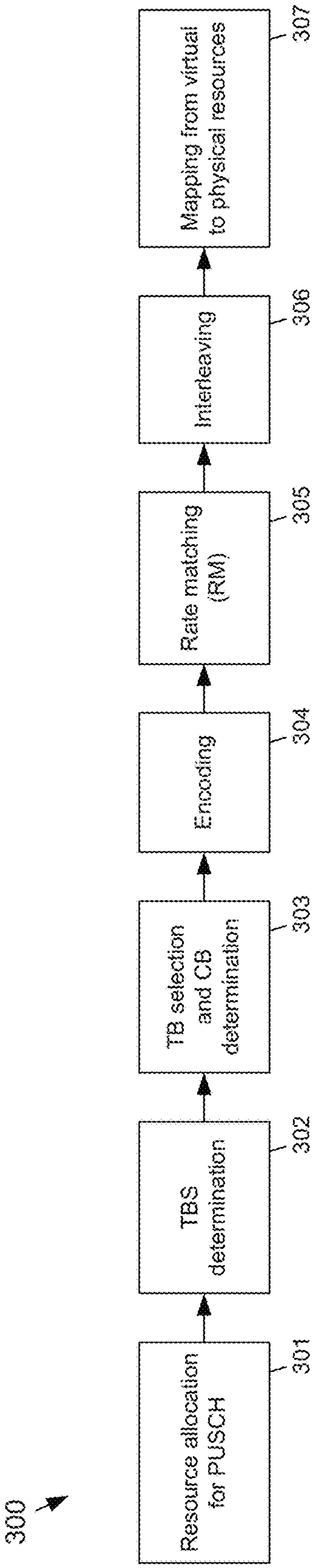
FIG. 3 depicts a typical processing flow for a physical shared channel (PUSCH/PDSCH) based on Rel-16.

FIG. 3 depicts a typical processing flow 300 for a physical shared channel (PUSCH/PDSCH) based on Rel-16. The process starts at 301 when the transmitter is indicated resources to be used for physical shared channel transmission. The resources may be indicated to the transmitter either dynamically (e.g., via a DCI) or semi-statically, for example, through the procedure of Configured Grant (CG) PUSCH transmission or Semi-Persistent Scheduling (SPS) PDSCH. The resources may include a set of OFDM symbols and Subcarriers (SCs) along with additional configurations for the physical shared channel transmission. The set of OFDM symbols may be contiguous in time or non-contiguous in time, and the set of OFDM symbols may also be indicated in the form of sets of symbols in one or more slots. The set of SCs may be a set of contiguous SCs or non-contiguous SCs, and they may be indicated in the form of Resource Blocks (RBs) or subsets of Resource Blocks (RBs). The combination of OFDM symbols and SCs correspond to Resource Elements (REs) that carry the coded bits of the PUSCH.

In Rel-16, the allocation may be in the form of resources in a single slot, corresponding to the transmission of one physical shared channel transmission. Differently, the allocation may be in the form of resources in multiple slots, in which case the allocation corresponds to the transmission of a physical shared channel with repetitions (e.g., Type A or Type B repetitions).

At 302, the transmitter starts with a procedure for determining the TBS based on the allocated resources and the configured resources for transmission overhead such as DMRS resources. This may be followed at 303 by determination of the information bits contained in the TB and then CB determination. At 304, the transmitter then proceeds with LDPC encoding of the different CBs comprising the TB. The output codeword for each CB is then rate-matched at 305 to the amount of available coded bits for transmission of the CB in the physical shared channel. At 306, an interleaver then maps the output of the RM onto the modulation symbols. Finally, at 307 mapping is performed from virtual symbols to physical symbols, which are then transmitted on the different REs of the physical shared channel. When a Rel-16 physical shared channel is scheduled with repetitions/aggregations, the aforementioned procedure is essentially repeated for each repetition with a few differences: each repetition is used to transmit the same TB; and in each repetition, a different Redundancy Version (RV) index may be used, which can change the RM output for each repetition.

In Rel-16, a UE scheduled to transmit a PUSCH with K repetitions using Type A repetition determines the RV index to be used for each transmission in a configured manner. Namely, at the nth slot among the set of K consecutive slots, the RV index is determined according to the following table.

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 0 | 0 | 2 | 3 | 1 |
| 2 | 2 | 3 | 1 | 0 |

-continued

| $rv_{id}$ indicated by the DCI scheduling the PUSCH | $rv_{id}$ to be applied to $n^{th}$ transmission occasion (repetition Type A) or $n^{th}$ actual repetition (repetition Type B) | | | |
|---|---|---|---|---|
| | n mod 4 = 0 | n mod 4 = 1 | n mod 4 = 2 | n mod 4 = 3 |
| 3 | 3 | 1 | 0 | 2 |
| 1 | 1 | 0 | 2 | 3 |

Determination of TBS and Maximum Data Rate

In Rel-16, determination of the TBS is dependent on the following equation $$N_{info}=v*Q*r*N_{RE} \quad (1)$$

in which v is the number of layers used for the physical shared channel transmission, Q and r are the modulation order and the coding rate specified by the MCS index, and $N_{RE}$ is the total number of available resources in the scheduled slot. The TBS is approximately equal to $N_{info}$ in which the difference comes from taking into account the effect of CRC addition, code block segmentation and the finite nature of the allowable TBS values in the specification.

For PUSCH (6.1.4.2, 38.214)

if
- $0 \le I_{MCS} \le 27$and transform precoding is disabled and Table 5.1.3.1-2 is used, or
- $0 \le I_{MCS} \le 28$ and transform precoding is disabled and a table other than Table 5.1.3.1-2 is used, or
- $0 \le I_{MCS} \le 27$ and transform precoding is enabled, the UE shall first determine the TBS as specified below:

The UE shall first determine the number of REs ($N_{RE}$) within the slot:
- A UE first determines the number of REs allocated for PUSCH within a PRB ($N'_{RE}$ ) by
- $N'_{RE} = N_{sc}^{RB} \cdot N_{symb}^{sh} - N_{DMRS}^{PRB} - N_{oh}^{PRB}$ , where $N_{sc}^{RB} = 12$ is the number of subcarriers in the frequency domain in a physical resource block, $N_{symb}^{sh}$ is the number of symbols of the PUSCH allocation within the slot, $N_{DMRS}^{PRB}$ is the number of REs for DM-RS per PRB in the allocated duration including the overhead of the DM-RS CDM groups without data, as described for PUSCH with a configured grant in Subclause 6.1.2.3 or as indicated by DCI format 0_1 or as described for DCI format 0_0 in Subclause 6.2.2, and $N_{oh}^{PRB}$ is the overhead configured by higher layer parameter xOverhead in PUSCH-ServingCellConfig. If the $N_{oh}^{PRB}$ is not configured (a value from 6, 12, or 18), the $N_{oh}^{PRB}$ is assumed to be 0. For Msg3 transmission the $N_{oh}^{PRB}$ may be set to 0.
- A UE determines the total number of REs allocated for PUSCH ($N_{RE}$ ) by $N_{RE} = \min(156, N'_{RE}) \cdot n_{PRB}$ where $n_{PRB}$ is the total number of allocated PRBs for the UE.
- Next, proceed with steps 2-4 as defined in Subclause 5.1.3.2

For PDSCH (5.1.3.2, 38.214),

The UE shall first determine the number of REs ($N_{RE}$) within the slot.
- A UE first determines the number of REs allocated for PDSCH within a PRB ($N_{RE}'$) by $N_{RE}' = N_{sc}^{RB} \cdot N_{symb}^{sh} - N_{DMRS}^{PRB} - N_{oh}^{PRB}$, where $N_{sc}^{RB} = 12$ is the number of subcarriers in a physical resource block, $N_{symb}^{sh}$ is the number of symbols of the PDSCH allocation within the slot, $N_{DMRS}^{PRB}$ is the number of REs for DM-RS per PRB in the scheduled duration including the overhead of the DM-RS CDM groups without data, as indicated by DCI format 1_1 or as described for format 1_0 in Subclause 5.1.6.2, and $N_{oh}^{PRB}$ is the overhead configured by higher layer parameter xOverhead in PDSCH-ServingCellConfig. If the xOverhead in PDSCH-ServingCellconfig is not configured (a value from 0, 6, 12, or 18), the $N_{oh}^{PRB}$ is set to 0. If the PDSCH is scheduled by PDCCH with a CRC scrambled by SI-RNTI, RA-RNTI or P-RNTI, $N_{oh}^{PRB}$ is assumed to be 0.
- A UE determines the total number of REs allocated for PDSCH ($N_{RE}$) by $N_{RE} = \min(156, N_{RE}') \cdot n_{PRB}$, where $n_{PRB}$ is the total number of allocated PRBs for the UE.

2) Intermediate number of information bits ($N_{info}$) is obtained by $N_{info} = N_{RE} \cdot R \cdot Q_m \cdot v$.

If $N_{info} \le 3824$
Use step 3 as the next step of the TBS determination
else
Use step 4 as the next step of the TBS determination
end if 3) When $N_{info} \le 3824$, TBS is determined as follows -continued

- quantized intermediate number of information bits $N'_{info} = \max\left(24, 2^n \cdot \left\lfloor \frac{N_{info}}{2^n} \right\rfloor\right)$, where $n = \max(3, \lfloor \log_2(N_{info}) \rfloor - 6)$.

- use Table 5.1.3.2-1 find the closest TBS that is not less than $N_{info}'$.

4) When $N_{info} > 3824$, TBS is determined as follows.

- quantized intermediate number of information bits.

$N'_{info} = \max\left(3840, 2^n \times \text{round}\left(\frac{N_{info} - 24}{2^n}\right)\right)$, where $n = \lfloor \log_2(N_{info} - 24) \rfloor - 5$ and ties in the round function are broken towards the next largest integer.

- if $R \le 1/4$ $$TBS = 8 \cdot C \cdot \left\lceil \frac{N'_{info} + 24}{8 \cdot C} \right\rceil - 24, \text{ where } C = \left\lceil \frac{N'_{info} + 24}{3816} \right\rceil$$

else if $N_{info}' > 8424$ $$TBS = 8 \cdot C \cdot \left\lceil \frac{N'_{info} + 24}{8 \cdot C} \right\rceil - 24, \text{ where } C = \left\lceil \frac{N'_{info} + 24}{8424} \right\rceil$$

else $$TBS = 8 \cdot \left\lceil \frac{N'_{info} + 24}{8} \right\rceil - 24$$

end if end if

Additionally, NR specifies the maximum data rate that may be attained given particular UE capabilities. The following is a quote from 38.306 specifying the procedure to compute the maximum data rate.

4.1.2 Supported max data rate for DL/UL

For NR, the approximate data rate for a given number of aggregated carriers in a band or band combination is computed as follows.

$$\text{data rate (in } Mbps) = 10^{-6} \cdot \sum_{j=1}^{J} \left( v_{Layers}^{(j)} \cdot Q_m^{(j)} \cdot f^{(j)} \cdot R_{max} \cdot \frac{N_{PRB}^{BW(j),\mu} \cdot 12}{T_s^{\mu}} \cdot \left(1 - OH^{(j)}\right) \right)$$

wherein

J is the number of aggregated component carriers in a band or band combination $R_{max} = 948/1024$ For the j-th CC, $v_{Layers}^{(j)}$ is the maximum number of supported layers given by higher layer parameter maxNumberMIMO-LayersPDSCH for downlink and maximum of higher layer parameters maxNumberMIMO-LayersCB-PUSCH and maxNumberMIMO-LayersNonCB-PUSCH for uplink.

$Q_m^{(j)}$ is the maximum supported modulation order given by higher layer parameter supportedModulationOrderDL for downlink and higher layer parameter supportedModulationOrderUL for uplink.

$f^{(j)}$ is the scaling factor given by higher layer parameter scalingFactor and can take the values 1, 0.8, 0.75, and 0.4.

μ is the numerology (as defined in TS 38.211)

$T_s^{\mu}$ is the average OFDM symbol duration in a subframe for numerology μ, i.e.

$T_s^{\mu} = \frac{10^{-3}}{14 \cdot 2^{\mu}}$, Note that normal cyclic prefix is assumed.

$N_{PRB}^{BW(j),\mu}$ is the maximum RB allocation in bandwidth $BW^{(j)}$ with numerology μ, as defined in 5.3 TS 38.101-1 and 5.3 TS 38.101-2, where $BW^{(j)}$ is the UE supported maximum bandwidth in the given band or band combination.

$OH^{(j)}$ is the overhead and takes the following values 0.14, for frequency range FR1 for DL 0.18, for frequency range FR2 for DL 0.08, for frequency range FR1 for UL 0.10, for frequency range FR2 for UL NOTE 1: Only one of the UL or SUL carriers (the one with the higher data rate) is counted for a cell operating SUL.

NOTE 2: For UL Tx switching between carriers, only the supported MIMO layer combination across carriers that results in the highest combined data rate is counted for the carriers in the supported maximum UL data rate.

-continued

The approximate maximum data rate can be computed as the maximum of the approximate data rates computed using the above formula for each of the supported band or band combinations.
For single carrier NR SA operation, the UE shall support a data rate for the carrier that is no smaller than the data rate computed using the above formula, with J = 1 CC and component $v_{Layers}^{(j)} \cdot Q_m^{(j)} \cdot f^{(j)}$ is no smaller than 4.
NOTE: As an example, the value 4 in the component above can correspond to $v_{Layers}^{(j)} = 1$, $Q_m^{(j)} = 4$ and $f^{(j)} = 1$.
For EUTRA in case of MR-DC, the approximate data rate for a given number of aggregated carriers in a band or band combination is computed as follows.
Data rate (in Mbps) = $10^{-3} \cdot \Sigma_{j=1}^{J} TBS_j$
wherein
J is the number of aggregated EUTRA component carriers in MR-DC band combination
$TBS_j$ is the total maximum number of DL-SCH transport block bits received or the total maximum number of UL-SCH transport block bits transmitted, within a 1ms TTI for j-th CC, as derived from TS36.213 based on the UE supported maximum MIMO layers for the j-th CC, and based on the maximum modulation order for the j-th CC and number of PRBs based on the bandwidth of the j-th CC according to indicated UE capabilities.
The approximate maximum data rate can be computed as the maximum of the approximate data rates computed using the above formula for each of the supported band or band combinations.
For MR-DC, the approximate maximum data rate is computed as the sum of the approximate maximum data rates from NR and EUTRA.

Below is rate matching and interleaving procedure applied for PUSCH described in 3GPP spec 38.212.

Denoting by $E_r$ the rate matching output sequence length for the r -th coded block, where the value of $E_r$ is determined as follows:
Set j = 0
for r = 0 to C − 1
if the r -th coded block is not scheduled for transmission as indicated by CBGTI according to Clause 5.1.7.2 for DL-SCH and 6.1.5.2 for UL-SCH in [TS 38.214]
$E_r = 0$ ;
else
if $j \leq C' - \bmod(G/(N_L \cdot Q_m), C') - 1$ $$E_r = N_L \cdot Q_m \cdot \left\lfloor \frac{G}{N_L \cdot Q_m \cdot C'} \right\rfloor;$$

else $$E_r = N_L \cdot Q_m \cdot \left\lceil \frac{G}{N_L \cdot Q_m \cdot C'} \right\rceil;$$

end if
j = j+1;
end if
end for
where
- $N_L$ is the number of transmission layers that the transport block is mapped onto;
- $Q_m$ is the modulation order;
- G is the total number of coded bits available for transmission of the transport block;
- C'= C if CBGTI is not present in the DCI scheduling the transport block and C' is the number of scheduled code blocks of the transport block if CBGTI is present in the DCI scheduling the transport block.

Denote by $rv_{id}$ the redundancy version number for this transmission ($rv_{id}$ = 0, 1, 2 or 3), the rate matching output bit sequence $e_k$, k =0,1,2,...,E−1, is generated as follows, where $k_0$ is given by Table 5.4.2.1-2 according to the value of $rv_{id}$ and LDPC base graph:
k = 0;
j = 0;
while k < E
if $d_{(k_0+j) \bmod N_{cb}} \neq$ < NULL >
$e_k = d_{(k_0+j) \bmod N_{cb}}$;
k = k + 1;
end if
j = j +1;
end while -continued Table 5.4.2.1-2: Starting position of different redundancy versions, $k_0$

| $rv_{id}$ | $k_0$ LDPC base graph 1 | $k_0$ LDPC base graph 2 |
|---|---|---|
| 0 | 0 | 0 |
| 1 | $\left\lfloor \frac{17N_{cb}}{66Z_c} \right\rfloor Z_c$ | $\left\lfloor \frac{13N_{cb}}{50Z_c} \right\rfloor Z_c$ |
| 2 | $\left\lfloor \frac{33N_{cb}}{66Z_c} \right\rfloor Z_c$ | $\left\lfloor \frac{25N_{cb}}{50Z_c} \right\rfloor Z_c$ |
| 3 | $\left\lfloor \frac{56N_{cb}}{66Z_c} \right\rfloor Z_c$ | $\left\lfloor \frac{43N_{cb}}{50Z_c} \right\rfloor Z_c$ |

5.4.2.2 Bit interleaving

The bit sequence $e_0, e_1, e_2, \ldots, e_{E-1}$, is interleaved to bit sequence $f_0, f_1, f_2, \ldots, f_{E-1}$, according to the following, where the value of $Q_m$ is the modulation order.

for j = 0 to $E / Q_m - 1$
for i = 0 to $Q_m - 1$
$f_{i+j \cdot Q_m} = e_{i \cdot E/Q_m + j}$;
end for
end for For slot aggregation, Rel-16 follows the following table for determining the RV index for the RM output of each slot.

TABLE 6.1.2.1-2

Redundancy version for PUSCH transmission
For PUSCH repetition Type A, in case K > 1, the same symbol allocation is applied across the K consecutive slots and the PUSCH is limited to a single transmission layer. The UE shall repeat the TB across the K consecutive slots applying the same symbol allocation in each slot. The redundancy version to be applied on the nth transmission occasion of the TB, where n = 0, 1, . . . K-1, is determined according to table 6.1.2.1-2.

| $rv_{id}$ indicated by the DCI scheduling the PUSCH | $rv_{id}$ to be applied to $n^{th}$ transmission occasion (repetition Type A) or $n^{th}$ actual repetition (repetition Type B) n mod 4 = 0 | n mod 4 = 1 | n mod 4 = 2 | n mod 4 = 3 |
|---|---|---|---|---|
| 0 | 0 | 2 | 3 | 1 |
| 2 | 2 | 3 | 1 | 0 |
| 3 | 3 | 1 | 0 | 2 |
| 1 | 1 | 0 | 2 | 3 |

UCI Multiplexing on PUSCH

Figure 4:
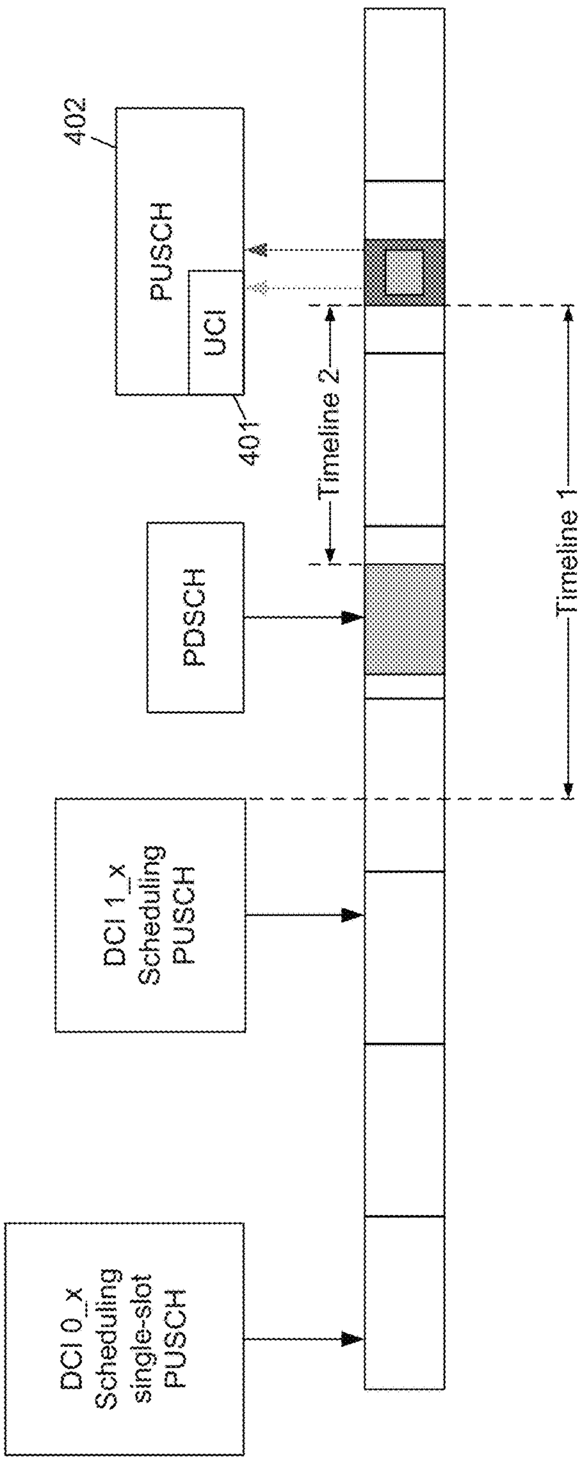
FIG. 4 depicts an example situation in which a HARQ UCI is multiplexed on a PUSCH.

Rel-16 allows the UE to multiplex UCI information on PUSCH when the scheduled resources overlap. FIG. 4 depicts an example situation in which a HARQ UCI is multiplexed on a PUSCH. In FIG. 4, a UCI 401 carrying DL HARQ feedback is scheduled in overlapping resources with a PUSCH 402, and is, therefore, multiplexed on the PUSCH. When a PUCCH and a PUSCH are multiplexing, Rel-16 specifies timeline constraints between the different signals, namely Timeline 1 and Timeline 2.

Timeline 2 specifies a minimum duration between all scheduled PDSCHs the HARQ feedback of which is to be multiplexed with the PUSCH, and the resources of the multiplexed signals. The following is a statement from 38.213 specification.

| |
|---|
| If a UE would transmit multiple overlapping PUCCHs in a slot or overlapping PUCCH(s) and PUSCH(s) in a slot and, when applicable as described in Clauses 9.2.5.1 and 9.2.5.2, the UE is configured to multiplex different UCI types in one PUCCH, and at least one of the multiple overlapping PUCCHs or PUSCHs is in response to a DCI format detection by the UE, the UE multiplexes all corresponding UCI types if the following conditions are met. If one of the PUCCH transmissions or PUSCH transmissions is in response to a DCI format detection by the UE, the UE expects that the first symbol $S_0$ of the earliest PUCCH or PUSCH, among a group overlapping PUCCHs and PUSCHs in the slot, satisfies the following timeline conditions<br>- $S_0$ is not before a symbol with CP starting after $T_{proc,1}^{mux}$ after a last symbol of any corresponding PDSCH, $T_{proc,1}^{mux}$ is given by maximum of $\{T_{proc,1}^{mux,1}, \ldots, T_{proc,1}^{mux,i}, \ldots\}$ where for the i-th PDSCH with corresponding HARQ-ACK transmission on a PUCCH which is in the group of overlapping PUCCHs and PUSCHs, $T_{proc,1}^{mux,i} = (N_1 + d_{1,1} + 1) \cdot (2048 + 144) \cdot \kappa \cdot 2^{-\mu} \cdot T_C$, $d_{1,1}$ is selected for the i-th PDSCH following [TS 38.214], $N_1$ is selected based on the UE PDSCH processing capability of the i-th PDSCH and SCS configuration $\mu$, where $\mu$ corresponds to the smallest SCS configuration among the SCS configurations used for the PDCCH scheduling the i-th PDSCH (if any), the i-th PDSCH, the PUCCH with corresponding HARQ-ACK transmission for i-th PDSCH, and all PUSCHs in the group of overlapping PUCCHs and PUSCHs. |

Timeline 2 accounts for the decoding time to decode the PDSCHs and determine the HARQ feedback values to be multiplexed.

Timeline 1 specifies a minimum duration between all DCIs involved in scheduling the PUCCHs and/or PUSCH signals to be multiplexed, and the scheduled resources themselves. The following is a statement from 38.214 specification.

---

- if there is no aperiodic CSI report multiplexed in a PUSCH in the group of overlapping PUCCHs and PUSCHs, $S_0$ is not before a symbol with CP starting after $T_{proc,2}^{mux}$ after a last symbol of
- any PDCCH with the DCI format scheduling an overlapping PUSCH, and
- any PDCCH scheduling a PDSCH or SPS PDSCH release with corresponding HARQ-ACK information in an overlapping PUCCH in the slot If there is at least one PUSCH in the group of overlapping PUCCHs and PUSCHs, $T_{proc,2}^{mux}$ is given by maximum of $\{T_{proc,2}^{mux,1}, \ldots, T_{proc,2}^{mux,i}, \ldots\}$ where for the i-th PUSCH which is in the group of overlapping PUCCHs and PUSCHs, $T_{proc,2}^{mux,i} = \max((N_2 + d_{2,1} + 1) \cdot (2048 + 144) \cdot \kappa \cdot 2^{-\mu} \cdot T_C, d_{2,2})$, $d_{2,1}$ and $d_{2,2}$ are selected for the i-th PUSCH following [TS 38.214], $N_2$ is selected based on the UE PUSCH processing capability of the i-th PUSCH and SCS configuration μ, where μ corresponds to the smallest SCS configuration among the SCS configurations used for the PDCCH scheduling the i-th PUSCH (if any), the PDCCHs scheduling the PDSCHs with corresponding HARQ-ACK transmission on a PUCCH which is in the group of overlapping PUCCHs/PUSCHs, and all PUSCHs in the group of overlapping PUCCHs and PUSCHs.

- If there is no PUSCH in the group of overlapping PUCCHs and PUSCHs, $T_{proc,2}^{mux}$ is given by maximum of $\{T_{proc,2}^{mux,1}, \ldots, T_{proc,2}^{mux,i}, \ldots\}$ where for the i-th PDSCH with corresponding HARQ-ACK transmission on a PUCCH which is in the group of overlapping PUCCHs, $T_{proc,2}^{mux,i} = (N_2 + 1) \cdot (2048 + 144) \cdot \kappa \cdot 2^{-\mu} \cdot T_C$, $N_2$ is selected based on the UE PUSCH processing capability of the PUCCH serving cell if configured. $N_2$ is selected based on the UE PUSCH processing capability 1, if PUSCH processing capability is not configured for the PUCCH serving cell. μ is selected based on the smallest SCS configuration between the SCS configuration used for the PDCCH scheduling the i-th PDSCH (if any) with corresponding HARQ-ACK transmission on a PUCCH which is in the group of overlapping PUCCHs, and the SCS configuration for the PUCCH serving cell.

---

The timeline accounts for the duration to prepare the PUSCH signals. It is specified between the first symbol of the overlapping resources and every DCI scheduling any of the signals involved in the multiplexing situation. This ensures that a UE is aware of the multiplexing signals early enough to prepare the corresponding PUSCH.

Note that without knowing that the multiplexing effect is to take place, a UE may technically proceed with preparing the PUSCH by determining TBS based on the allocated PUSCH resources, establishing CBs and performing coding. Determining the RM output step, however, cannot be performed until multiplexing effect is known. Therefore, it may be argued that Timeline 2 is meant to allow enough time for the RM output step, not the entire PUSCH preparation time.

When handling UCI multiplexing with PUSCH scheduled with repetition, it seems there may be no distinction among the different PUSCHs in the repetitions; that is, the aforementioned timelines hold considering the actual PUSCH affected by the multiplexing.

PDCCH Configuration and Monitoring Complexity Aspects

A Physical Downlink Control Channel (PDCCH) is a downlink physical transmission used to carry control data in the form of a Downlink Control Information (DCI) to one or multiple UEs. A PDCCH is typically transmitted in a set of time and frequency resources that would form what is a called a PDCCH Monitoring Occasion (MO). Typically, a UE does not know precisely in which MO a DCI is going to be transmitted, but rather a UE monitors a set of MOs that are configured by a gNB in anticipation that one or multiple DCIs may be conveyed in one or some of these MOs. The configuration of the MOs may be done via the notion of a Control Resource Set (CORESET) and a Search Space (SS).

In Rel-15, PDCCH Monitoring capability is defined per slot as a function of the sub-carrier spacing or numerology μ. Table 1 and Table 2 set forth the blind decoding (BD)/CCE limits per slot in Rel-15.

TABLE 1

Maximum number $M_{PDCCH}^{maxs,\ lot,\ \mu}$ of monitored PDCCH candidates per slot for a DL BWP with SCS configuration $\mu \in \{0, 1, 2, 3\}$ for a serving cell, (TS38.213).

| μ | Maximum number of monitored PDCCH candidates per slot and per serving cell $M_{PDCCH}^{maxs,\ lot,\ \mu}$ |
|---|---|
| 0 | 44 |
| 1 | 36 |
| 2 | 22 |
| 3 | 20 |

TABLE 2

Maximum number $C_{PDCCH}^{maxs,\ lot,\ \mu}$ of non-overlapped CCEs per slot for a DL BWP with SCS configuration $\mu \in \{0, 1, 2, 3\}$ for a serving cell, (TS38.213).

| μ | Maximum number of non-overlapped CCEs per slot and per serving cell $C_{PDCCH}^{maxs,\ lot,\ \mu}$ |
|---|---|
| 0 | 56 |
| 1 | 56 |
| 2 | 48 |
| 3 | 32 |

Although UE may not be expected to monitor more BD/CCE than the limits given in Tables 1 and 2, a gNB may still configure the SS sets such that the total number of configured PDCCH candidates result in exceeding these limits (overbooking). In the case of overbooking in a slot, a UE selectively drops some search spaces, such that the total number of PDCCH candidates and CCEs remains within the per-slot limit. Suppose that $M^{slot}$ and $C^{slot}$ are BD and CCE limits per slot. If the configuration of CSS results in $M_{CSS}$ and $C_{CSS}$ BD and CCE monitorings per slot, there remains $M^{slot}-M_{CSS}$ PDCCH candidates (BDs) and $C^{slot}-C_{CSS}$ CCEs to monitor in all the configured USSs. A UE then drops a USS, and may prioritizing monitoring of a USS with lowest configuration index over one with a larger index until either total number of allocated PDCCH candidates exceed the BD limit or the total number of allocated CCEs for monitoring exceeds the CCE limit.

PDCCH Processing Chain

Figure 5:
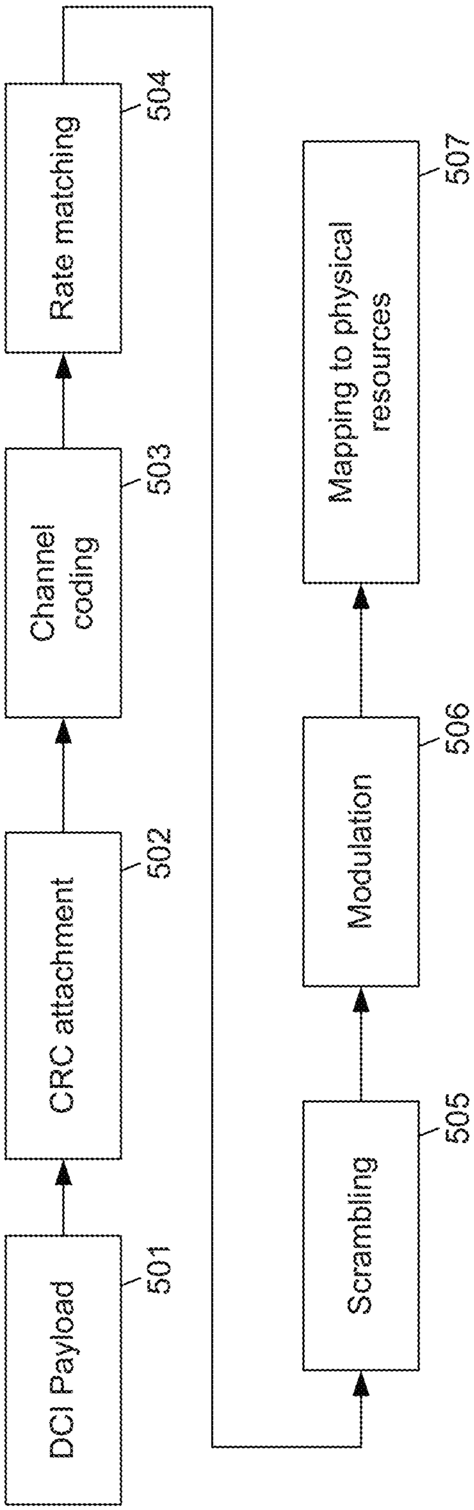
FIG. 5 depicts an example embodiment of a processing chain for a PDCCH carrying a DCI payload.

FIG. 5 depicts an example embodiment of a processing chain 500 for a PDCCH carrying a DCI payload. A DCI payload 501 is first attached with a CRC check at 502, which is then encoded using polar coding at 503. The set of coded bits are then rate matched at 504 to the amount of resources configured for the DCI transmission based on the particular SS set configuration with the configured aggregation level.

The set of selected coded bits out of the rate matching operation are then scrambled at 505 into a new sequence. The scrambling is done using a scrambling sequence that is specified in the specification document 38.211 section 5.2.1 and that is initiated by the value $$c_{init}=(n_{RNTI}\cdot 2^{16}+n_{ID})\bmod 2^{31} \quad (1)$$

in which for a USS, $n_{ID}$ may be equal to the higher-layer parameter specifying the DMRS scrambling ID of the associated CORESET, and $n_{RNTI}$ may be given by the C-RNTI for the PDCCH in a USS.

The PDCCH may then be modulated at 506 using QPSK, and may then be mapped to the physical resources at 507. The modulated symbols are scaled by a factor $\beta_{PDCCH}$ and the antenna port used is 2000.

SPS/CG Configurations

In Rel-15 3GPP new radio (NR) technology, the downlink traffic may be either dynamic grant (DG) physical downlink shared channel (PDSCH) or semi-persistently scheduled (SPS) PDSCH. A DG-PDSCH may be scheduled by a scheduling physical downlink control channel (PDCCH) that is to convey the downlink control information (DCI) to the user equipment (UE). A DCI includes, among other information, the time and frequency resources in which a UE may receive the PDSCH. Every DG-PDSCH may only be received by receiving the scheduling DCI.

On the other hand, to make it possible for a UE to receive a PDSCH without a scheduling DCI for periodic traffic, SPS PDSCH may be employed. With SPS PDSCH, a gNB configures a UE with one or more SPS configurations via radio resource control (RRC) messages. A SPS configuration information element (IE) per serving cell per bandwidth part (BWP) includes periodicity, physical uplink control channel (PUCCH) resource information and other information for SPS operations as shown below and see Rel-15 TS 38.313.

```
-- ASN1START
-- TAG-SPS-CONFIG-START
SPS-Config ::=              SEQUENCE {
  periodicity               ENUMERATED {ms10, ms20, ms32, ms40,
ms64, ms80, ms128, ms160, ms320, ms640,
                              spare6, spare5, spare4, spare3, spare2
spare1},
  nrofHARQ-Processes        INTEGER (1..8),
  n1PUCCH-AN                PUCCH-ResourceId
OPTIONAL,       -- Need M
  mcs-Table                 ENUMERATED {qam64LowSE}
OPTIONAL,       -- Need S
  ...
}
```

A SPS configuration may be activated by an activation DCI that in general may be any of the DCI formats that schedule a DG-PDSCH with some additional validation mechanism performed. Compared to a DCI scheduling a DG-PDSCH, an SPS activation DCI may be scrambled by a configured grant radio network temporary identifier (CS-RNTI) and some specific DCI fields may be specially used for identification of SPS activation, including new data indicator (NDI), hybrid automatic repeat request (HARQ) process number (HPN) and redundancy version (RV). The SPS activation DCI may schedule the first SPS PDSCH occasion just like a DG-PDSCH. The following SPS occasions may be determined according to the periodicity IE in the SPS configuration and the time and frequency domain resource indicated by the activation DCI.

Figure 6:
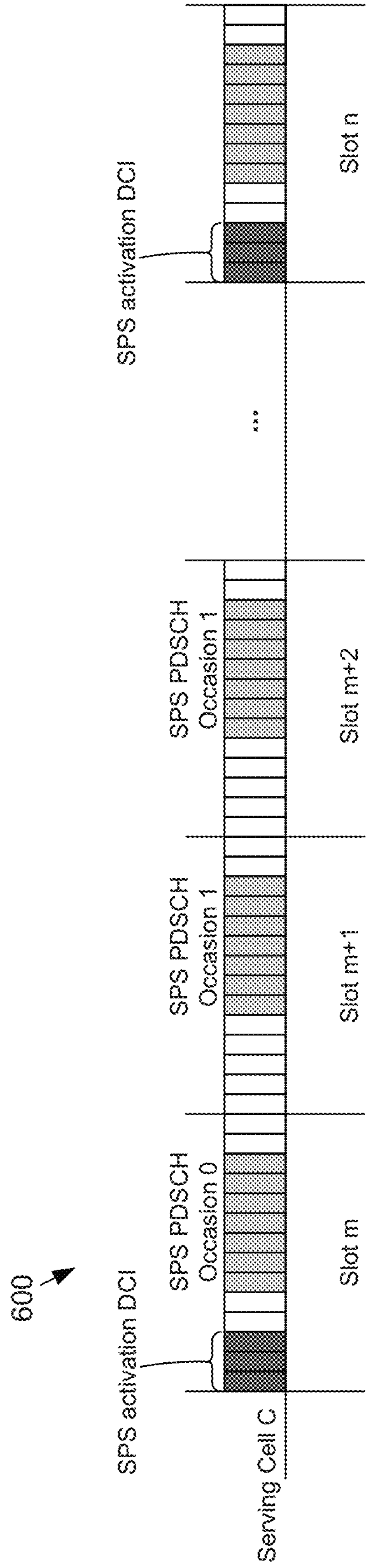
FIG. 6 depicts an example of a SPS PDSCH operation in which a periodicity of one slot is assumed.

FIG. 6 depicts an example of a SPS PDSCH operation 600 in which a periodicity of one slot is assumed, which is introduced in Rel-16. In FIG. 6, a SPS activation DCI is received in slot m and indicates/schedules the first SPS PDSCH occasion 0 in slot m. The next SPS PDSCH occasions are determined according to the periodicity of 1 slot. Within the SPS slots, the time-frequency resources follows that of the first SPS occasion. Finally, the active SPS configuration is released by the release DCI in slot n. Although the release DCI technically does not schedule a resource, it may be assumed that the release DCI may be associated with the one PDSCH occasion in the slot.

Figure 7B:
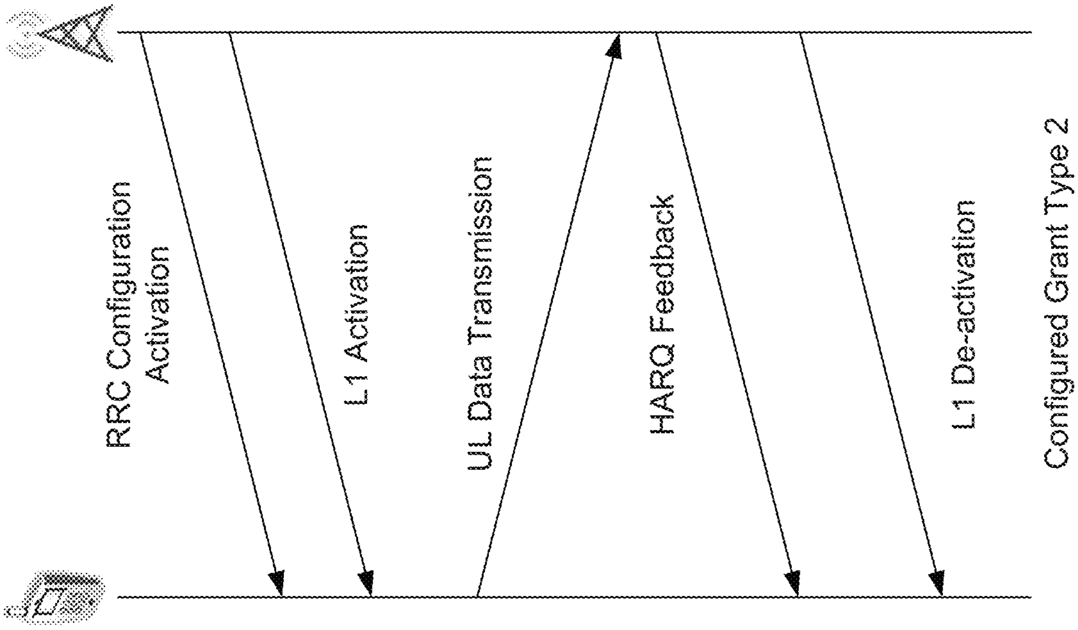
FIGS. 7A and 7B respectively depicts two types of Grant Free configuration schemes supported in NR.
Figure 7A:
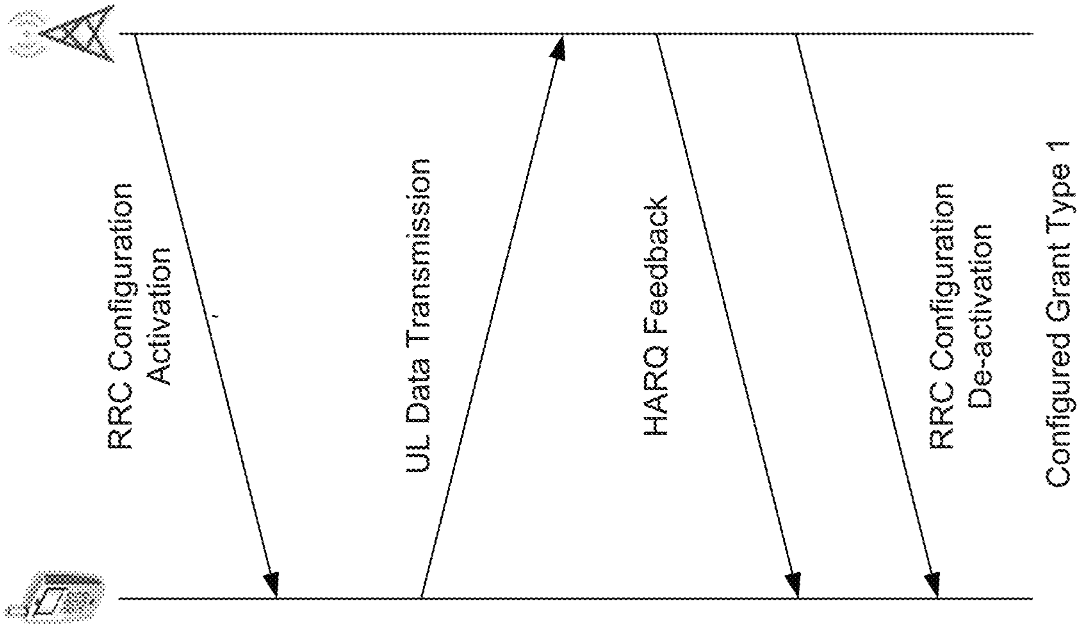

An NR specification introduced configured grant (CG) uplink transmission, which enables the UL transmission without dynamic grant and may support an ultra-reliable and low latency communication (URLLC). FIGS. 7A and 7B respectively depicts two types of Grant Free configuration schemes supported in NR. In particular, FIG. 7A depicts a configured grant Type 1 in which an uplink grant may be provided by RRC, and may be stored as configured uplink grant. FIG. 7B depicts a configured grant Type 2 in which an uplink grant may be provided by PDCCH, and may be stored or cleared as configured uplink grant based on L1 signaling indicating configured uplink grant activation or deactivation.

With CG, there may be no SR sent before transmitting an uplink packet, thereby reducing overall latency. A configured grant may be configured using, for example, the following ConfiguredGrantConfig information element.

ConfiguredGrantConfig information element

```
-- ASN1START
-- TAG-CONFIGUREDGRANTCONFIG-START
ConfiguredGrantConfig ::=           SEQUENCE {
  frequencyHopping                    ENUMERATED {intraSlot, interSlot}
OPTIONAL,             -- Need S
  cg-DMRS-Configuration               DMRS-UplinkConfig,
  mcs-Table                           ENUMERATED {qam256, qam64LowSE}
```

-continued

ConfiguredGrantConfig information element

```
OPTIONAL,                    -- Need S
   mcs-TableTransformPrecoder              ENUMERATED {qam256, qam64LowSE}
OPTIONAL,                    -- Need S
   uci-OnPUSCH                             SetupRelease { CG-UCI-OnPUSCH }
OPTIONAL,                    -- Need M
   resourceAllocation                      ENUMERATED { resourceAllocationType0,
resourceAllocationType1, dynamicSwitch },
   rbg-Size                                ENUMERATED {config2}
OPTIONAL,                    -- Need S
   powerControlLoopToUse                   ENUMERATED {n0, n1},
   p0-PUSCH-Alpha                          P0-PUSCH-AlphaSetId,
   transformPrecoder                       ENUMERATED {enabled, disabled}
OPTIONAL,                    -- Need S
   nrofHARQ-Processes                      INTEGER(1..16),
   repK                                    ENUMERATED {n1, n2, n4, n8},
   repK-RV                                 ENUMERATED {s1-0231, s2-0303, s3-0000}   OPTIONAL,
-- Need R
   periodicity                             ENUMERATED {
                                                sym2, sym7, sym1x14, sym2x14, sym4x14, sym5x14,
sym8x14, sym10x14, sym16x14, sym20x14,
                                                sym32x14, sym40x14, sym64x14, sym80x14,
sym128x14, sym160x14, sym256x14, sym320x14, sym512x14,
                                                sym640x4, sym1024x14, sym1280x14, sym2560x14,
sym5120x14,
                                                sym6, sym1x12, sym2x12, sym4x12, sym5x12,
sym8x12, sym10x12, sym16x12, sym20x12, sym32x12,
                                                sym40x12, sym64x12, sym80x12, sym128x12,
sym160x12, sym256x12, sym320x12, sym512x12, sym640x12,
                                                sym1280x12, sym2560x12
   },
   configuredGrantTimer                    INTEGER (1..64)
OPTIONAL,                    -- Need R
   rrc-ConfiguredUplinkGrant               SEQUENCE {
      timeDomainOffset                        INTEGER (0..5119),
      timeDomainAllocation                    INTEGER (0..15),
      frequencyDomainAllocation               BIT STRING (SIZE(18)),
      antennaPort                             INTEGER (0..31),
      dmrs-SeqInitialization                  INTEGER (0..1)
OPTIONAL,                    -- Need R
      precodingAndNumberOfLayers              INTEGER (0..63),
      srs-ResourceIndicator                   INTEGER (0..15)
OPTIONAL,                    -- Need R
      mcsAndTBS                               INTEGER (0..31),
      frequencyHoppingOffset                  INTEGER (1.. maxNrofPhysicalResourceBlocks-1)
OPTIONAL,                    -- Need R
      pathlossReferenceIndex                  INTEGER (0..maxNrofPUSCH-PathlossReferenceRSs-1),
      ...,
      [[
      pusch-RepTypeIndicator-r16              ENUMERATED {pusch-RepTypeA,pusch-RepTypeB}
OPTIONAL,                    -- Need M
      frequencyHoppingPUSCH-RepTypeB-r16      ENUMERATED {interRepetition, interSlot}
OPTIONAL,                    -- Cond RepTypeB
      timeReferenceSFN-r16                    ENUMERATED {sfn512}
OPTIONAL                     -- Need S
      ]]
   }
OPTIONAL,                    -- Need R
   ...,
   [[
   cg-RetransmissionTimer-r16                 INTEGER (1..64)
OPTIONAL,                    -- Need R
   cg-minDFI-Delay-r16                        ENUMERATED
                                                 {sym7, sym1x14, sym2x14, sym3x14, sym4x14,
sym5x14, sym6x14, sym7x14, sym8x14,

                                                  sym9x14, sym10x14, sym11x14, sym12x14,

sym13x14, sym14x14,sym15x14, sym16x14

                                                 }
OPTIONAL,                    -- Need R
   cg-nrofPUSCH-InSlot-r16                    INTEGER (1..7)
OPTIONAL,                    -- Need R
   cg-nrofSlots-r16                           INTEGER (1..40)
OPTIONAL,                    -- Need R
   cg-StartingOffsets-r16                     CG-StartingOffsets-r16
OPTIONAL,                    -- Need R
   cg-UCI-Multiplexing-r16                    ENUMERATED {enabled}
OPTIONAL,                    -- Need R
   cg-COT-SharingOffset-r16                   INTEGER (1..39)
```

-continued

```
ConfiguredGrantConfig information element

OPTIONAL,                -- Need R
  betaOffsetCG-UCI-r16                       INTEGER (0..31)
OPTIONAL,                -- Need R
  cg-COT-SharingList-r16                     SEQUENCE (SIZE (1..1709)) OF CG-COT-Sharing-r16
OPTIONAL,                -- Need R
  harq-ProcID-Offset-r16                     INTEGER (0..15)
OPTIONAL,                -- Need M
  harq-ProcID-Offset2-r16                    INTEGER (0..15)
OPTIONAL,                -- Need M
  configuredGrantConfigIndex-r16             ConfiguredGrantConfigIndex-r16
OPTIONAL,                -- Cond CG-List
  configuredGrantConfigIndexMAC-r16          ConfiguredGrantConfigIndexMAC-r16
OPTIONAL,                -- Cond CG-IndexMAC
  periodicityExt-r16                         INTEGER (1..5120)
OPTIONAL,                -- Need R
  startingFromRV0-r16                        ENUMERATED {on, off}
OPTIONAL,                -- Need R
  phy-PriorityIndex-r16                      ENUMERATED {p0, p1}
OPTIONAL,                -- Need R
  autonomousTx-r16                           ENUMERATED {enabled}
OPTIONAL                 -- Cond LCH-BasedPrioritization
  ]]
}
CG-UCI-OnPUSCH ::= CHOICE {
  dynamic                                    SEQUENCE (SIZE (1..4)) OF BetaOffsets,
  semiStatic                                 BetaOffsets
}
CG-COT-Sharing-r16 ::= CHOICE {
  noCOT-Sharing-r16                        NULL,
  cot-Sharing-r16                          SEQUENCE {
      duration-r16                           INTEGER (1..39),
      offset-r16                             INTEGER (1..39),
      channelAccessPriority-r16              INTEGER (1..4)
  }
}
CG-StartingOffsets-r16 ::= SEQUENCE {
  cg-StartingFullBW-InsideCOT-r16            SEQUENCE (SIZE (1..7)) OF INTEGER (0..6)
OPTIONAL,                -- Need R
  cg-StartingFullBW-OutsideCOT-r16           SEQUENCE (SIZE (1..7)) OF INTEGER (0..6)
OPTIONAL,                -- Need R
  cg-StartingPartialBW-InsideCOT-r16         INTEGER (0..6)
OPTIONAL,                -- Need R
  cg-StartingPartialBW-OutsideCOT-r16        INTEGER (0..6)
OPTIONAL                 -- Need R
}
-- TAG-CONFIGUREDGRANTCONFIG-STOP
-- ASN1STOP
```

HARQ Feedback

For PDSCH channel, Rel-16 NR allows use of Code Blocks (CBs) and Code Block Groups (CBGs). While use of CBs help reduce the processing complexity of the PDSCH, use of CBGs help to reduce the Hybrid Automatic Repeat Request (HARQ) feedback overhead by grouping the CBs of a Transport Block (TB) into a maximum number N of CBGs per TB in which the value of N is configured per cell. Specifically, the procedure of transmitting and receiving a PDSCH signal on an active cell is as follows:

On the transmitter side (gNB), a gNB makes a decision to schedule a PDSCH transmission to a UE. The transmission occurs over a particular allocation of resources and with a particular PDSCH configuration. Based on the PDSCH allocation, the gNB determines the TB Size (TBS).

An amount of data equal to TBS is then allocated as the TB to be transmitted in the PDSCH. The TB may be amended with a Cyclic Redundancy Check (CRC).

The gNB then divides the TB+CRC into smaller chunks of data, referred to as CBs in which the size of each CB is based on the used Low-Density-Parity-Check (LDPC) code. The collection of CB s is virtually grouped into a number N of non-overlapping sets of CB s called CBGs. Each CB may be amended with an additional CRC, and the combination of the CB+CRC is coded using the determined LDPC code. The coded outputs of all CBs are rate-matched on the available resources for PDSCH transmission.

On the receiver side (UE), a UE extracts the received coded output for all CBs included in the PDSCH. The UE then attempts to decode each CB individually. For each CBG, if any CB inside the CBG fails its respective CRC check, then a HARQ Negative Acknowledgement (NACK) is prepared for feedback transmission by the UE. Otherwise, a HARQ Acknowledgement (ACK) is prepared. The UE then conveys the set of HARQ ACK/NACK bits in a UCI transmitted in the PUCCH signal corresponding to the PDSCH.

In Rel-16, a UE is configured with a maximum number of CBGs per TB $$N_{HARQ\text{-}ACK}^{CBG/TB,max}$$

per cell in which this information is RRC configured. For a given TB, the set of C CBs may then be grouped into M CBGs in which M is at most equal to the maximum number of CBGs per TB per cell.

With respect to the transmission of a PUCCH containing the HARQ feedback, a UE may be provided with a timing value that indicates a value k (in terms of slots) such that the PDCCH transmission happens in slot n+k in which n is the slot where the PDSCH reception ends. This value k may be either Radio Resource Control (RRC) configured, or dynamically provided by the scheduling DCI through the field PDSCH-to-HARQ_feedback. The field PDSCH-to-HARQ_feedback may assume any value from the set {1,2, 3,4,5,6,7,8}. Alternatively, the value of the field may map to a set of eight values that are RRC-configured.

For a given slot n in which UCI is scheduled to be transmitted by the UE on a PUCCH or a PUSCH, multiple candidate locations for PDCCH receptions may have corresponding HARQ feedback transmissions in the given slot. The candidate locations are referred to as Monitoring Occasions (MOs). The set of MOs correspond to all possible MOs that could have had a HARQ ACK information scheduled in slot n. Counting the number of possible MOs may include 1) all slots in which DCIs scheduling PDSCHs with corresponding PUCCHs falling in slot n, and 2) accounting for the processing time of the PUCCH. For example, a slot with a potential DCI scheduling a PDSCH with corresponding PUCCH in slot n that does not allow enough time for the UE to process the PUCCH may not be counted as an MO in the set of MOs. When preparing the UCI to be conveyed in the PUCCH or the PUSCH, the UE accounts for all HARQ information bits corresponding to the MOs. The UE prepares the HARQ feedback in a HARQ codebook, which is then mapped onto the UCI. In Rel-16, there are two mechanisms for determining the HARQ codebook.

Type I HARQ codebook (semi-static): a UE assigns HARQ feedback bits for all possible PDSCH instances the HARQ feedback of which could be within slot n (includes MOs and active cells, irrespective of what is actually transmitted).

Type II HARQ codebook (dynamic): a UE assigns HARQ feedback bits for the MOs and active cells in which a PDSCH is actually transmitted.

The procedure for Type II HARQ codebook determination relies on the values of two counters that are typically indicated in the DL DCIs received in the MOs in the set of MOs. The two counters are referred to as a count downlink assignment indicator (C-DAI) and a total downlink assignment indicator (T-DAI). The value of C-DAI indicated in a DL DCI received in one MO m and a given serving cell c in the set of MOs may be used to indicate the incremented total number of DL DCIs transmitted by a gNB until the MO m and the serving cell c. The value of the C-DAI is represented as $$V_{C-DAI,c,m}^{DL}.$$

The value of T-DAI indicated in a DL DCI received in one MO in the set of MOs may be used to indicate the total number of DL DCIs transmitted by a gNB across all serving cells up until the MO m. The value of the T-DAI is represented as $$V_{T-DAI,m}^{DL}.$$

Figure 8:
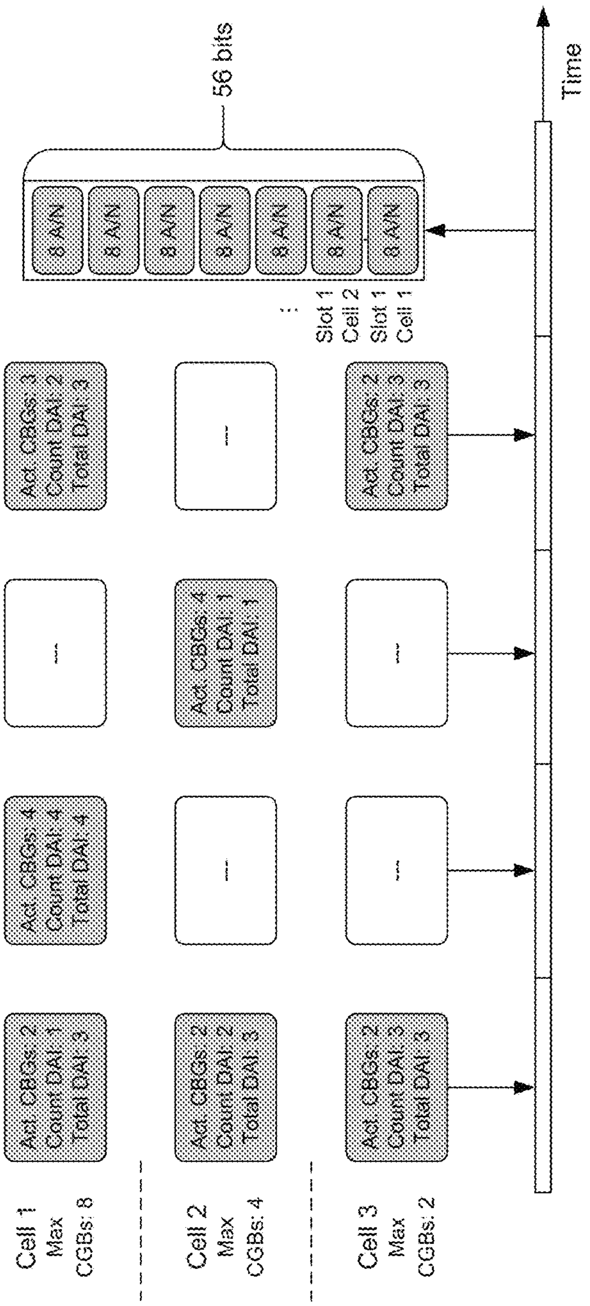
FIG. 8 depicts an example HARQ codebook determination for a Type II HARQ codebook based on Rel-16.

FIG. 8 depicts an example HARQ codebook determination for a Type II HARQ codebook based on Rel-16. In an example scenario depicted in FIG. 8, three serving cells are configured with particular values of maximum number of CBGs per TB $$N_{HARQ-ACK}^{CBG/TB,max}.$$

Rel-16 based HARQ codebook determination is based on the count DAI and total DAI being incremented based on the number of transmitted TBs. In the scenario depicted in FIG. 8, the resultant HARQ codebook size is 56 bits. Note that the A/N feedback bits based on the transmitted CBGs may be equal to 19 bits.

The procedure for determining a Type II HARQ codebook in Rel-16 is described in the following quote from the specification.

If the UE transmits HARQ-ACK information in a PUCCH in slot n and for any PUCCH format, the UE determines the $\tilde{o}_0^{ACK}$ , $\tilde{o}_0^{ACK}$ , ... , $\tilde{o}_{O_{ACK}-1}^{ACK}$ , for a total number of $O_{ACK}$ HARQ-ACK information bits, according to the following pseudo-code:

Set m = 0 – PDCCH with DCI format scheduling PDSCH reception, SPS PDSCH release or SCell dormancy indication monitoring occasion index: lower index corresponds to earlier PDCCH monitoring occasion Set j = 0

Set $V_{temp} = 0$

Set $V_{temp2} = 0$

Set $V_s = \emptyset\emptyset$

Set $N_{cells}^{DL}$ to the number of serving cells configured by higher layers for the UE

- if, for an active DL BWP of a serving cell, the UE is not provided coresetPoolIndex or is provided coresetPoolIndex with value 0 for one or more first CORESETs and is provided coresetPoolIndex with value 1 for one or more second CORESETs, and is provided ACKNackFeedbackMode = JointFeedback, the serving cell is counted two times where the first time corresponds to the first CORESETs and the second time corresponds to the second CORESETs

- if the UE indicates type2-HARQ-ACK-Codebook, a serving cell is counted $N_{PDSCH}^{MO}$ times where $N_{PDSCH}^{MO}$ is the number of PDSCH receptions that can be scheduled for the serving cell by DCI formats in PDCCH receptions at a same PDCCH monitoring occasion based on the reported value of type2-HARQ-ACK-Codebook Set M to the number of PDCCH monitoring occasion(s)

while m < M

Set c = 0 – serving cell index: lower indexes correspond to lower RRC indexes of corresponding cell while c < $N_{cells}^{DL}$ -continued if PDCCH monitoring occasion m is before an active DL BWP change on serving cell c or an active UL BWP change on the PCell and an active DL BWP change is not triggered in PDCCH monitoring occasion m
c = c + 1;
else
if there is a PDSCH on serving cell c associated with PDCCH in PDCCH monitoring occasion m, or there is a PDCCH indicating SPS PDSCH release or SCell dormancy on serving cell c
if $V_{C\text{-}DAI,c,m}^{DL} \leq V_{temp}$
j = j + 1
end if
$V_{temp} = V_{C\text{-}DAI,c,m}^{DL}$
if $V_{T\text{-}DAI,m}^{DL} = \emptyset\emptyset$
$V_{temp,2} = V_{C\text{-}DAI,c,m}^{DL}$
else
$V_{temp} = V_{T\text{-}DAI,m}^{DL}$
end if
if harq-ACK-SpatialBundlingPUCCH is not provided and the UE is configured by maxNrofCodeWordsScheduledByDCI with reception of two transport blocks for at least one configured DL BWP of at least one serving cell,
$\tilde{o}_{2\cdot T_D\cdot j+2(V_{C\text{-}DAI,c,m}^{DL}-1)}^{ACK}$ = HARQ-ACK information bit corresponding to the first transport block of this cell
$\tilde{o}_{2\cdot T_D\cdot j+2(V_{C\text{-}DAI,c,m}^{DL}-1)+1}^{ACK}$ = HARQ-ACK information bit corresponding to the second transport block
block of this cell
$V_s = V_s \cup \{2 \cdot T_D \cdot j + 2(V_{C\text{-}DAI,c,m}^{DL} - 1), 2 \cdot T_D \cdot j + 2(V_{C\text{-}DAI,c,m}^{DL} - 1) + 1\}$
elseif harq-ACK-SpatialBundlingPUCCH is provided to the UE and m is a monitoring occasion for PDCCH with a DCI format that supports PDSCH reception with two transport blocks and the UE is configured by maxNrofCodeWordsScheduledByDCI with reception of two transport blocks in at least one configured DL BWP of a serving cell,
$\tilde{o}_{T_D\cdot j+V_{C\text{-}DAI,c,m}^{DL}-1}^{ACK}$ = binary AND operation of the HARQ-ACK information bits corresponding to the first and second transport blocks of this cell
$V_s = V_s \cup \{T_D \cdot j + V_{C\text{-}DAI,c,m}^{DL} - 1\}$
else
$\tilde{o}_{T_D\cdot j+V_{C\text{-}DAI,c,m}^{DL}-1}^{ACK}$ = HARQ-ACK information bit of this cell
$V_s = V_s \cup \{T_D \cdot j + V_{C\text{-}DAI,c,m}^{DL} - 1\}$
end if
end if
c = c + 1
end if
end while
m = m + 1
end while $$V_{temp} = \left(j \bmod\left(\frac{4}{T_D}\right)\right)\times\left(\frac{4}{T_D}\right) + V_{temp}$$

if UE does not set $V_{temp2} = V_{DAI}^{UL}$ and $T_D = 2$
$V_{temp2} = V_{temp}$
end if $$j = \left\lfloor \frac{j \times T_D}{4} \right\rfloor$$

if $V_{temp2} = V_{temp}$
j = j + 1
end if
if harq-ACK-SpatialBundlingPUCCH is not provided to the UE and the UE is configured by maxNrofCodeWordsScheduledByDCI with reception of two transport blocks for at least one configured DL BWP of a serving cell,
$O^{ACK} = 2 \cdot (4 \cdot j + V_{temp2})$
else
$O^{ACK} = 4 \cdot j + V_{temp2}$
end if
$\tilde{o}_i^{ACK}$ = NACK for any $i \in \{0,1, \ldots , O^{ACK} - 1\}\backslash V_s$ When the UCI is multiplexed on a PUSCH, the scheduling UL DCI may also carry a T-DAI value $$\left(\text{referred to as } UL\ DAI \text{ and represented by } V_{DAI}^{UL}\right)$$

that is used by the UE in the HARQ codebook determination procedure. The procedure replaces the T-DAI value indicated by the DL DCI with the UL DAI value as described in the following quote from the specification.

| |
|---|
| If a UE multiplexes HARQ-ACK information in a PUSCH transmission that is scheduled by a DCI format that includes a DAI field, the UE generates the HARQ-ACK codebook as described in Clause 9.1.3.1, with the following modifications: |
| - For the pseudo-code for the HARQ-ACK codebook generation in Clause 9.1.3.1, after the completion of the c and m loops, the UE sets $V_{temp2} = V_{DAI}^{UL}$ where $V_{DAI}^{UL}$ is the value of the DAI field according to Table 9.1.3-2 |
| - For the case of first and second HARQ-ACK sub-codebooks, the DCI format includes a first DAI field corresponding to the first HARQ-ACK sub-codebook and a second DAI field corresponding to the second HARQ-ACK sub-codebook |
| - harq-ACK-SpatialBundlingPUCCH is replaced by harq-ACK-SpatialBundlingPUSCH. |

TABLE 9.1.3-1

| Value of counter DAI for $N_{C\text{-}DAI}^{DL} = 2$ and of total DAI | | |
|---|---|---|
| DAI MSB, LSB | $V_{C\text{-}DAI}^{DL}$ or $V_{T\text{-}DAI}^{DL}$ | Number of {serving cell, PDCCH monitoring occasion}- pair(s) in which PDSCH transmission(s) associated with PDCCH or PDCCH indicating SPS PDSCH release or DCI format 1_1 indicating SCell dormancy is present, denoted as Y and Y ≥ 1 |
| 0, 0 | 1 | $(Y - 1) \bmod T_D + 1 = 1$ |
| 0, 1 | 2 | $(Y - 1) \bmod T_D + 1 = 2$ |
| 1, 0 | 3 | $(Y - 1) \bmod T_D + 1 = 3$ |
| 1, 1 | 4 | $(Y - 1) \bmod T_D + 1 = 4$ |

TABLE 9.1.3-1A

| Value of counter DAI for $N_{C\text{-}DAI}^{DL} = 1$ | | |
|---|---|---|
| DAI | $V_{C\text{-}DAI}^{DL}$ | Number of {serving cell, PDCCH monitoring occasion}- pair(s) in which PDSCH transmission(s) associated with PDCCH or PDCCH indicating SPS PDSCH release or DCI format 1_1 indicating SCell dormancy is present, denoted as Y and Y ≥ 1 |
| 0 | 1 | $(Y - 1) \bmod T_D + 1 = 1$ |
| 1 | 2 | $(Y - 1) \bmod T_D + 1 = 2$ |

A UE interprets the value of and UL DAI according to the following Table.

TABLE 9.1.3-2

| Value of DAI | | |
|---|---|---|
| DAI MSB, LSB | $V_{T\text{-}DAI}^{DL}$ | Number of {serving cell, PDCCH monitoring occasion}- pair(s) in which PDSCH transmission(s) associated with PDCCH or PDCCH indicating SPS PDSCH release or DCI format 1_1 indicating SCell dormancy is present, denoted as X and X ≥ 1 |
| 0, 0 | 1 | $(X - 1) \bmod 4 + 1 = 1$ |
| 0, 1 | 2 | $(X - 1) \bmod 4 + 1 = 2$ |
| 1, 0 | 3 | $(X - 1) \bmod 4 + 1 = 3$ |
| 1, 1 | 4 | $(X - 1) \bmod 4 + 1 = 4$ |

There is, however, an exception for the case of UL DAI. Namely when $$V_{DAI}^{UL} = 4,$$

a UE interprets this condition as follows: Total number of DCIs=4 if a UE receives at least one PDCCH carrying DL DCI up until the last MO or it has SPS A/N bits. Total number of DCIs=0 if a UE does not receive any PDCCH carrying DL DCIs up until the last MO and does not have any A/N corresponding to a SPS PDSCH reception. With such behaviour, the following two solutions are indistinguishable from a UE point of view: if the UE does not receive any PDCCH and is indicated $$V_{DAI}^{UL} = 4,$$

then: Situation 1: A UE may have missed all scheduled DCIs, in which case the UE should have indicated 4 NACKs for DG PDSCHs in addition to SPS A/N bits, if any. Situation 2: There may have not been any scheduled DCIs, in which case a UE should not send any HARQ feedback bits for those DCIs, for DG PDSCHs in addition to SPS A/N bits, if any.

This interpretation of $$V_{DAI}^{UL} = 4$$

assumes situation 2, which may cause an error if the actual scheduling resembles situation 1. Situation 1 may, however, be more unlikely than situation 2.

Potential Issues Associated with SPS Configurations and XR Traffic

Potential issues associated with SPS configurations in the context of packet arrivals with delay budgets may include the following. Packet arrival times may be quasi-periodic with periodic mean arrival time and jitter distribution in determining the actual arrival times. This may be an issue for legacy SPS configurations due to the following situations. SPS periodicities may not be aligned well with mean arrival times, which may create a mismatch between SPS occasions and actual packet arrival times. The jittery nature of packet arrival times may prevent a gNB from finding a suitable SPS occasion for the delivery of the packet within delay budget.

Packet sizes may largely vary in size. This may cause issues in SPS configurations with semi-static PDSCH occasion allocations. SPS configurations that are semi-statically allocated with large enough resource allocation to accommodate the largest possible packet size may cause to a waste of resources.

Power saving concerns may exist for various NR applications, e.g., in XR applications. In such applications, limiting the processing effort of UEs may be preferable, which goes against some SPS configurations targeting the aforementioned packet traffic model, such as SPS overprovisioning.

Solutions

The subject matter disclosed herein provides various enhancement aspects related to XR. The aspects disclosed herein include 1) enhancement to the SPS configurations to match XR traffic; 2) enhancements to the power saving and/or resource utilization when delivering XR traffic; and 3) HARQ enhancements related to XR traffic and the use of SPS configurations. Additionally, aspects relating to SPS Physical Downlink Shared Channel (PDSCH) enhancements may be extended to configured grant (CG) Physical Uplink Shared Channel (PUSCH). When indicated, some terms may be interchanged as provided by the following examples. Transmitter/receiver pairs may be UE/gNB for CG instead of gNB/UE in SPS. Decoding/encoding may be performed by a gNB or a UE for CG instead of a UE or a gNB in SPS. Transmission direction may be UL for CG instead of DL in SPS. Configuring RRC parameters may be related to PUSCH instead of PDSCH, e.g., PUSCH-Config instead of PDSCH-Config.

SPS Configuration Enhancements

The following enhancements target SPS configurations in order to be better suited for the delivery of XR packet delivery. These aspects may be related to the actual configurations of SPS occasions (e.g., periodicity, resource allocations for each SPS occasion, handling varying packet sizes).

Enhancing SPS Configuration Periodicity to Match XR Traffic

In one aspect of the example embodiments disclosed herein, SPS configurations may be enhanced to account for mean packet arrival times that are non-integer numbers of msecs. For this enhancement, more SPS periodicities may be allowed to be configured that are non-integer values, e.g., 16.67 ms. Schemes presented herein may be readily extended to the case of CG-PUSCH configurations to allow non-integer periodicities.

Specifying the periodicity of an SPS configuration in terms of non-integer values, e.g., 16.67 ms, may not be aligned with the slot/symbol boundaries. Therefore, determining the actual SPS occasion (i.e., in terms of symbols and slots) that align with the target periodicity (e.g., 16.67 ms) may utilize specification. To better demonstrate such a specification, a "Point P" may be denoted as the point indicated by using a non-integer period when determining the slot for an SPS occasion. An assumption may be that a Point P has been determined when determining a specific SPS occasion. Then, given a Point P, the actual slot carrying the SPS occasion may be selected as follows. Method 1: the latest slot with a starting point that is before Point P. Method 2: the earliest slot with a starting point that is after Point P. Method 3: the slot with a starting point that is closest in time to Point P.

Figure 9:
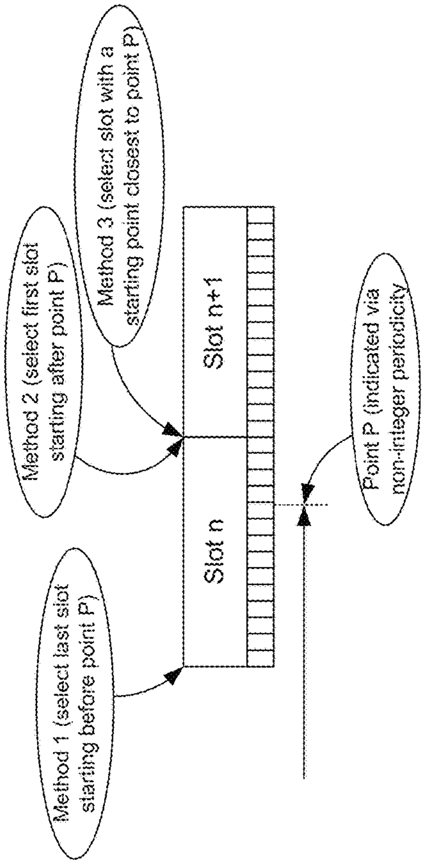
FIG. 9 depicts three example methods of enhancing SPS configuration periodicity to match XR traffic according to the subject matter disclosed herein.

FIG. 9 depicts three example methods of enhancing SPS configuration periodicity to match XR traffic according to the subject matter disclosed herein. Determining the SPS occasion may use a determination of the time resources (OFDM symbols) within the SPS slot. In one approach, a starting symbol of the SPS occasion may be implicitly determined based on the SPS periodicity in which this approach is referred to as an "implicit SLIV" determination. According to the implicit SLIV (Start and Length Indicator for time domain allocation in PDSCH) approach, the time domain resources for the SPS occasion may be determined by specifying the starting symbol of the set of resources which is the symbol closest to Point P. So, for method 1-a, the starting symbol is in the latest slot with starting point before Point P. For method 2-a, the starting symbol is in the earliest slot with starting point after Point P. For method 3-a, the starting symbol is in the slot that results in the starting symbol of the set of resources that is closest to Point P.

Figure 10:
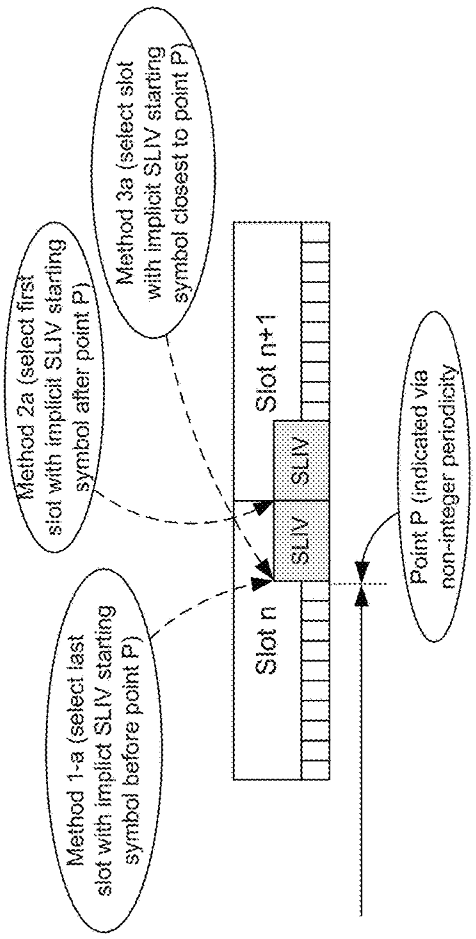
FIG. 10 depicts variations of three example methods of enhancing SPS configuration periodicity to match XR traffic according to the subject matter disclosed herein.

FIG. 10 depicts variations of three example methods of enhancing SPS configuration periodicity to match XR traffic according to the subject matter disclosed herein. Note that in the three example methods depicted in FIG. 10, the duration of the SPS occasion may be implicitly or explicitly determined (either via RRC configuration or dynamic indication). Knowing the starting symbol and duration of the SPS occasion therefore implies the implicit determination of the SLIV, which is the reasoning behind the naming of the approach.

Alternatively, an explicit SLIV may be configured/indicated to the UE for the SPS configuration. In this case, determining the resources for the SPS occasion may use the determination of the SPS slot, in which the explicitly configured/indicated SLIV would map to actual resource selection. This approach is referred to as "explicit SLIV" determination. Then, given a Point P, the actual slot carrying the SPS occasion may be selected as the slot with starting symbol indicated by the SLIV within the slot in which the starting symbol is determined as follows. Method 4: the starting symbol is the latest slot before Point P. Method 5: the starting symbol is the earliest slot after Point P. Method 6: the starting symbol is the closest slot to Point P.

Figure 11:
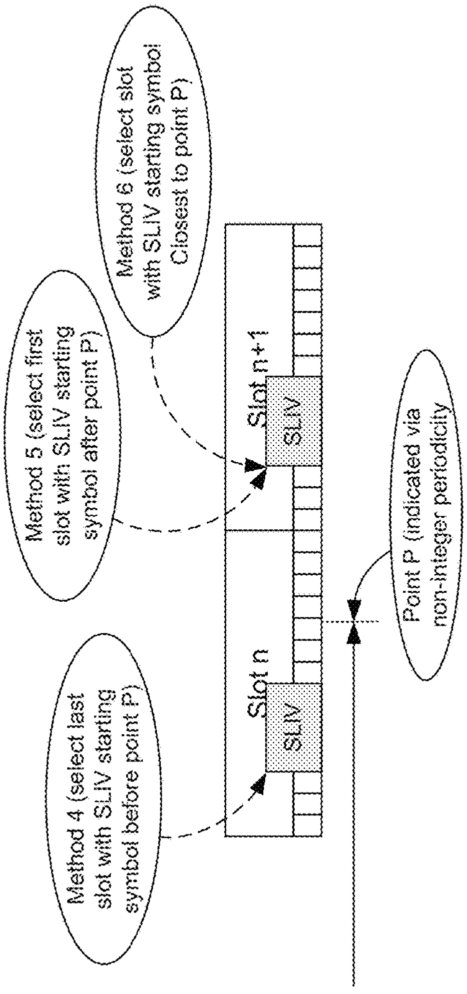
FIG. 11 depicts three additional example methods of enhancing SPS configuration periodicity to match XR traffic according to the subject matter disclosed herein.

FIG. 11 depicts three more example methods of enhancing SPS configuration periodicity to match XR traffic according to the subject matter disclosed herein. In some embodiments, a gNB may configure a UE with SPS periodicity in the units of symbols or multiple of symbols. This may allow the SPS periodicity to have a finer granularity that may be closer to the 16.67 ms. With such periodicity configuration, the 16.67 ms period still may not be achieved, and a potential misalignment between PDSCH occasions and SPS periodicity may occur gradually over time. In this case, a gNB may also send occasional indication to a UE to fix such misalignment. The occasional indication may be in the form of DCI or MAC CE indication or others.

Handling Variable Packet Sizes and/or Uncertain Packet Arrival Time

SPS Occasions to Accommodate Multiple TBs

In some embodiments, a gNB may configure a UE with multiple PDSCH occasions within the same SPS period. The multiple PDSCH occasions may be used to provide a gNB with multiple transmission opportunities of a single TB to cope with packet arrival time uncertainty or multiple transmission opportunities for multiple TBs to cope with packet size uncertainty, more details on how to handle both cases are described later herein. The schemes presented here may also be extended to the case of CG-PUSCH instead of SPS-PDSCH.

In legacy NR, an SPS configuration may be configured with SPS occasions along with potential slot aggregations or repetitions in which an SPS configuration with L slot aggregations indicates that SPS occasion is configured in a given slot and L−1 repetitions may follow in the next L−1 consecutive/available slots. In legacy NR, however, the additional L−1 slots may be used for sending repetitions of the same TB that was transmitted in the original SPS occasion. In one approach, this configuration may be enhanced so that different TBs may be transmitted in any slot in the set of L slots. This may allow the legacy SPS configuration to accommodate the transmission of multiple TBs, or to transmit a single TB with an uncertain availability time.

An indication may be provided to the UE whether the set of L slots may be used only for PDSCH repetition (legacy behavior) or for sending one TB in any slot or sending multiple TBs in different slots of the set of slots. Mechanisms to determine whether a TB is available or not in the slot as described herein may be used. An SPS configuration may be configured with an additional indication of which of the L slots may potentially carry a new TB. This additional indication may be 1) in the form of a bit map, 2) in the form of a cyclic pattern, or 3) by implicit determination, e.g., only slots with an indicated RV0 may be used for transmitting a new TB.

Figure 12:
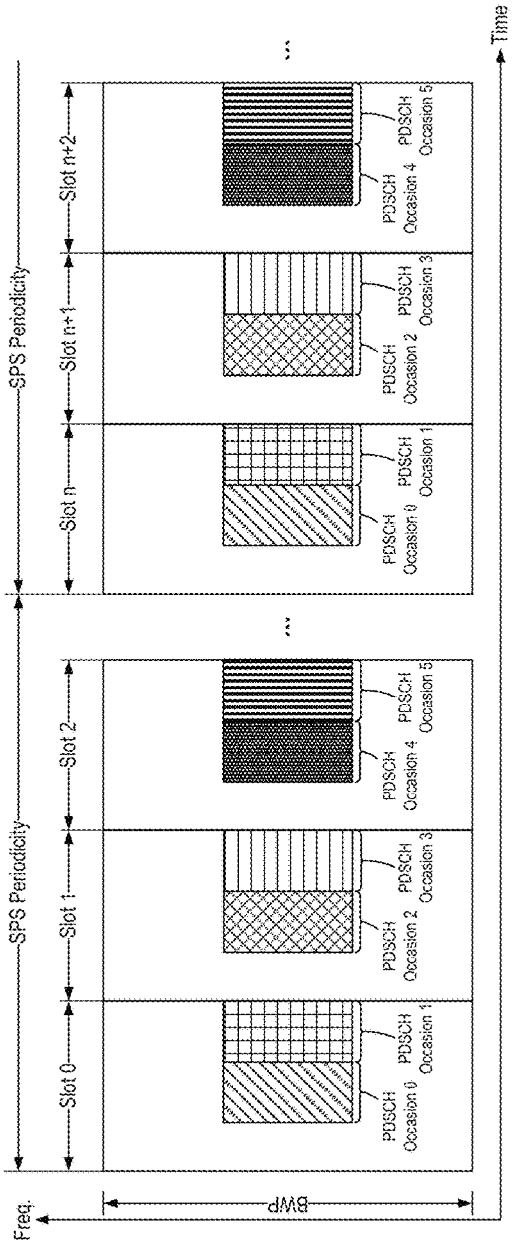
FIG. 12 depicts an example in which a gNB provides a UE with the number of consecutive SPS PDSCH occasions, per SPS period, within a slot and the number consecutive slots in which SPS PDSCH occasions repeat according to the subject matter disclosed herein.

FIG. 12 depicts an example in which a gNB provides a UE with the number of consecutive SPS PDSCH occasions, per SPS period, within a slot and the number consecutive slots in which SPS PDSCH occasions repeat according to the subject matter disclosed herein. Such information may be provided through higher-layer signaling, such RRC parameters SPS-nrofPDSCH-InSlot and SPS-nrofSlots, respectively.

Figure 13:
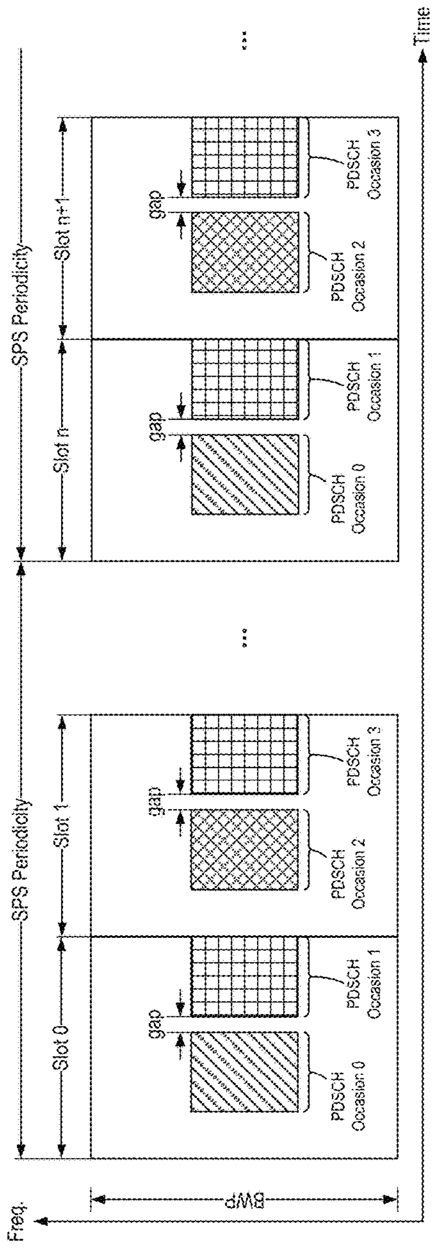
FIG. 13 depicts a gNB may provide a UE with the time gap between SPS PDSCH occasions in the same slot according to the subject matter disclosed herein.

Although in the example depicted in FIG. 12, the SPS PDSCH occasions are consecutive within a slot and occupy consecutive slots per SPS period, in general, SPS PDSCH occasions may be non-consecutive within a slot or occupy non-consecutive slots. To this end, FIG. 13 depicts a gNB may provide a UE with the time gap between SPS PDSCH occasions in the same slot according to the subject matter disclosed herein. The gap value may be configured through higher-layer signaling, such as RRC parameter SPS-gap, that may be in units of OFDM symbol. Moreover, through higher-layer signaling, a gNB may configure a UE with multiple gap values and select one value either through MAC-CE or DCI that is used to activate a SPS grant. For example, a new field having a bit width of $\log_2$ (number of indicated SPS gap values) may be introduced in DCI that activates a SPS.

Figure 14:
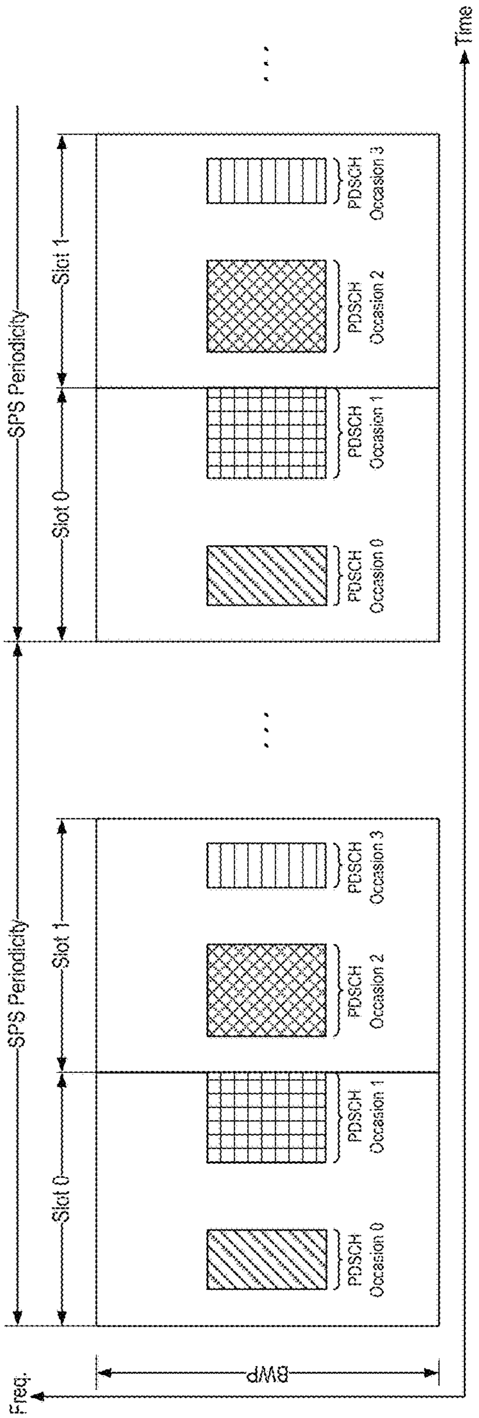
FIG. 14 depicts an example in which SPS PDSCH occasions in a SPS period have different SLIV values and the same pattern repeats every SPS period according to the subject matter disclosed herein.

In alternative embodiments that provide more flexibility, different SPS PDSCH occasions within the same slot may have different SLIV values with different lengths and gaps between any two SPS PDSCH occasions. FIG. 14 depicts an example in which SPS PDSCH occasions in a SPS period have different SLIV values and the same pattern repeats every SPS period according to the subject matter disclosed herein. Additional details on the resource allocation of different SPS occasions are provided in the following sections.

As another way of configuring SPS PDSCH occasions occupying non-consecutive slots may be to define a bit map that points to which slot carries a SPS PDSCH occasion within a SPS period. The bit map may be provided through higher-layer signaling, such as a RRC parameter SPS-slot-bitmap. For example, a gNB may indicate SPS PDSCH occasion(s) in the first slot and then the same pattern may be repeated in the slots having a corresponding bit in the SPS-slot-bitmap that is set to one. The most significant (left) bit of SPS-slot-bitmap may represent the first slot after the slot that is indicated to carry SPS PDSCH occasion(s) by the SPS activating DCI. The second most significant (left) bit of SPS-slot-bitmap may represent the subsequent slot and so on. A UE may expect that the least significant bit may be set to 1 to indicate the last slot carrying SPS PDSCH occasion within SPS period.

Figure 15:
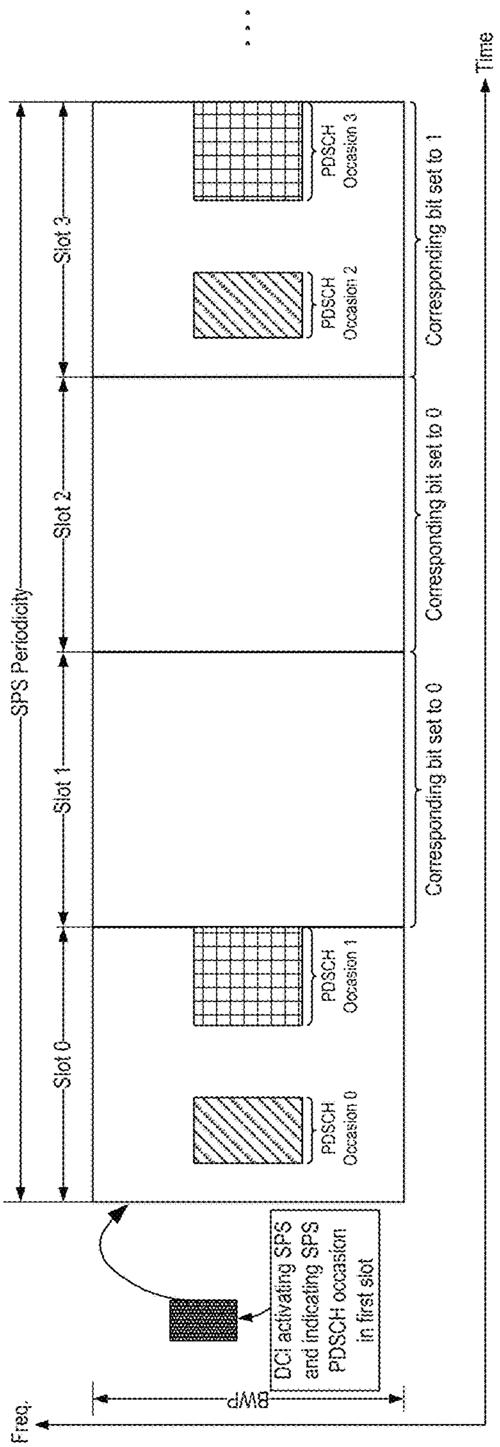
FIG. 15 depicts an example embodiment in which SPS activation DCI indicates the SPS PDSCH occasions in slot 0 according to the subject matter disclosed herein.

FIG. 15 depicts an example embodiment in which SPS activation DCI indicates the SPS PDSCH occasions in slot 0 according to the subject matter disclosed herein. Moreover, SPS-slot-bitmap is set to 001 in which the most significant and the second most significant bits respectively correspond to Slot 1 and Slot 2 and indicate that they do not carry any SPS PDSCH occasions. The least significant bit corresponds to Slot 3 and indicates that it carries a SPS PDSCH occasion using the same pattern of Slot 0.

Note that the slot corresponding to the least significant bit in SPS-slot-bitmap may be, for example, the last slot in the SPS period as depicted in FIG. 15. In general, however, a bit map may only correspond to the first few slots in which the slot corresponding to the least significant bit in SPS-slot-bitmap may not be the last slot in the SPS period.

Resource Allocations for SPS Occasions

Various example embodiments are presented in this section that provide the resource allocations for each of the SPS occasions. The concepts here include providing one or more potential resource allocation for SPS occasions with possible dynamic selection of which resource allocation to be configured using the notion of states to provide multiple potential resource allocations, and how the resource allocations may vary between different potential SPS occasions configurations. Most of the concepts disclosed herein may also be applicable to the case of CG-PUSCH in which resource allocation for CG occasions may be provided.

To address the issue of time-varying packet size, configuration of the SPS occasions may be adapted to accommodate the size of the upcoming packet(s). To do so, a SPS configuration may be amended with a set of N states. The N states may be configured via RRC and/or activated via MAC-CE for the SPS configuration. Each of the N states may be associated with a certain resource allocation configuration, e.g., certain time/frequency resource allocation, certain MCS configuration, and/or others. Alternatively, each of the N states may be configured with some information about the resource allocation that may potentially vary among states, while other information about the resource allocation may be common in all states. For example, all states may share the same activated TDRA SLIV indication for time resource allocation, while each state differs in the configured FDRA allocation. This alternative may allow a low-overhead implementation of a scheme. As another alternative, each state may correspond to a different scaling of the amount of allocated resources. For example, after activation, a gNB may indicate a scaling factor in the upcoming DCI to scale the number of allocated resources in frequency domain (PRB, PRG etc.) by a certain value. The change in the used state for SPS occasions may be dynamically indicated from a gNB using, for example, a DCI (either stand-alone or multiplexed on PDSCH).

Figure 16:
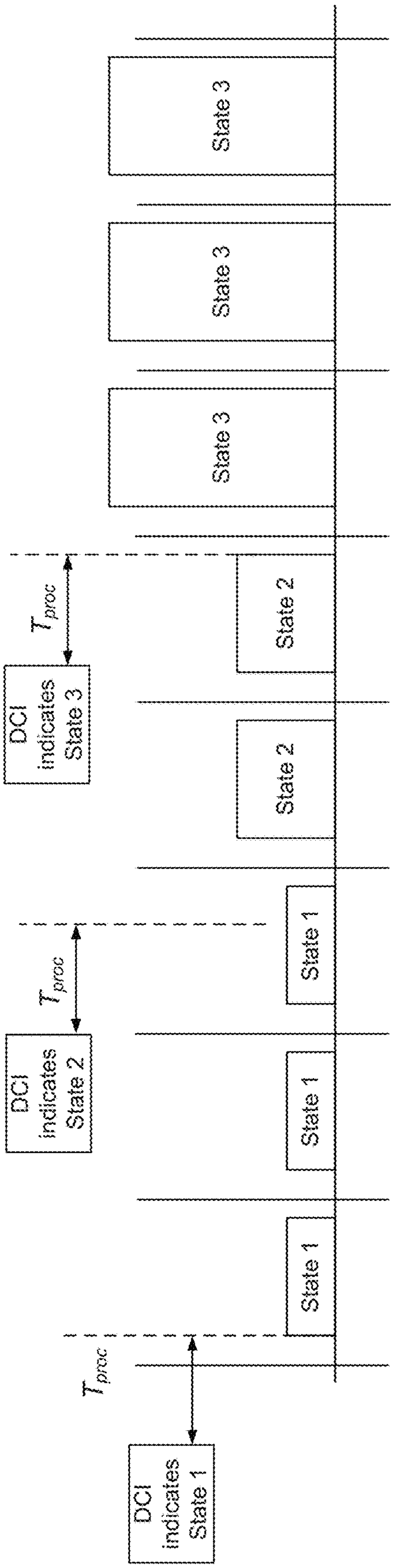
FIG. 16 depicts a general scenario of configuring SPS occasions to accommodate a size of the upcoming packets according to the subject matter disclosed herein.

FIG. 16 depicts a general scenario of configuring SPS occasions to accommodate a size of the upcoming packets according to the subject matter disclosed herein. The aforementioned method may also be used while replacing the roles of TDRA and FDRA resource allocations in the description of the solution, that is, states may, for example, differ in their time allocation with fixed frequency allocation.

As can be seen in the example embodiment depicted in FIG. 16 that upon indication of a certain state by the DCI, the resource amount for the upcoming SPS PDSCH occasions changes. The change may be only applied to a specific time window or until a next DCI indicated a certain state. In FIG. 16, the TDRA SLIV is assumed to be fixed and not change with a state-indicating DCI. In FIG. 16, it should be understood that although the different states 1-3 are shown as becoming increasingly larger in size, it should be understood that SPS occasion state configuration may be of any size.

In an alternative embodiment, a gNB may configure a UE via a RRC with one or multiple time-domain bitmap pattern, similar to current bitmap for rate matching PDSCH or PDSCH repetition Type-B invalid symbols. A value of “0” for a time duration with PDSCH occasion implies that the PDSCH occasions are not expected to be received by a UE, that is, a gNB does not commit the transmission, while a value of “1” indicates normal reception of the SPS occasions.

In some embodiments, to accommodate time-varying packet size for XR, a gNB may configure SPS configurations to accommodate the maximum packet size it predicts. With such a configuration and no further enhancement, XR packets with any size may be transmitted with the provided occasions. An issue when packet size becomes smaller for some occasions will not be used for the UE and power consumption due to attempting those occasions may be unnecessarily large. With the aforementioned enhancement based on a time-domain pattern, a gNB may further indicate to a UE to not attempt decoding of those occasions. Upon arrival of a new XR packet and depending on its size and periodicity, a gNB may dynamically indicate to a UE an applicable time-domain pattern from the arrival time onward.

Figure 17:
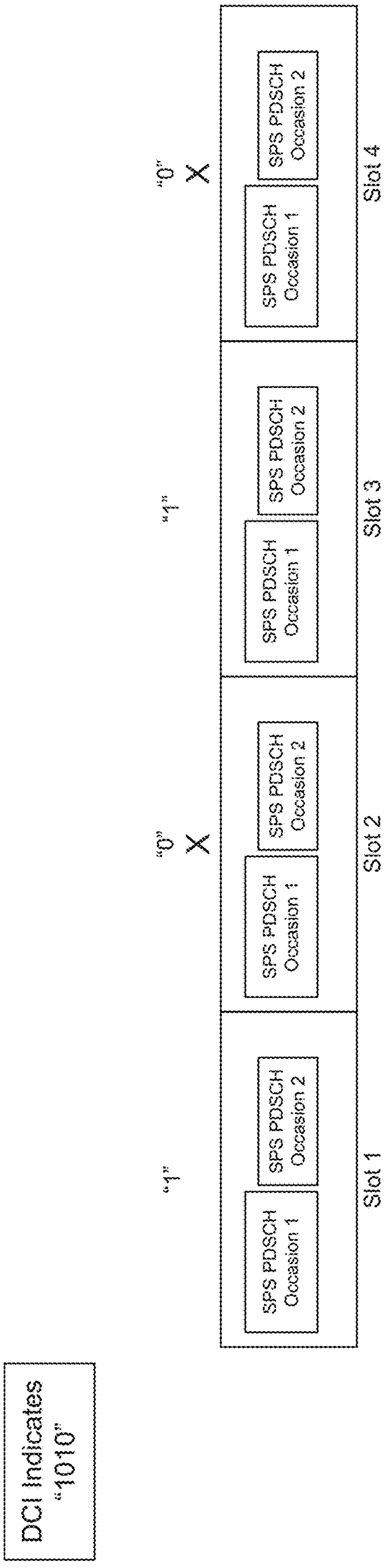
FIG. 17 depicts an example embodiment of a scenario in which a gNB has initially configured two SPS configuration with periodicity of 1 slot to accommodate XR traffic with short periodicities and a maximum packet size according to the subject matter disclosed herein.

FIG. 17 depicts an example embodiment of a scenario in which a gNB has initially configured two SPS configuration with periodicity of 1 slot to accommodate XR traffic with short periodicities and a maximum packet size according to the subject matter disclosed herein. If XR traffic becomes smaller in packet size and larger periodicity, then the gNB may transmit a PDCCH indicating a proper time-domain pattern that matches the new traffic statistic best. In this example, with traffic periodicity of 2 slots, a UE does not attempt decoding of occasions in slot 2 and 4.

An alternative scheme may be when a time-domain pattern is applied per SPS configuration. This may provide more flexibility for a gNB to match the applicable occasions with the new traffic characteristics. For instance, in the example scenario depicted in FIG. 17, if packet size also changes to be smaller so that one SPS configuration is sufficient, a gNB may indicate “1010” for one SPS configuration, for example, the first occasion of two occasions in each slot, and indicate “0000” for the second occasion of two occasions in each slot.

In some embodiments, the methods depicted in FIG. 17 may be based on overprovisioning and then filtering unnecessary occasions may be the missing DCI issue. If a UE misses the DCI, the UE will keep decoding the empty occasions. Therefore, a gNB should ensure a high reliability for PDCCH using high Aggregation Levels (AL) values and new features introduced in Rel-17 M-TRP PDCCH repetitions. Furthermore, if the DCI payload size may be made very small, for example, a special new DCI format, the effective coding rate may be further reduced on top of large AL and PDCCH repetition. It is noteworthy that the issue of missing a DCI already exists to a large extent in Rel-16 with multiple active SPS configurations, and it is the responsibility of a gNB to mitigate the issue via the mentioned tools as well proper scheduling, for example, not including too many SPS activations and releases in the same (e)-Type 2 HARQ-CAK CB.

The subject matter disclosed herein also provides various embodiments and mechanisms for specifying/configuring resource allocations of each SPS occasion/state. To this end, a gNB may provide a UE with multiple SLIV or K0 values for different SPS PDSCH occasions within the same SPS period. This may be realized by enhancing the PDSCH-TimeDominResoruceAllocation so that some rows of the TDRA table may have multiple parameters of SLIV, K0, or mappingType. Upon activating a particular SPS grant or receiving dynamic signaling indicating SPS occasions state, if the ‘Time domain resource assignment’ field value of the DCI points to a row with multiple SLIV or K0, a UE may determine the number of SPS PDSCH occasions within a SPS period. Alternatively, the SPS PDSCH configuration may have RRC parameters that specify the SPS PDSCH occasion allocations in each SPS period in which in each period multiple occasions may be configured with potentially different SLIV or K0 values. Alternatively, the SPS PDSCH configuration may have some RRC parameters that provide some partial information about the allocation of SPS PDSCH occasions within a period, while a dynamic indication (e.g., via DCI or MAC CE) indicates the remaining information for determining the allocation of SPS PDSCH occasions.

Providing multiple K0 values enables a gNB to configure the SPS PDSCH occasions to occupy non-consecutive slots by indicating different K0 for each SPS PDSCH occasion. If a single K0 value is indicated, a UE may assume that the indicated SLIV values correspond to SPS PDSCH occasions in consecutive slots.

Similar to using separate SLIVs for different SPS PDSCH occasions within SPS period, a separate “frequency domain resource assignment” may be introduced in the DCI activating the SPS configuration or dynamically indicating SPS occasions states. In other words, there is dedicated FDRA field for each SPS PDSCH occasion within SPS period in the DCI activating SPS.

Figure 18:
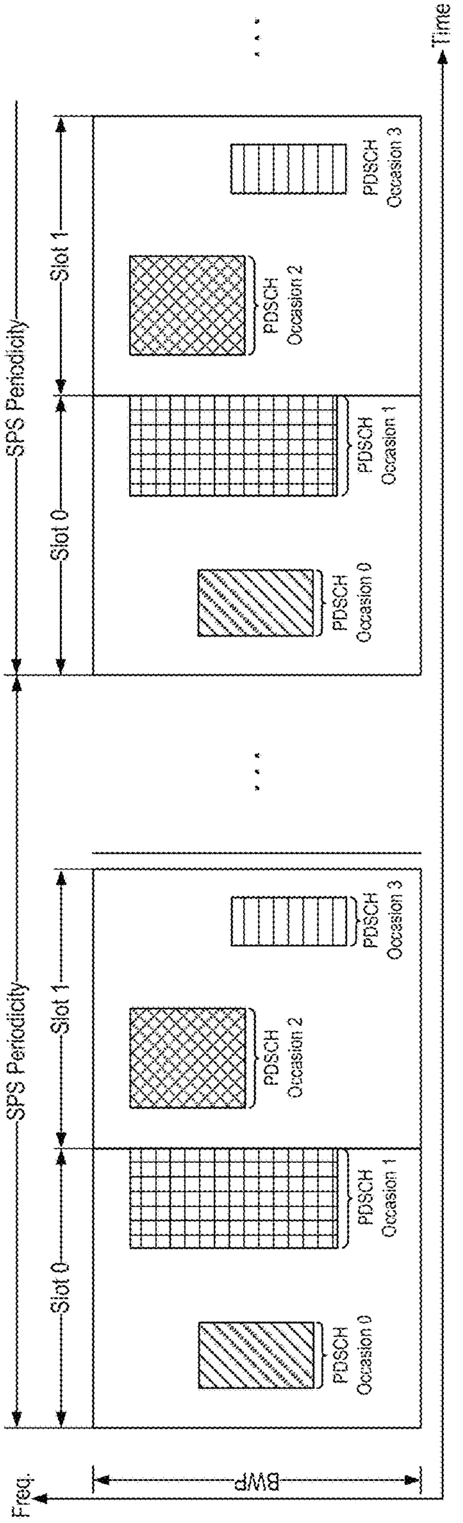
FIG. 18 depicts an example embodiment of an SPS configuration with SPS occasions that vary in time and frequency resource allocations according to the subject matter disclosed herein.

FIG. 18 depicts an example embodiment of an SPS configuration with SPS occasions that vary in time and frequency resource allocations according to the subject matter disclosed herein. In an alternative mechanism, a UE may be configured with multiple SPS configurations that would jointly provide the allocation of PDSCH occasions as described above, that is, the set of PDSCH occasions may be made available via the resource allocations provided by a union of SPS configurations. Then, a gNB may simultaneously activate multiple of the SPS configurations jointly via the same activating DCI. This activation may by using the HARQ process ID field in which one codepoint can map to a set of multiple SPS occasions. Alternatively, additional RRC configuration may be provided to a gNB that may associate multiple SPS configurations with each other, and in which activating/deactivating one configuration may correspond to activating/deactivating the associated ones as well.

Reducing Overhead Associated with SPS Configurations

Additionally, the embodiments disclosed herein may also be applicable to the case of CG-PUSCH by considering CG PUSCH occasions instead of SPS PDSCH occasions.

To keep a DCI payload size reasonable especially when there are many SPS PDSCH occasions may be configured within a SPS period, a single FDRA field may be carried in the activation DCI while frequency-domain offset values may be applied for different SPS PDSCH occasions. In other words, a single FDRA value indicated in the activation DCI may be applied to the first PDSCH occasion. For the remaining SPS PDSCH occasions, offsets may be applied relative to reference point. For example, the offset may be between the first PRB of the SPS PDSCH occasion and the first PRB of the first SPS PDSCH occasion. The offset values may be configured through higher-layer signaling and may take positive or negative values, in addition to zero (indicating the same first PRB of the first SPS PDSCH occasion). In general, determination of SPS PDSCH occasions may be performed via implicit rules. For example, one SLIV and/or K0 value may be indicated, and SPS PDSCH occasions may be determined as PDSCH occasions that alternate among different frequency allocations in which the frequency allocations may be either dynamically or RRC configured.

Figure 19:
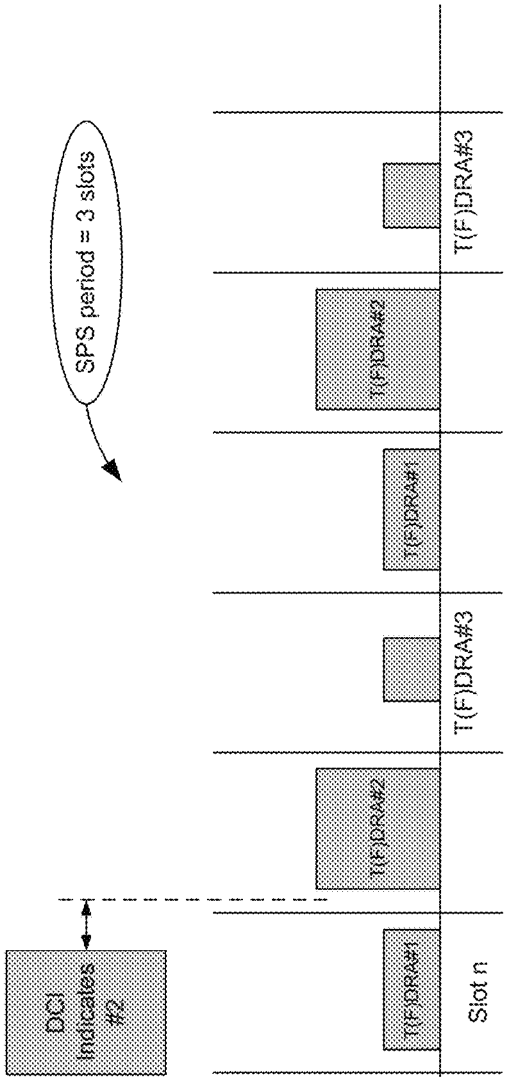
FIG. 19 depicts an example scenario in which a SPS configuration may be associated with multiple TDRA SLIVs and/or FDRA resource allocation via RRC or the activation DCI according the subject matter disclosed herein.

FIG. 19 depicts an example scenario in which a SPS configuration may be associated with multiple TDRA SLIVs and/or FDRA resource allocation via RRC or the activation DCI according the subject matter disclosed herein. The SPS configuration may also be configured with multiple gap values that are to be used between different SPS occasions. As depicted in FIG. 19, the SPS configuration may be associated with, for example, three T(F)DRAs, T(F)DRA #1, T(F)DRA #2 and T(F)DRA #3. Depending on the size of the arrived packet, a gNB may dynamically indicate which T(F)DRA SLIV starts the SPS PDSCH. Then, a cyclic index may be used to this end to avoid DCI overhead. For example, with SLIV #1, #2 and #3, an indication of #1 by the DCI means #1, #2, #3, respectively, while indication of #2 and #3 respectively mean #2, #3, #1 and #3, #1, #2.

SPS Occasion Bundling

Some embodiments disclosed herein may also be used to define CG occasions bundling in the case of CG-PUSCH, similar to SPS occasions bundling in case of SPS PDSCH. In some embodiments, an SPS configuration may be configured with multiple SPS occasions. The SPS occasions may be independent of each other. Alternatively, the SPS occasions may be sets of consecutive SPS occasions that are coupled/related/bundled together. The coupling can be, for example, to use the set of occasions for the delivery of data belonging to the same packet using a single TB or multiple TBs.

Regarding the coupling of SPS occasions, the sets of SPS occasions may be determined explicitly via appropriate indication. The indication may be semi-static in the form of RRC configuration. Alternatively, the indication may be via dynamic signalling in the form of DCI information or MAC CE.

The sets of SPS occasions may be determined as consecutive sets in which each set includes an equal number of K occasions, in which the set of occasions are all consecutive occasions. Alternatively, the sets of SPS occasions may be determined based on some rules. For example, a set of SPS occasions may be a consecutive set of occasions in which the first of such occasions may be determined based on some rule and in which the number of occasions in a set may be determined based on some rule. Some examples of rules for the determination of the starting occasion and the size of the occasions set follow.

For the ith packet, let packet size be $P_i$. The packet size may be used to determine the number of occasions for the delivery of the packet. If each of the configured SPS occasions may be used to deliver a TB of size B. Then, the number of SPS occasions in the SPS occasion set used for delivering the ith packet may be determined by ceil($P_i$/B).

For the ith packet, let the arrival time of the packet be $t_i$. The set of SPS occasions to be used for the delivery of the packet may be determined by specifying the first occasion in the set of SPS occasions, such that the first occasion ensures that the PDSCH associated with the occasion is delivered no later than $t_i+d_i$ in which $d_i$ is the delay tolerance associated with the packet. The delay tolerance may be, for example, equal to the Packet Delay Budget (PDB) of the packet. Alternatively, the set of SPS occasions may be determined by specifying the set of occasions such that the PDSCHs associated with the occasions in the set are all delivered no later than $t_i+d_i$. Alternatively, the set of SPS occasions may be determined by specifying the set of occasions such that the PDSCHs associated with a certain subset of the occasions in the set are all delivered no later than $t_i+d_i$. The certain subset can be, for example, the set of SPS occasions within the set used for the transmission of data belonging to the packet. The certain subset may be a non-unique subset.

An alternative timing rule in replacement to the aforementioned timing rule may be based on the start/ending time of the PDSCH occasion instead of the delivery time of the PDSCH. Another rule that may be used for the determination of the set of SPS occasions is that the occasions in the set start no earlier than $t_1$. Another rule may be that the set of bundled SPS occasions may be the set of occasions within one SPS periodicity.

The indication of a set of SPS occasions used for the delivery of a packet may be based on RRC configurations or dynamic indication. For a dynamic indication, the indication of a set of SPS occasions may be done using DCI signaling or MAC CE or other forms.

Alternatively, a set of bundled SPS occasions may be used to deliver a single TB, and in which the set exists to account for the varying nature of the arrival time for the packet. In this case, one occasion in the bundled set may be used for the delivery of the TB. A more dynamic decoding nature of the SPS occasions may therefore be utilized to reduce the decoding burden of a UE and potentially achieve power saving. Additional details follow.

If both schemes (only single TB, or multiple TBs can be transmitted with SPS bundled set) are supported, a gNB may configure/indicate to a UE which scheme is used. For example, higher-layer signaling, such as a RRC parameter SPS-SchemeType may configure with single or multiple TBs, may be expected with the SPS bundled set.

Enhancing Power Saving and/or Resource Utilization

Some example embodiments disclosed herein may allow XR traffic to be delivered in a more power saving manner and with potentially more efficient resource utilization. The example embodiment include limited decoding behaviour, using dynamic signalling to enable/disable SPS occasions for XR packet delivery, and using dynamic signalling to change SPS occasions allocations. Issues relating to multiplexed/piggybacked DCI on PDSCH and timing relations with dynamic signalling with respect to SPS occasions are discussed in a separate subsection.

In some embodiments, dynamic information may be used to adapt the SPS configuration to better match the kind of traffic that is expected to be delivered. For instance, dynamic information may be used to enable/disable certain SPS occasions in anticipation that the SPS occasions are used for delivery of XR packets. Dynamic information may be used to change the resource allocation of some SPS occasions to match expected packet and TB sizes that are to be transmitted via SPS occasions. A change in resource allocation can be, for example, in terms of changing the resource allocation of some of the SPS occasions by changing the time resource allocation or frequency resource allocation. This may be done, for example, by selecting one of the multiple values configured for the SPS configuration as per the disclosure above. A change resource allocation may also be, for example, in the form of selecting a new state for one or multiple SPS occasions. The dynamic information may be applicable to a particular SPS occasion, to a certain time duration and all the SPS occasions within, or may affect one or multiple bundles of SPS occasions.

Dynamic Decoding of SPS PDSCH Occasions

Due to an uncertainty of the TB arrival time, in some embodiments any of the configured SPS PDSCH occasions within SPS period/within a set of bundled SPS occasions may be used to carry the TB. Assuming that a single TB may be transmitted within SPS period, a UE may monitor the first configured SPS PDSCH occasion. If no SPS PDSCH is detected, a UE may continue monitoring the subsequent SPS PDSCH occasions. Once SPS PDSCH is detected, a UE may stop monitoring the remaining SPS PDSCH occasions.

As only one TB is expected within the SPS period, a UE may be expected to generate a single HARQ ACK/NACK bit for the one TB regardless the number of configured SPS PDSCH occasions within SPS period. Additional details regarding HARQ behavior associated with this example enhancement are provided below.

In the case that multiple TBs may possibly be transmitted within a single SPS bundled set, a UE may determine whether a gNB has transmitted PDSCH or not. To assist a UE in making such determination in the SPS occasion in which a gNB does not intend to transmit PDSCH, the gNB may instead transmit signal/channel indicating that the SPS occasion does not carry any PDSCH. For example, a gNB may transmit a special DMRS sequence (without any PDSCH) in the unused SPS occasion for regular PDSCH transmission.

Figure 20:
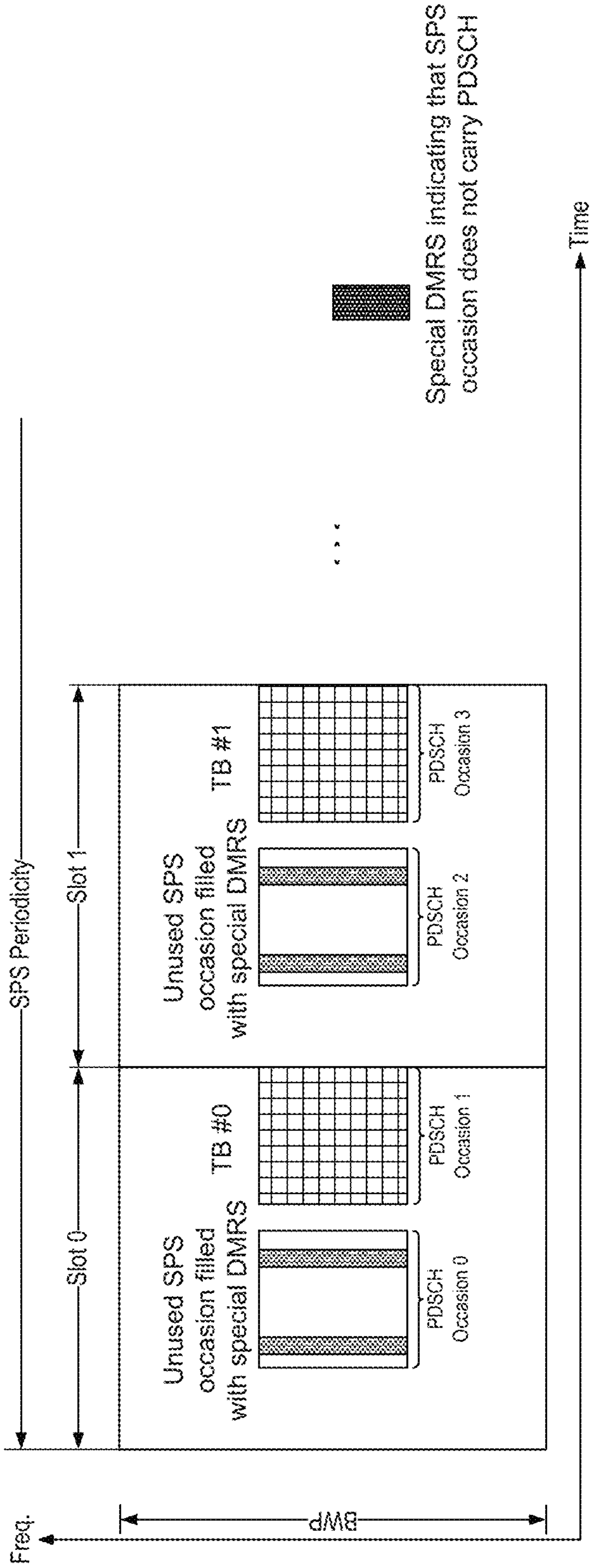
FIG. 20 depicts an example scenario in which only two TB s (TB #0 and TB #1) are transmitted in two SPS occasions out of four configured occasions within SPS bundled set according to the subject matter disclosed herein.

FIG. 20 depicts an example scenario in which only two TBs (TB #0 and TB #1) are transmitted in two SPS occasions out of four configured occasions within SPS bundled set according to the subject matter disclosed herein. Instead of leaving two SPS occasions empty, a gNB may transmit a special DMRS indicating no PDSCH is transmitted in the two SPS PDSCH occasions.

To facilitate the detection at UE side, the special DMRS may have as much common configurations as possible with a legacy DMRS transmitted when PDSCH is present. For example, compared with a legacy DMRS transmitted in the presence of PDSCH, a special DMRS may have the same mapping type (mapping Type A or B), configurations type (Type 1 or Type 2), constructed by single or double symbols, mapped to the same symbols, etc. The special DMRS, however, may have different sequence from the legacy DMRS transmitted in the presence of PDSCH. For example, a gNB may provide a UE with a scrambling initialization ID of the special DMRS through higher-layer signalling, such as scramblingID-NULL that differs from a scrambling initialization ID of legacy DMRS transmitted in the presence of PDSCH.

Although the DMRS sequence may be used to differentiate between legacy DMRS and the special DMRS, other configurations may be used as well, such mapping type (mapping Type A or B), configurations type (Type 1 or Type 2 2), etc. In terms of signalling, the corresponding configurations may be indicated similar to the legacy DMRS transmitted with PDSCH.

Instead of using the same DMRS configurations as would be used when PDSCH is transmitted in the configured SPS occasion, different DMRS configurations may be used. For example, a denser DMRS either in the frequency domain or the time domain, or both may be applied. The existing DMRS configurations may be used as a baseline. For example, in PDSCH-Config IE, SPS IE, or as a new IE, new RRC parameters may configure the configurations of this special DMRS, such as Special-dmrs-DownlinkForPDSCH.

In legacy NR, both dmrs-DownlinkForPDSCH-MappingTypeA(-DCI-1-2) and dmrs-DownlinkForPDSCH-MappingTypeB(-DCI-1-2) may be provided in PDSCH-Config and which one to apply depends on TDRA field in the DCI indicating PDSCH mapping type, among other information, such as the start and length of PDSCH. The Special-dmrs-DownlinkForPDSCH may include how a special DMRS will be mapped in empty (unused) SPS PDSCH occasion. For example, to determine locations of DMRS symbols within an empty (unused) SPS PDSCH occasion, tables similar to those in Clause 7.4.1.1.2 in 38.211 may be used by replacing $I_d$ with the duration of the empty (unused) SPS PDSCH occasion in units of OFDM symbols. A gNB may indicate which mapping type table (mapping Type A or mapping Type B) should be used by higher-layer signalling instead of using TDRA field in the DCI. This may be beneficial to enable a gNB to configure a special DMRS according to mapping Type A (front-loaded DRMS) even if PDSCH mapping Type B is used when PDSCH is transmitted.

Also, this may enable a gNB to configure different DMRS types from the DMRS type configured for a gNB (DMRS Type 1 or Type 2) in which DMRS Type 1 is denser than DMRS Type 2. Other parameters similar to those in DMRS-DownlinkConfig may be part of Special-dmrs-DownlinkForPDSCH to provide a gNB with full flexibility to configure the special DMRS.

Detecting empty (unused) SPS PDSCH occasions from used occasions may involve a UE performing a kind of blind detection of DMRS resources assuming either a special DMRS configuration or a regular DMRS configurations. It may help reduce the burden on UE processing if the two DMRS configurations (special or regular) may share some properties, for example, if the time/frequency locations of both DMRS configurations are the same. Therefore, configuring special and regular DMRS configurations by a gNB may have some dependence on the UE capability of performing DMRS-based blind detection. For example, a UE may indicate a capability of performing DMRS blind detection based on special DMRS resources if the special DMRS configuration has the same time allocation as the regular DMRS configuration used for the SPS PDSCH transmissions.

Also, a new design of a special DMRS may be introduced in which the special DMRS is denser in the frequency domain or time domain. For example, a whole REs in the OFDM across empty (unused) SPS PDSCH occasion may carry the DMRS. Also, a special DMRS may occupy several consecutive OFDM symbols depending on the duration empty (unused) SPS PDSCH occasion (currently either single or double DMRS symbols are supported).

In the case of an absence of a piggybacked DCI indicating the HARQ process ID, the HARQ process ID of each TB may be determined according to particular rules that may be similar to those used to derive the HARQ process ID of legacy SPS. For example, a HARQ process ID of the $n^{th}$ TB within SPS period in which $n \in \{0, \ldots, \text{noofTBs-per-SPSperiod}\}$ may be determined as follows:

$$\text{HARQ Process ID} = [\text{CURRENT\_TB}] \text{ modulo nrof-HARQ-Processes} \quad (2)$$

in which CURRENT_TB=[(Number of SPS periods since activation×noofTBs-per-SPSperiod)+n].

Note that the above solution may be applied also when a single TB is transmitted in SPS period that has multiple PDSCH occasions. Specifically, the special DMRS may be transmitted in the occasion in which a gNB does not intend to transmit PDSCH.

If a UE detects a special DMRS, then the UE may not report any HARQ Ack/Nack bits for this occasion. Moreover, no HARQ process ID may be associated with this PDSCH occasion. If a UE does not detect a special DMRS, legacy behaviour may be applied according to the HARQ process ID associated with each PDSCH occasion without the special DMRS. It should be noted that dynamic decoding of SPS PDSCH occasions, as described above, may be extended to scenarios including a GC-PUSCH.

Using DCI Signaling for Controlling Active SPS Configuration

Regarding use of DCI signaling, the transmission/reception of the DCI may be performed using the legacy procedure for sending a PDCCH carrying DCI. For a DCI indicating information related to a particular set of SPS occasions, the transmission/reception of the DCI is performed within a timeline that is appropriate, as discussed below.

Alternatively, the DCI carrying information pertaining to one or more of the SPS occasions in the set of SPS occasions may be piggybacked on the PDSCH transmitted in one of the SPS occasions, for example, the first SPS occasion in the set of occasions. Additional information regarding DCI piggybacking/multiplexing on PDSCH is below.

Using MAC-CE Signaling for Controlling Active SPS Configuration

As an alternative, the indication of dynamic information for the set of SPS occasions may be done via a MAC CE indication, which may be transmitted via a DL transmission independent of the SPS PDSCH transmissions. Alternatively, dynamic information for the set of SPS occasions may be transmitted as a MAC CE for one of the PDSCH transmissions in the set of SPS occasions. A timeline should be established such that the MAC CE information is applicable to the set of SPS occasions.

Handling Dynamic Signaling Related to SPS Configurations (Timing Aspects, Decoding of DCI/PDSCH, Etc.)

This section focuses on the feasibility of using dynamic signaling (for example, independent/stand-alone DCI or multiplexed/piggybacked DCI on PDSCH) with SPS configurations. Concepts include how to decode multiplexed DCI on PDSCH, and timing relations with respect to dynamic signaling.

Timeline Considerations

Regarding use of DCI signaling, the transmission/reception of the DCI may be performed using the legacy procedure for sending PDCCH carrying DCI or via DCI multiplexed on a PDSCH. For a DCI indicating information related to a particular set of SPS occasions, the transmission/reception of the DCI may be performed within a timeline that is appropriate. Namely, the transmission/reception of the DCI may be performed in a time sufficiently early so that delivery of the associated packet is successfully performed within the delay limit associated with the packet. For example, specific details to the time location and/or duration of the monitoring occasion where the PDCCH may be transmitted/received may be affected by the delay limited associated with the packet. Additionally, the periodicity, duration and offset of the search space associated with the monitoring occasion where the PDCCH is transmitted/received may be affected by the delay limited associated with the packet. The number of candidate aggregation levels for the search space associated with the monitoring occasion, and the configuration of the CORESET associated with the search space and the monitoring occasion may also be affected.

For example, the aforementioned aspects may play a role in determining the timeline for the PDCCH as follows. The PDCCH should be received no later than $t_i+d_i$. Also, when the PDCCH includes information that pertains to a particular SPS occasion, then a UE may be expected to finish processing the PDCCH at a suitable time before the SPS occasion. The processing of the PDCCH should take into account 1) the time consumed by a UE in performing a number of blind decodings of MOs before reaching processing the MO carrying the PDCCH, and 2) the time consumed processing the PDCCH. Such a timeline may be similar to the timeline used to process SFI/CI DCIs and their applicability to upcoming UL transmissions. Such a timeline constraint may be established between the last symbol carrying the PDCCH or the last symbol of the CORESET carrying the PDCCH and the first symbol of the SPS occasion. The timeline may be determined based on the SCS numerology of the PDCCH and the SPS PDSCH. This timeline aspect may be, for example, applicable in case a dynamic DCI (stand-alone or multiplexed on PDSCH) used to change the SPS configuration state change as per the previous embodiment.

Depending on the information carried by the PDCCH, the timeline might be relaxed. For example, a PDCCH carrying information, for example, such as the enabling/disabling of SPS occasions, may have a more relaxed timeline than the timeline for SFI/CI.

DCI Piggybacking/Multiplexed on PDSCH

In some embodiments, the DCI signalled for a UE carrying information related to SPS occasions may be piggybacked/multiplexed on a PDSCH. Consider a configuration of a PDSCH in legacy approach. The configuration may affect many aspects of the PDSCH. For example, resource allocation may be in terms of number of REs $N_{RE}$ (number of allocated OFDM symbols and subcarriers), modulation order Q, number of layers v, coding rate r. The parameters Q and r are related to the configured MCS. TBS determination may also be based on a PDSCH legacy approach, and may DMRS allocation relating to OFDM symbols and corresponding subcarriers that are carrying the DMRS REs. Data-carrying REs and mapping of coded bits to the REs are also a consideration.

A DCI multiplexed on the PDSCH may affect one or more of the aspects of the PDSCH that are originally configured by a legacy PDSCH configuration. In one approach, DCI piggybacking/multiplexing on PDSCH may be performed in a manner that may be similar to UCI multiplexing on PUSCH. This approach may inherent various aspects of the procedure of UCI multiplexing on PUSCH to DCI piggybacking/multiplexing on PDSCH. Alternatively, DCI piggybacking/multiplexing on PDSCH may follow an alternative approach.

Existence of DCI in SPS PDSCH Occasions

Configuration of SPS PDSCH occasions and how multiplexed DCIs are configured to exist with some or all of those occasions are discussed as follows. When DCI multiplexing on SPS occasions is allowed, two types of SPS occasions (SOs) may be distinguished between 1) occasions with potential DCI (referred to as D-SO), and 2) occasions with no potential DCI (referred to as N-SO). Furthermore, a D-SO may indeed carry a DCI or not carry a DCI depending on the scheduler.

In configuring an SPS configuration, some configured SOs may be D-SOs or N-SOs. The following are potential configurations. In explaining the configurations, an SPS configuration may be assumed that exists with periodicity $P_S$ and in which each periodicity defines a certain set of SOs that may or may not include more than one SO, and may or may not span more than one slot.

All SOs in an SPS configuration may be D-SOs. Some SOs may be D-SOs while others may be N-SOs. D-SOs may be configured independently from the SPS configuration. For example, D-SOs may be configured so that they occur after a certain periodicity $P_D$, and that within each periodicity, D-SOs exist in a certain pattern, The pattern may be specified using, for example, a bitmap indicating the locations of D-SOs within the periodicity, or using a certain implicit rule that indicates the locations of the D-SOs within the periodicity. In this case, the configuration lays out a particular arrangement of potential D-SOs. The actual set of D-SOs may be determined in conjunction with the SPS configuration according to the following example rules.

Rule 1: a potential D-SO may be considered as an actual D-SO only if it overlaps with an SO specified by the SPS configuration. "Overlapping" as used herein means that the resources for the D-SO and the SO are fully overlapping or they can be partially overlapping. In some embodiments with partial overlapping, the resultant occasion may correspond to the smaller (in number of REs) of the two, the larger of the two, the one with the earlier time domain allocation, etc.

Rule 2: a potential D-SO may be an actual D-SO, and the overall set of SOs are those indicated by the union of SPS configurations and D-SOs configurations. If a D-SO and an SO overlap in resources, then similar rules for determining the resultant occasion can be used similar to Rule 1.

Figure 21:
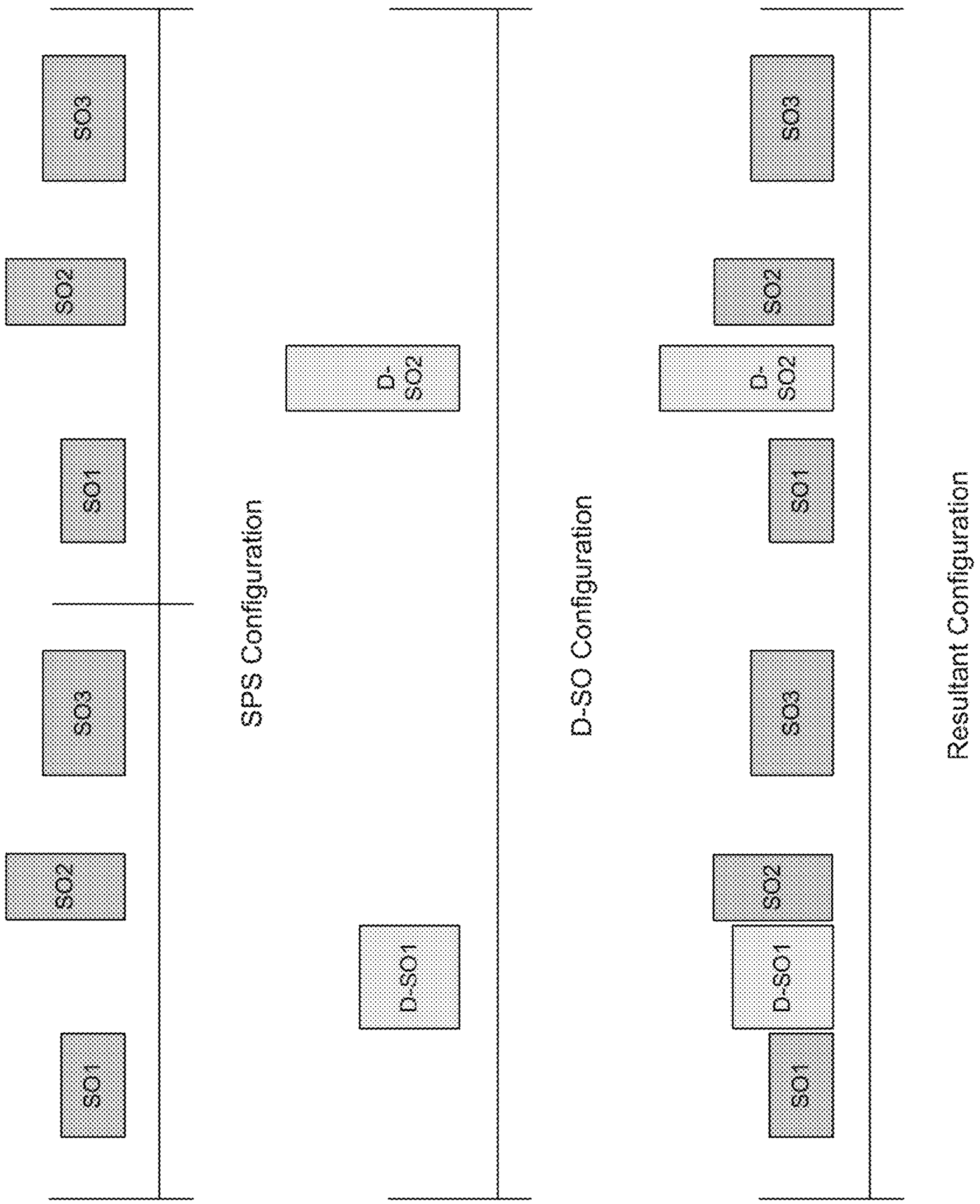
FIG. 21 depicts an example scenario of how SPS configurations and D-SO configurations may jointly operate according to the subject matter disclosed herein.

FIG. 21 depicts an example scenario of how SPS configurations and D-SO configurations may jointly operate according to the subject matter disclosed herein. D-SOs may be configured so that they occur after a certain periodicity $P_D$, and that within each periodicity, D-SOs exist within a certain duration $D_D$. In this case, the D-SO configuration basically indicates certain durations in time in which any SO that exists is considered a D-SO. Therefore, indication of D-SO is an implicit indication.

Figure 22:
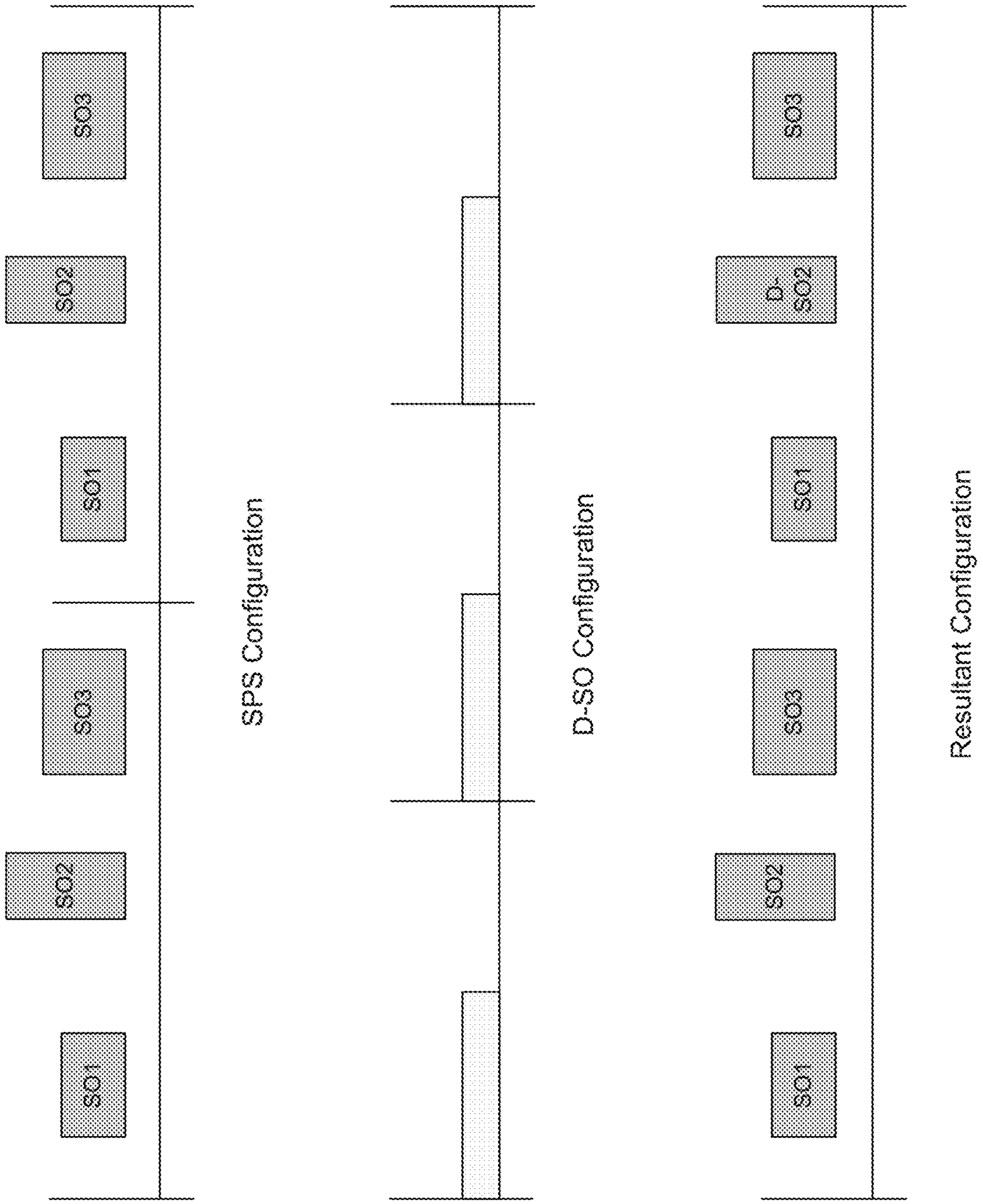
FIG. 22 depicts an example of how D-SOs are determined according to the subject matter disclosed herein.

FIG. 22 depicts an example of how D-SOs are determined according to the subject matter disclosed herein. D-SOs may be configured as part of the SPS configuration. Specifically, the SPS configuration may have an additional indication of which SOs are considered as D-SOs. In case SOs are determined via a bitmap parameter as indicated above, another bitmap parameter indicates which a SO is a D-SO, and in which the length of the D-SO bitmap is equal to the length of the SPS bitmap parameter. The indication may be in the form of a mask parameter that highlights which SOs are considered to be D-SOs. The mask parameter can, for example, be in the form of a bitmap in which the length of the bitmap indicates the number of SOs in the SPS configuration. Then, a bit value of 1 indicates that the corresponding SO is a D-SO. If the length of the mask bitmap is M, then each set of M SOs may be subject to D-SO determination using the mask parameter. The starting point where the sets of M SOs are determined may be the activating DCI.

Processing of DCI Multiplexed on PDSCH

When performing DCI multiplexing on PDSCH, it is important that the UE is able to decode the multiplexed DCI. This puts certain conditions on the configurations of the DCI and PDSCH. The following includes particular aspects that may be considered to increase the likelihood of successful decoding of the DCI. The DCI may be multiplexed on certain REs that belong to the allocation determined from the configuration of the PDSCH and the DCI. The mapping operations between the coded bits constituting the DCI and the REs should be unambiguous. The number of REs available for the mapping of the DCI dictates the RM size for the coded bits of the DCI. It is therefore important that the RM size allocated for the DCI ensures that the effective coding rate of the DCI is sufficiently low to ensure acceptable decoding likelihood. The RM/interleaver/mapping operation of the DCI onto REs should ensure that the DCI has an acceptable decoding likelihood.

Determining the RM Size of the DCI

In one option, the RM size of the DCI may be determined based on the resource allocation according to the nominal PDSCH configuration. Alternatively, RM size of the DCI may be determined independently of the of the PDSCH nominal configuration.

RM Size Determination Based on PDSCH Nominal Configuration

When the RM size of the DCI is determined based on the PDSCH nominal configuration, determining the RM size of the DCI may depend on the mapping procedure of the control bits DCI multiplexed with the PDSCH. Namely, among other options, four possible alternatives may be distinguished.

Alt 1-1: Control bits are mapped right after DMRS symbols in both hops, when frequency hopping is configured: this gives the highest decoding performance among alternatives because it places control bits at high reliable REs, while this alternative may include a longer decoding latency.

Alt 1-2: Control bits are mapped right after DMRS symbols in first hop, even when frequency hopping is configured. This may provide a lower decoding performance than Alt 1-1 because it does not benefit from frequency diversity. It, however, ensures that the control bits are entirely conveyed within the first hop, which may provide a lower decoding latency.

Alt 2-1: Control bits are mapped at the first available OFDM symbols in both hops, when frequency hopping is configured. This is a low-latency alternative having lower decoding performance than Alt 1-1.

Alt 2-2: Control bits are mapped at the first available OFDM symbols in the first hops, even when frequency hopping is configured. This alternative has the lowest decoding latency among other alternatives, which comes at an expense of a worse decoding performance.

RM size for Alt 1-1:

In this case, the RM size of the DCI may be determined with a rule which follows similar behavior to how the RM size of a UCI multiplexed on a PUSCH may be determined in case HARQ-ACK feedback only is present in the UCI. That is, the RM size of the DCI, denoted as $Q_{DCI}$ number of coded modulation symbols, may be roughly determined as $$Q_{DCI} = \min\left(\left\lceil \frac{O_{DCI} + L_{DCI}}{\sum_{r=0}^{C_{DL-SCH}} K_r} \cdot \beta_{offset}^{DCI} \cdot \sum_{\ell=0}^{N_{symb,all}^{PDSCH}-1} M_{sc}^{DCI}(\ell) \right\rceil, \left\lceil \alpha \cdot \sum_{\ell=\ell_0}^{N_{symb,all}^{PDSCH}-1} M_{sc}^{DCI}(\ell) \right\rceil\right) \quad (3)$$

in which the meanings of all used symbols are equivalent to their counterpart in the procedure of UCI multiplexing on PUSCH.

For determining $Q_{DCI}$, the value of $$\beta_{offset}^{DCI}$$

may be equivalent to one of the values of beta offsets used in conjunction with UCI multiplexing on PUSCH. Alternatively, the value may be separately configured by a dedicated one or multiple RRC values. The value of $$\beta_{offset}^{DCI}$$

may also be dynamically indicated via a DCI.

RM Size for Alt 1-2:

In this case, the DCI may be mapped only on the resources in the first hop of the PDSCH. The RM size of the DCI may be determined as $$Q_{DCI} = \min\left(\left\lceil \frac{O_{DCI} + L_{DCI}}{\sum_{r=0}^{C_{DL-SCH}} K_r} \cdot \beta_{offset}^{DCI} \cdot \sum_{\ell=0}^{N_{symb,all}^{PDSCH}-1} M_{sc}^{DCI}(\ell) \right\rceil, \left\lceil \alpha \cdot \sum_{\ell=\ell_0}^{N_{symb,hop}^{PDSCH}(1)-1} M_{sc}^{DCI}(\ell) \right\rceil \right). \tag{4}$$

RM Size for Alt 2-1:

In this case, the DCI is mapped at the first available OFDM symbol. The RM size may then be determined as $$Q_{DCI} = \min\left(\left\lceil \frac{O_{DCI} + L_{DCI}}{\sum_{r=0}^{C_{DL-SCH}} K_r} \cdot \beta_{offset}^{DCI} \cdot \sum_{\ell=0}^{N_{symb,all}^{PDSCH}-1} M_{sc}^{DCI}(\ell) \right\rceil, \left\lceil \alpha \cdot \sum_{\ell=\ell_0}^{N_{symb,all}^{PDSCH}-1} M_{sc}^{DCI}(\ell) \right\rceil \right). \tag{5}$$

RM Size for Alt 2-2:

In this case, the DCI is mapped at the first available OFDM symbol and is entirely contained within the first hop. The RM size may then be determined as $$Q_{DCI} = \min\left(\left\lceil \frac{O_{DCI} + L_{DCI}}{\sum_{r=0}^{C_{DL-SCH}} K_r} \cdot \beta_{offset}^{DCI} \cdot \sum_{\ell=0}^{N_{symb,all}^{PDSCH}-1} M_{sc}^{DCI}(\ell) \right\rceil, \left\lceil \alpha \cdot \sum_{\ell=0}^{N_{symb,hop}^{PDSCH}(1)-1} M_{sc}^{DCI}(\ell) \right\rceil \right). \tag{6}$$

RM Size Determination Independently from PDSCH Configuration

In this option, the resource allocation and the RM size for the DCI transmission may be independently determined from the configuration of the PDSCH. In this case, the following high-level procedure may be adopted for determining the resources used for the DCI transmission and PDSCH transmission.

The DCI resources may be determined based on a particular configuration for the DCI, which is specified independently of the PDSCH configuration. The DCI configuration may be explicitly configured (either via RRC configuration or dynamically indicated to the UE), or it may be implicitly derived. The DCI configuration specifies the exact resource allocation to be used for transmitting the DCI.

Based on the determined resources for the DCI, the PDSCH configuration specifies the resources to be used for the PDSCH, and in case of overlap between the resources for the PDSCH and the DCI, the overlapping resources may not be used for mapping the PDSCH.

For example, a DCI configuration may be specified in the form of a certain CORESET and a certain time and frequency allocation that may be indicated via parameters/configurations similar to those given in a search space. The configuration may also include a CCE aggregation level or multiple CCE aggregation levels to allow for multiple potential DCI configurations in which each configuration is appropriate for some channel conditions. This configuration may be used to determine a unique and unambiguous set of resources for the decoding of the DCI, and this configuration is not dependent on a PDSCH configuration. Once the DCI resource allocation is specified, the resource allocation determination for the PDSCH may be performed.

Figure 23:
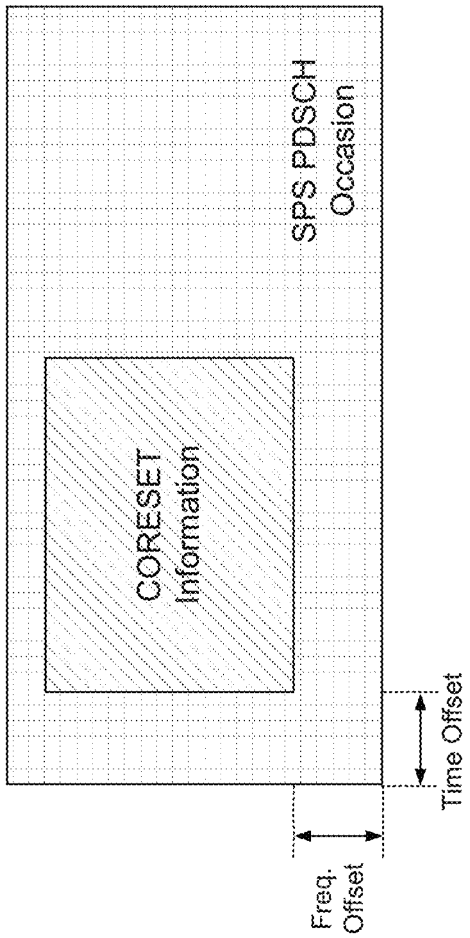
FIG. 23 depicts an example scenario of a DCI configuration that may be in the form of a CORESET like configuration, and where the location of the CORESET in time/frequency locations is given with respect to the SPS PDSCH occasion according to the subject matter disclosed herein.

FIG. 23 depicts an example scenario of a DCI configuration that may be in the form of a CORESET like configuration, and where the location of the CORESET in time/frequency locations is given with respect to the SPS PDSCH occasion according to the subject matter disclosed herein. The information, for example, may be typically given as per the associated search space set in regular DCI configuration. A time and frequency offset may be specified that determine the CORESET location with respect to the PDSCH occasion. The time and frequency offset may be measured from the RE located at the earliest OFDM symbol and smallest SC allocated for the PDSCH occasion. Time and frequency offsets may take both positive and negative values.

RE Mapping of DCI Bits

Once the resources for the DCI have been determined, the procedure maps the coded bits corresponding to the DCI onto the allocated resources.

Option 1: A first option for doing so is that the coded DCI bits are multiplexed with the coded DL-SCH bits, which are then together passed to the rest of the PDSCH processing chain to be mapped to the allocated resources. In this approach, because the coded bits used in the PDSCH processing include DL-SCH and DCI bits, the mapping of the PDSCH may be performed on the entire set of REs allocated for the PDSCH and the DCI (i.e., including overlapping resources).

If the PDSCH includes of multiple codewords, the DCI coded bits may be multiplexed with the UL-SCH bits that belong to the first codeword only, or the second codeword only, or split between the two codewords. The split may be done equally among the two codewords, or it may be done according to certain weights. The weights may correspond, for example, to the number of data bits in each codeword.

Figure 24:
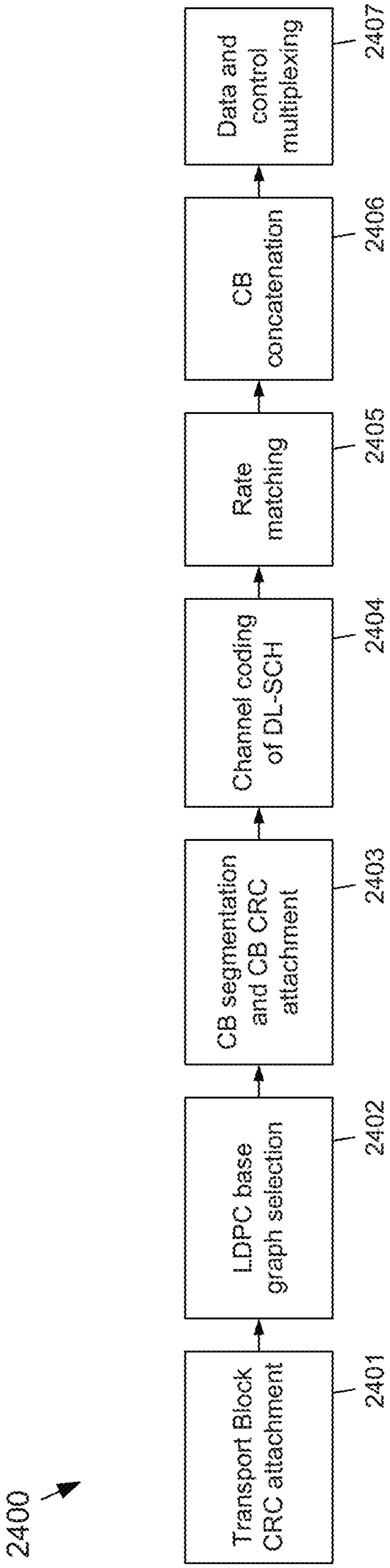
FIG. 24 depicts an example embodiment of a PDSCH processing chain to allow DL-SCH and DCI multiplexing onto a PDSCH according to the subject matter disclosed herein.

FIG. 24 depicts an example embodiment of a PDSCH processing chain 2400 to allow DL-SCH and DCI multiplexing onto a PDSCH according to the subject matter disclosed herein. Operations provided by the PDSCH processing chain 2400 may include a TB block CRC attachment operation 2401, an LDPC base graph selection operation 2402, a CB segmentation and CB CRC attachment operation 2403, a channel coding of DL-SCH operation 2404, a rate matching operation 2405, a CB concatenation operation 2406, and a data and control multiplexing operation 2407. Operation of all blocks (except Data and control multiplexing 2407) are all similar to their counterparts in the PDSCH processing chain in a legacy NR operation. One or more of the operations 2401-2407 may be performed by circuits and/or modules. The additional block (Data and control multiplexing 2407) operation is described below, with the data bits being the output of the CB concatenation block and the control bits are the output of the DCI processing chain.

In the data and control multiplexing block 2407, the coded bits for data and control are multiplexed such that coded bits are mapped to the appropriate REs. Four alternatives may be considered for mapping control bits onto available REs, which are described above as Alt 1-1, Alt 1-2, Alt 2-1 and Alt 2-2.

Multiplexing control and data bits according to the four methods above may be done via the following procedure.

---

Denote the coded bits for DL-SCH as $g_0^{DL\text{-}SCH}, g_1^{DL\text{-}SCH}, g_2^{DL\text{-}SCH}, g_3^{DL\text{-}SCH}, \ldots, g_{G^{DL\text{-}SCH}}{}^{DL\text{-}SCH}{}_{-1}$.
Denote the coded bits for DCI as $g_0^{DCI}, g_1^{DCI}, g_2^{DCI}, g_3^{DCI}, \ldots, g_{G^{DCI}}{}^{DCI}{}_{-1}$.
Denote the coded bits for CSI part 1, if any, as $g_0^{CSI\text{-}part1}, g_1^{CSI\text{-}part1}, g_2^{CSI\text{-}part1}, g_3^{CSI\text{-}part1}, \ldots, g^{CSI\text{-}part1}{}_G{}^{CSI\text{-}part1}{}_{-1}$.
Denote the multiplexed data and control coded bit sequence as $g_0, g_1, g_2, g_3, \ldots, g_{G-1}$.
Denote l as the OFDM symbol index of the scheduled PDSCH, starting from 0 to $N_{symb,all}^{PDSCH} - 1$ in which $N_{symb,all}^{PDSCH} - 1$ is the total number of OFDM symbols of the PDSCH including all OFDM symbols used for DMRS.
Denote k as the subcarrier index of the scheduled PDSCH, starting from 0 to $M_{sc}^{PDSCH} - 1$ in which $M_{sc}^{PDSCH}$ is expressed as a number of subcarriers.
Denote $\Phi_l^{DL\text{-}SCH}$ as the set of resource elements, in ascending order of indices k, available for transmission of data in OFDM symbol l, for $l = 0,1,2, \ldots, N_{symb,all}^{PDSCH} - 1$.
Denote $M_{sc}^{DL\text{-}SCH}(l) = |\Phi_l^{DL\text{-}SCH}|$ as the number of elements in set $\Phi_l^{DL\text{-}SCH}$. Denote $\Phi_l^{DL\text{-}SCH}(j)$ as the j-th element in $\Phi_l^{DL\text{-}SCH}$.
Denote $\Phi_l^{DCI}$ as the set of resource elements, in ascending order of indices k, available for transmission of DCI in OFDM symbol l, for $l = 0,1,2, \ldots, N_{symb,all}^{PDSCH} - 1$. Denote $M_{sc}^{DCI}(l) = |\Phi_l^{DCI}|$ as the number of elements in set $\Phi_l^{DCI}$. Denote $\Phi_l^{DCI}(j)$ as the j-th element in $\Phi_l^{DCI}$. For any OFDM symbol that carriers DMRS of the PDSCH, $\Phi_l^{DCI} = \emptyset$ or any OFDM symbol that does not carry DMRS of the PUSCH, $\Phi_l^{DCI} = \Phi_l^{DL\text{-}SCH}$.
If frequency hopping is configured for the PDSCH,
- denote $l^{(1)}$ as the OFDM symbol index of the first OFDM symbol after the first set of consecutive OFDM symbol(s) carrying DMRS in the first hop;
- denote $l^{(2)}$ as the OFDM symbol index of the first OFDM symbol after the first set of consecutive OFDM symbol(s) carrying DMRS in the second hop.
- denote $l_{early}^{(1)}$ as the OFDM symbol index of the first OFDM symbol that does not carry DMRS in the first hop;
- denote $l_{early}^{(2)}$ as the OFDM symbol index of the first OFDM symbol that does not carry DMRS in the second hop;
- if DCI is present for transmission on the PDSCH with DL-SCH, let
- $G^{DCI}(1) = N_L \cdot Q_m \cdot \lfloor G^{DCI}/(2 \cdot N_L \cdot Q\_m) \rfloor$ and $G^{DCI}(2) = N_L \cdot Q_m \cdot \lceil G^{DCI}/(2 \cdot N_L \cdot Q\_m) \rceil$;
- if only DCI is present for transmission on the PDSCH without DL-SCH,
- if DCI is mapped to the first OFDM symbol that does not carry DMRS resources then $$G^{DCI}(1) = \min\left(N_L \cdot Q_m \cdot \left\lfloor \frac{G^{DCI}}{2 \cdot N_L \cdot Q_m} \right\rfloor, M_1 \cdot N_L \cdot Q_m\right); \text{ otherwise,}$$

$$G^{DCI}(1) = \min\left(N_L \cdot Q_m \cdot \left\lfloor \frac{G^{DCI}}{2 \cdot N_L \cdot Q_m} \right\rfloor, M_3 \cdot N_L \cdot Q_m\right)$$

- $G^{DCI}(2) = G^{DCI} - G^{DCI}(1)$;
- let $N_{hop}^{PDSCH} = 2$, and denote $N_{symb,hop}^{PDSCH}(1)$, $N_{symb,hop}^{PDSCH}(2)$ as the number of OFDM symbols of the PDSCH in the first and second hop, respectively;
- $N_L$ is the number of transmission layers of the PDSCH;
- $Q_m$ is the modulation order of the PDSCH;
- $M_1 = \Sigma_{l=0}^{N_{symb,hop}^{PDSCH}(1)-1} M_{sc}^{DCI}(l)$;
- $M_3 = \Sigma_{l=0}^{N_{symb,hop}^{PDSCH}(1)-1} M_{sc}^{DCI}(l)$.

If frequency hopping is not configured for the PDSCH, or if the DCI is mapped to resources in the first hop only
- denote $l^{(1)}$ as the OFDM symbol index of the first OFDM symbol after the first set of consecutive OFDM symbol(s) carrying DMRS;
- denote $l_{early}^{(1)}$ as the OFDM symbol index of the first OFDM symbol that does not carry DMRS;
- if DCI is present for transmission on the PDSCH, let $G^{DCI}(1) = G^{DCI}$; and
- let $N_{hop}^{PDSCH} = 1$ and $N_{symb,hop}^{PDSCH}(1) = N_{symb,all}^{PDSCH}$.

The multiplexed data and control coded bit sequence $g_0, g_1, g_2, g_3, \ldots, g_{G-1}$ is obtained according to the following:
Step 1:
Set $\overline{\Phi}_l^{DL\text{-}SCH} = \Phi_l^{DL\text{-}SCH}$ for $l = 0,1,2, \ldots, N_{symb,all}^{PDSCH} - 1$;
Set $\overline{M}_{sc}^{DL\text{-}SCH}(l) = |\overline{\Phi}_l^{DL\text{-}SCH}|$ for $l = 0,1,2, \ldots, N_{symb,all}^{PDSCH} - 1$;
Set $\overline{\Phi}_l^{DCI} = \Phi_l^{DCI}$ for $l = 0,1,2, \ldots, N_{symb,all}^{PDSCH} - 1$; and
Set $\overline{M}_{sc}^{DCI}(l) = |\overline{\Phi}_l^{DCI}|$ for $l = 0,1,2, \ldots, N_{symb,all}^{PDSCH} - 1$.
Step 2:
if DCI is present for transmission on the PDSCH with DL-SCH,
Set $m_{count}^{DCI}(1) = 0$;
Set $m_{count}^{ACK}(2) = 0$;
Set $m_{count,all}^{DCI} = 0$;
for i = 1 to $N_{hop}^{PDSCH}$;
if the DCI is mapped to the first OFDM symbol that does not carry DMRS resources
$l = l_{early}^{(i)}$;

-continued else
$l = l^{(i)}$;
end if
While $m_{count}^{DCI}(i) < G^{DCI}(i)$
if $\overline{M}_{sc}^{DCI}(l) > 0$
if $G^{DCI}(i) - m_{count}^{DCI}(i) \geq \overline{M}_{sc}^{DCI}(l) \cdot N_L \cdot Q_m$
d = 1;
$m_{count}^{RE} = \overline{M}_{sc}^{DCI}(l)$;
end if
if $G^{DCI}(i) - m_{count}^{DCI}(i) < \overline{M}_{sc}^{DCI}(l) \cdot N_L \cdot Q_m$
$d = \lfloor \overline{M}_{sc}^{DCI}(l) \cdot N_L \cdot Q_m / (G^{DCI}(i) - m_{count}^{DCI}(i)) \rfloor$;
$m_{count}^{RE} = \lceil (G^{DCI}(i) - m_{count}^{DCI}(i))/(N_L \cdot Q_m) \rceil$;
end if
for $j = 0$ to $m_{count}^{RE} - 1$
$k = \Phi_l^{DCI}(j \cdot d)$;
for $v = 0$ to $N_L \cdot Q_m - 1$ $\overline{g}_{l,k,v} = g^{DCI}_{m^{DCI}_{count,all}}$;

$m_{count,all}^{DCI} = m_{count,all}^{DCI} + 1$;
$m_{count}^{DCI}(i) = m_{count}^{DCI}(i) + 1$;
end for
end for
$\Phi_{l,tmp}^{DCI} = \emptyset$;
for $j = 0$ to $m_{count}^{RE} - 1$
$\Phi_{l,tmp}^{DCI} = \Phi_{l,tmp}^{DCI} \cup \Phi_l^{DCI}(j \cdot d)$;
end for
$\Phi_l^{DCI} = \Phi_l^{DCI} \backslash \Phi_{l,tmp}^{DCI}$;
$\Phi_l^{DL\text{-}SCH} = \Phi_l^{DL\text{-}SCH} \backslash \Phi_{l,tmp}^{DCI}$;
$\overline{M}_{sc}^{DCI}(l) = |\Phi_l^{DCI}|$;
$\overline{M}_{sc}^{DL\text{-}SCH}(l) = |\Phi_l^{DL\text{-}SCH}|$;
end if
$l = l + 1$;
end while
end for
end if
Step 3:
if DL-SCH is present for transmission on the PDSCH,
Set $m_{count}^{DL\text{-}SCH} = 0$;
For $l = 0$ to $N_{symb,all}^{PDSCH} - 1$
If $\overline{M}_{sc}^{DL\text{-}SCH}(l) > 0$
For $j = 0$ to $\overline{M}_{sch}^{DL\text{-}SCH}(l) - 1$
$k = \Phi_l^{DL\text{-}SCH}(j)$;
For $v = 0$ to $N_L \cdot Q_m - 1$ $\overline{g}_{l,k,v} = g^{DL-SCH}_{m_{count}^{DL-SCH}}$;

$m_{count}^{DL\text{-}SCH} = m_{count}^{DL\text{-}SCH} + 1$;
end for
end for
end if
end for
end if
Step 4:
Set $t = 0$;
For $l = 0$ to $N_{symb,all}^{PDSCH} - 1$
For $j = 0$ to $M_{sc}^{DL\text{-}SCH}(l) - 1$
$k = \Phi_l^{DL\text{-}SCH}(j)$;
for $v = 0$ to $N_L \cdot Q_m - 1$
$g_t = \overline{g}_{l,k,v}$;
$t = t + 1$;
end for
end for
end for Option 2: Another option for mapping the coded DCI bits onto REs is to proceed with the processing of the DCI as a regular DCI on the associated resources. These resources may, for example, be obtained from a DCI configuration that is independent of the associated PDSCH. Then, the processing of the PDSCH is performed on the resources that remain after excluding the overlapping resources with the DCI allocation.

The coded bits of a DCI can be scrambled prior to being mapped on the REs associated with the PDSCH with multiplexed DCI. Different options exist for the initial value used for the scrambling sequence of the DCI.

Option 1: in this option, the initial value follows the equation $$c_{init} = (n_{RNTI} \cdot 2^{16} + n_{ID}) \bmod 2^{31} \quad (7)$$

in which the value of $n_{ID}$ may be equal to: the DMRS scrambling ID associated with the CORESET used for delivering the activating DCI of the SPS configuration associated with the PDSCH where the DCI is piggybacked, or a DMRS scrambling ID specifically configured for the piggybacked DCIs; this ID may be per UE, per SPS configuration, per DCI configuration, per PDSCH configuration, or others.

Option 2: in this option, the initial value is related to the initial value used for the scrambling sequence of the piggybacked PDSCH. Namely, the initial value may be: the same initial value used for scrambling the PDSCH carrying the DCI, or if multiple codewords are carried in the PDSCH, then the same initial value used for scrambling the first codeword, or the second codeword, or the codeword that is mapped on REs that are affected by the DCI multiplexing procedure.

Processing PDSCH with Multiplexed DCI

This subsection describes PDSCH configurations with potentially multiplexed DCI, for example, D-SO configurations.

A DCI multiplexed on a PDSCH may carry information related to the PDSCH with multiplexed DCI. In this case, the information carried in the DCI may affect the configuration of the carrying PDSCH. Therefore, a distinction may be made between a "nominal" configuration of the PDSCH (i.e., the configuration of the PDSCH prior to extracting the relevant information in the DCI) and an "updated/actual" configuration of the PDSCH (i.e., the configuration of the PDSCH after extracting the relevant information in the DCI). The nominal configuration of the PDSCH may be a complete configuration of the PDSCH while the updated configuration of the PDSCH may be a complete configuration of the PDSCH with some aspects/parameters of the configuration that are changed compared to the nominal configuration. Alternatively, a nominal configuration of the PDSCH may be an incomplete configuration of the PDSCH with the updated configuration completing and/or updating some aspects of the nominal configuration.

A nominal configuration of the PDSCH may, for example, be sufficient information to decode the multiplexed DCI, but insufficient for the decoding of the entire PDSCH. For example, the incomplete nominal configuration may contain information about the DMRS allocation of the PDSCH. It may also include information that specifies how the DCI is configured: number/allocations of the REs carrying the DCI, the coding of the DCI, and so on. In this case, there are three different events associated with the reception of the PDSCH carrying a DCI.

Event 1: A UE may correctly decode the DCI and the associated PDSCH.

Event 2: A UE may correctly decode the DCI, but fail to decode the associated PDSCH.

Event 3: A UE may fail to decode both the DCI and the associated PDSCH.

In some cases, the network may benefit from receiving an explicit indication of which of the three events has occurred, For example, if the DCI carries information more than the ones related to the associated PDSCH, that is, information about other PDSCH occasions in the SPS configuration. In this case, HARQ feedback of the PDSCH may acknowledge the existence of the three events. Alternatively, the network may not make a distinction between events 2 and 3, in which case one bit of HARQ feedback for the PDSCH would suffice.

Alternatively, the nominal configuration of the PDSCH may contain sufficient information for the decoding of the multiplexed DCI as well as the PDSCH carrying the DCI. In this case, a fourth event may be added to the list of events above.

Event 4: A UE may fail to decode the DCI, but correctly decodes the associated PDSCH.

In the case of event 4, the network may also benefit from making a distinction between all four events if the HARQ feedback associated with this PDSCH is updated.

Case of Complete Nominal PDSCH Configuration

When a complete nominal PDSCH configuration is specified, the following behavior is allowed.

"A UE can attempt to decode the PDSCH even prior to decoding the multiplexed DCI. After decoding the multiplexed DCI, the UE can attempt to decode the PDSCH with the updated configuration."

In some embodiments, the procedure of configuring the PDSCH with nominal and actual configurations, as well as the DCI multiplexing procedure, may be performed in a manner which facilitates this behavior.

In particular, given a particular configuration of the PDSCH, a UE is able to determine precisely and with no ambiguity which coded bits out of the corresponding codeword(s) for the TB/CBs associated with the PDSCH, are mapped to the REs configured for the PDSCH, and how they are mapped. For a given nominal configuration, some coded bits corresponding to the codeword(s) of the TB/CBs of the PDSCH are mapped to some bit locations on the REs configured for the PDSCH via the nominal configuration. In order to facilitate the aforementioned behavior, the particular allocation of coded bits onto REs specified by the nominal behavior should not be changed after updating the configuration of the PDSCH using the information in the multiplexed DCI. In addition, the nominal configuration of the PDSCH should allow a self-decodable rate-matching operation.

Decoding the PDSCH after Decoding the Multiplexed DCI

In order to realize the operation mentioned in the previous paragraph, various mechanisms may be performed. The following list includes examples of such mechanisms in which one or more mechanisms may be used together to realize this operation.

First, altering the configuration of the PDSCH may only increase the time domain resource allocation of the PDSCH compared to the nominal PDSCH configuration, while maintaining the same frequency resource allocation, same DMRS resource allocation, same number of layers and MCS index.

Second, the mapping of coded bits to REs can be performed such that the coded bits mapped to REs according to the nominal PDSCH configurations remain unchanged, and additional coded bits mapped to REs after updating PDSCH configuration based on information carried in the DCI are mapped to the additional REs made available by the change in PDSCH configuration.

Third, if the actual PDSCH configuration indicates a modulation order that is different than the one in the nominal PDSCH configuration, then some alternative operations exist. For example, changing the modulation order of the PDSCH configuration may be interpreted that the entire set of REs indicated by the actual PDSCH configuration, including the REs previously indicated by the nominal PDSCH configuration, are occupied with signal transmissions that follow the new modulation order. This means that the REs indicated by the nominal PDSCH configuration do not follow the modulation order indicated by the nominal PDSCH configuration that is in contrast with the target operation. Therefore, this interpretation of the modulation order change may be prohibited. Another alternative may be that changing the modulation order of the PDSCH configuration may be interpreted that all additional REs that are allocated due to the actual PDSCH configuration, but not the nominal PDSCH configuration, are occupied with signal transmissions that follow the new modulation order, while the modulation order of REs indicated by the nominal PDSCH are unchanged.

Fourth, changing the PDSCH configuration may lead to a change in the base graph code used by the LDPC encoder. If the actual PDSCH configuration leads to a change in the base graph code, then this may be applicable only to the additional REs indicated by the actual PDSCH configuration. That is, the TB is LDPC encoded using the new base graph code, and the coded bits mapped on the additional REs are selected from the codeword(s) produced from the LDPC encoder with the new base graph code.

Fifth, if the new RV index indicated by the actual PDSCH configuration is the same as the RV index in the nominal PDSCH configuration, then two options exist. The coded bits selected for the mapping across additional REs may be selected starting from the last coded bit used in the mapping based on the nominal PDSCH configuration. Alternatively, selection of coded bits may start from the location of the indicated RV index. In this case, some repetition of coded bits within the PDSCH may happen. Yet another alternative provides that selection of the coded bits may start from an RV index that is a function of the indicated RV index as well as other parameters of the PDSCH configurations. For example, the RV index used to start mapping on additional REs may be the RV index which is "closest" to the last coded bit used in the mapping based on the nominal PDSCH configuration.

Sixth, one nominal PDSCH configuration may lead to a determination of a TBS value T nominal. Then, after determining actual PDSCH configuration, another TBS value $T_{actual}$ may be determined. Then, the two following options exist.

If $T_{actual}=T_{nominal}$, then the same TB may be maintained for the PDSCH transmission after determining the actual PDSCH configuration. In this case, more coded bits out of the codeword(s) corresponding to the same TB are selected and mapped to available REs as per the second alternative of mapping coded bits to RE described above.

Another variation here is that a UE may be specified that the TBS is not recalculated based on the actual PDSCH configuration, but rather the same TB is maintained for the PDSCH transmission after determining actual PDSCH configuration. In this case, the actual PDSCH configuration determines a new set of coded bits selected from the same codeword(s) corresponding to the original TB.

If $T_{actual}>T_{nominal}$, then new TB is determined for the actual PDSCH configuration. In this case, the new TB includes a set of information bits that are the same information bits comprising the original TB of size $T_{nominal}$, and also another set of information bits labelled TB_part of size $T_{actual}-T_{nominal}$. Then, the part TB_part is processed entirely independently from the original TB, and corresponding coded bits are mapped to the available REs after the mapping based on the nominal configuration. The entire TB of size $T_{actual}$ (including information bits included in the original TB) is processed and corresponding coded bits are mapped to the available REs. In this case, the set of information bits comprising the original TB and also part of the new TB is effectively coded and mapped twice.

The new TB of size $T_{actual}$ includes a new set of information bits that is different from the set of bits in the original TB. In this case, the entire TB of size $T_{actual}$ is processed and corresponding coded bits are mapped to the available REs. In this case, the final allocation of the PDSCH carries information bits the number of which is $T_{actual}+T_{nominal}$.

A nominal configuration of the PDSCH may also include a nominal allocation of OFDM symbols and/or frequency domain allocation.

Decoding PDSCH Prior to Decoding DCI or in Case of No Multiplexed DCI

Consider the PDSCH configuration associated with a D-SO. In this case, there is a potential DCI that may be multiplexed with the PDSCH transmitted in that SO. Assuming that there is a PDSCH transmitted in the SO, this typically leaves the UE with two hypotheses. Hypothesis 1 is that a DCI is multiplexed with the PDSCH, and hypothesis 2 is that a DCI does not exist with the PDSCH.

Either hypothesis may affect UE behaviour in terms of decoding the PDSCH. For example, a UE may attempt to do two decoding trials of the PDSCH, one for each hypothesis. Alternatively, a UE may assume one of the two hypotheses when decoding the PDSCH and/or DCI. The first hypothesis may put more burden on UE processing. Depending on the configurations of the PDSCH and the multiplexed DCI, the second hypothesis may or may not be feasible. More specifically, if the PDSCH allocation is not changed depending on the existence (or lack) of a DCI, then the UE decoding procedure of the PDSCH assuming either of the two hypotheses is identical, and therefore the approach of the second hypothesis suffices. The PDSCH configuration, which is not affected by the DCI, may be referred to as a multiplexing-agnostic (MA) PDSCH configuration.

The following are examples of MA PDSCH configurations.

A MA PDSCH configuration avoids mapping coded bits associated with the PDSCH to the REs that are potentially used for DCI multiplexing.

In case multiple RE allocations for a DCI exist (e.g., due to different CCE aggregation levels), then a MA PDSCH configuration may be based on avoiding the largest set of REs potentially used for DCI multiplexing.

A MA PDSCH configuration does not use all time domain OSs that are overlapping with OSs that are potentially used for DCI multiplexing.

A MA PDSCH configuration does not use all frequency domain RBs/SCs that are overlapping with frequency domain RBs/SCs that are potentially used for the DCI multiplexing.

Figure 25:
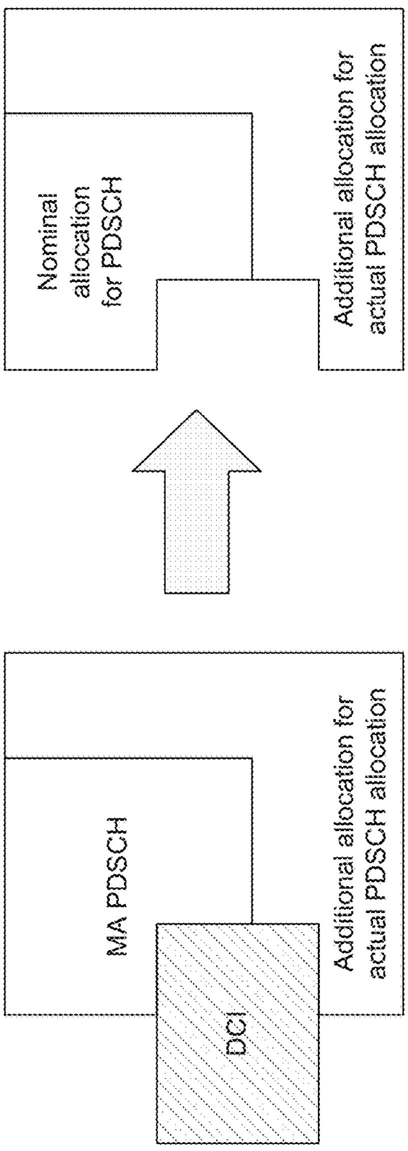
FIG. 25 depicts an example of an MA PDSCH allocation and a DCI allocation multiplexed on the PDSCH according to the subject matter disclosed herein.

FIG. 25 depicts an example of an MA PDSCH allocation and a DCI allocation multiplexed on the PDSCH according to the subject matter disclosed herein. FIG. 25 also depicts the actual PDSCH allocation after successfully decoding the multiplexed DCI. In FIG. 25, the resultant allocation for the PDSCH may cause some irregularity in the final resource allocation of the actual PDSCH that may be difficult for a UE to handle. Therefore, some restrictions on the DCI multiplexing, nominal and/or actual PDSCH configurations may be used to avoid such situations.

BD/CCE Limit Aspects of Piggybacked DCI

In Rel-15/16, the PDCCH monitoring complexity aspects are addressed by defining BD/CCE limits per slot or span. A UE is not expected to monitor more than the limits per slot/span. Each SS configuration defines a certain number of PDCCH candidates that translates to a certain number of BD/CCEs per slot. In the case that SS configurations result in a number of BD/CCEs exceeding the BD/CCE limit, otherwise known as SS overbooking, a SS dropping procedure may be defined to ensure the monitored BD/CCE is kept within the limit.

In the case of a DCI piggybacked in SPS PDSCH, how to take the PDCCH complexity into account may be further considered. Because there is no configured SS for the piggybacked PDCCH candidate, to consider the incurred complexity to the overbooking procedure, a virtual SS may be associated with the piggyback PDCCH. The piggybacked PDCCH may then be counted as 1 or y in which y is a number determined by UE capability. In general, the following are some example methods to address the PDCCH monitoring complexity of the piggybacked PDCCH.

A piggybacked PDCCH may be counted as one BD without any association to a SS. It may also be counted as X CCEs in which X depends on the amount of allocated resource for the PDCCH.

The PDCCH overbooking and dropping may be performed in a SS level granularity. That is, a UE may only drop an entire SS for a scheduled cell or fully monitor its candidates. With DCI piggybacking in PDSCH, because there is no explicit SS configuration, how the piggybacked PDCCH is taken into account for SS dropping may benefit from further clarification. In one embodiment, depending on the relative importance of the piggybacked PDCCH compared to that of PDCCHs transmitted in the CSS or USS, a piggybacked PDCCH may be decided to be monitored or dropped. A gNB may configure a UE with a two-state dropping behaviour in which in one state, envisioned as no-dropping, piggybacked PDCCHs may never be dropped. That is, they are mapped before CCS. In the other state, the PDCCHs are mapped after CSS, but before the USS. Another possibility is that they are mapped after all the USS.

A Piggybacked PDCCH may be considered to be configured in a "virtual" SS with one PDCCH Candidate of specific aggregation level. The aggregation level may take values outside {1,2,4,8,16}, depending on the amount of allocated resources for the PDCCH. A virtual SS may be configured with certain DCI formats. The number of BD/CCEs counted for the piggybacked PDCCH candidate may be 1 or a larger number depending on the configured number of DCI formats and their sizes. For example, if two DCI formats of different sizes are monitored, two BDs are counted. In this case, for the purpose of overbooking/dropping, the following options are possible.

The virtual SS may be mapped before any other SS, that is, a larger priority than CSS/USS. One may think of it as a CSS with highest priority for monitoring, lowest SS index.

The virtual SS may be mapped before any USS, that is, a larger priority than USS, but smaller priority than CSS.

An SS index and SS type may be explicitly configured for the piggybacked PDCCH SS and the behaviour follows Rel-15/16.

For counting CCEs corresponding to the piggybacked PDCCH, the number of resource element (REs) or resource blocks (RBs) along with the number of OFDM symbols, or the number of resource element groups (REGs) may be considered. Then the candidate may be counted as X CCEs in which $$h\ X = \left\lceil \frac{N_{REG}}{6} \right\rceil \text{ or } \left\lfloor \frac{N_{REG}}{6} \right\rfloor$$

and $N_{REG}$ is the number of REGs occupied by the piggybacked PDCCH. Alternatively, $$X = \left\lceil \frac{N_{REG}}{6 \times 12} \right\rceil \text{ or } \left\lfloor \frac{N_{RE}}{6 \times 12} \right\rfloor$$

in which $N_{RE}$ is the total number of RE allocated for the piggybacked PDCCH including the DMRS REs, if any.

Alternatively, a separate BD/CCE limit dedicated to the piggybacked PDCCH may be defined and applied per slot. The counts and limits are applied independently from the legacy SS-based BD/CCE limits and SS overbooking/dropping. The new limits may be fixed numbers in the specification as a function of SCS of the PDCSH cell. It may alternatively be defined as a UE capability in which a UE declares a capability on the number of piggybacked PDCCHs the UE may monitor per slot/span. If in a slot the number of piggybacked PDCCHs exceed the limit, a UE performs a dropping process and monitors only some of the piggybacked PDCCHs. The dropping behaviour may be determined based on the SS configuration index, for example, a PDCCH piggybacked on a PDSCH occasion corresponding to a smaller/larger SPS configuration index is prioritized, for monitoring, over a PDCCH piggybacked on a PDSCH corresponding to a larger/smaller SPS configuration index.

In legacy NR, when a UE is configured with a single cell operation or for intra-band CA and when the UE monitors the PDCCH in one or multiple CORESETs on the same set of OFDM symbols in which the CORESETs are configured with TCI states with qcl-Type set to "TypeD", the UE monitors PDCCH candidates in a specific CORESET and all the other CORESETs with the same value of qcl-Type. This specific CORESET is determined according to some rules. Specifically, it is the CORESET that associated with the lowest CSS index in the cell with the lowest index, if any; otherwise based on lowest USS index in the cell with the lowest index. Throughout the sequel, this CORESET may be referred to as the "reference CORESET". Therefore, with the presence of piggybacked DCI, it is not clear how it should be treated. One approach is to treat the piggybacked DCI and its PDSCH as if it is another PDCCH candidate. The following alternatives or any of their combination are proposed to handle this issue.

As one possibility, a piggybacked DCI may be treated as if it is contained within a virtual CORESET that has the same QCL assumption as the QCL assumption used for the reception of the PDSCH carrying it. To determine whether this virtual CORESET may be used as the reference CORESET, the virtual CORESET may be associated with a virtual SS, as proposed above. Depending on the index of the associated virtual SS and whether it counted as a USS or a CSS, the legacy rules may be applied to determine whether this virtual CORESET is the reference CORESET or whether it is among the set of CORESETs that have the same QCL assumption TypeD as of another reference CORESET.

For the purpose of determining overlapping among CORESETs, the virtual CORESET may span the same RBs within the PDSCH carrying the piggybacked DCI (which may span more than 3 OFDM symbols), or the virtual CORESET may only span the RBs used to carry the piggybacked DCI, not the whole PDSCH associated with it. Therefore, when the virtual CORESET partially or fully overlap with the PDCCH monitoring occasion in other regular CORESET, they are assumed to be overlapped.

If a virtual CORESET is not among the set of monitored CORESETs, a UE may skip the reception of the whole PDSCH including the piggybacked DCI. As another alternative, a UE may assume PDSCH carrying the piggybacked DCI is rate matched or punctured around the set of the monitored CORESETs.

The index of the virtual SS may be configured as described above or derived using certain rules. For example, the index of a virtual SS may be an offset from SPS configurations index and the offset value may be predefined, provided in the specification, or provided by higher-layer signaling.

Figure 26:
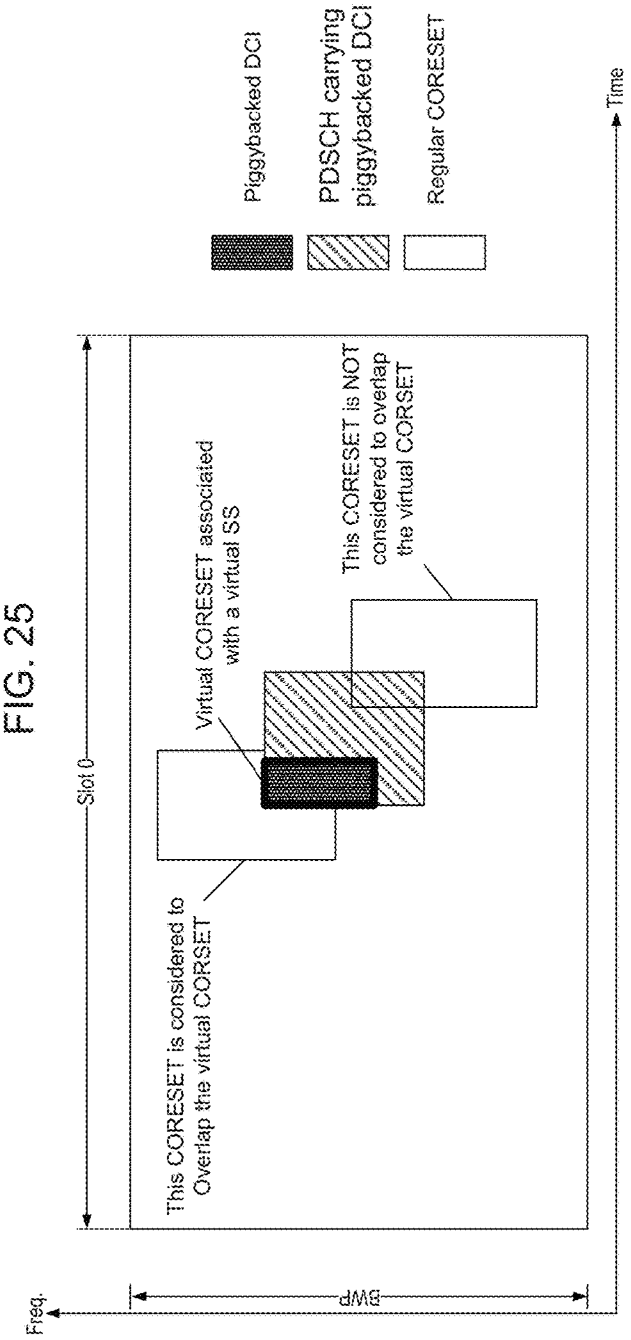
FIG. 26 depicts an example scenario in which the virtual CORESET may be defined to contain PRBs carrying the piggybacked DCI and may be associated with a virtual SS according to the subject matter disclosed herein.

This procedure is depicted in FIG. 26 in which the virtual CORESET may be defined to contain PRBs carrying the piggybacked DCI and may be associated with a virtual SS according to the subject matter disclosed herein. When the virtual CORESET overlaps with a regular CORESET, the described procedures may be applied to determine whether PDSCH carrying the piggybacked DCI is monitored or not.

If the virtual CORESET is defined to only contain the resources carrying the piggybacked DCI, not the whole PDSCH, it may happen that another CORESET overlaps with PDSCH, but not with the virtual CORESET as depicted in FIG. 26. Any of the following alternatives or their combination may be used to address this issue.

If PDSCH and its piggybacked DCI are not monitored, a UE may monitor this CORESET following the legacy rules.

If PDSCH and its piggybacked DCI are monitored and this CORESET have the same QCL TypeD assumption, a UE monitors this CORESET.

If PDSCH and its piggybacked DCI are monitored and this CORESET have different QCL TypeD assumption, a UE may skip monitoring PDCCH candidates in this CORESET. The reason is that if PDSCH and its piggybacked DCI are monitored, it means that there may be other set of CORESETs with the same QCL assumption as that of the virtual CORESET is already monitored. Therefore, the earlier determined QCL assumption TypeD may have a higher priority.

Alternatively, this CORESET may treated as if it overlaps with the virtual CORESET and its QCL assumption may be used to determine that set of CORESETs to be monitored based on the legacy rules. This is effective to the case in which the virtual CORESET contains all the resources spanned by PDSCH carrying the piggybacked DCI, not only the piggybacked DCI.

Alternatively, rather than defining a virtual CORESET, if the PDCCH monitoring occasions in a single or multiple CORESETs overlap either partially or fully with PDSCH carrying piggybacked DCI, the legacy rules are applied to determine the set of monitored CORESETs. If the selected set of CORESETs have the same QCL TypeD as the PDSCH carrying piggybacked DCI, then it is monitored. Otherwise, UE may skip monitoring the PDSCH and its piggybacked DCI. In this approach, the monitoring of regular PDCCH is prioritized over the monitoring of PDSCH carrying piggybacked DCI.

As another possibility, the monitoring of PDSCH carrying piggyback DCI may have relevant priority over the monitoring of regular PDCCH candidate in CSS or USS. For example, if the reference CORESET is determined based on USS and it has different a QCL TypeD from PDSCH carrying piggybacked DCI, a UE monitors the PDSCH carrying piggybacked DCI and any other PDCCH candidate in a set of CORESETs that has the same QCL TypeD as of PDSCH carrying piggybacked DCI.

In legacy NR, when the offset between DL DCI and the corresponding PDSCH is less than the threshold timeDurationForQCL, a UE determines QCL of this PDSCH occasion based on the lowest CORESET ID in the latest monitored slot with respect to PDSCH slot. If there is a conflict between the determined QCL assumption TypeD for PDSCH and the QCL TypeD for a CORESET that partially overlap with PDSCH in time domain, a UE is expected to prioritize the monitoring of PDCCH.

As one possibility, the offset between the piggybacked DCI and corresponding PDSCH carrying it may be assumed to be less than the threshold timeDurationForQCL. This assumption may be meaningful when the piggybacked DCI carries information related PDSCH carrying it. In this case, a UE may assume that the QCL assumption TypeD for the reception of PDSCH is determined following the legacy rules, i.e., based on the QCL assumption of the lowest CORESET Id in the latest monitored slot with respect to the PDSCH slot. If this PDSCH overlaps in at least one symbol with other CORESET(s) that has different QCL assumption TypeD, the PDCCH monitoring is prioritized. This procedure ignores the presence of the piggybacked DCI and treats it as a legacy PDSCH. In some situations, it may be beneficial to prioritize monitoring the piggybacked DCI and its PDSCH over PDCCH when overlapping occurs and they have different QCL typed assumptions. This is because piggybacked DCI carries control information that may be important for the reception PDSCH or even the future PDSCH occasions. Alternatively, some rules may be applied to determine whether PDSCH is dropped or not when it overlaps with other CORESET(s) that has different QCL assumption TypeD. Specifically, a PDSCH carrying piggybacked DCI may be treated in the same way as a PDCCH candidate overlapping with other COREST(s) that has different QCL assumption TypeD and proposed rules may be applied.

As another possibility, the offset between the piggybacked DCI and corresponding PDSCH carrying the piggybacked DCI may be assumed to be greater than the threshold timeDurationForQCL. This assumption may be meaningful when the piggybacked DCI carries information not related PDSCH carrying it, for example, changing the SPS configurations in the future. In this case, the QCL assumption for the reception of PDSCH carrying the piggybacked DCI may be determined based on the activation DCI of SPS. It may be beneficial to prioritize the reception of the piggybacked DCI when its PDSCH is overlapped with other CORESETs having different QCL TypeD assumption. That is because the piggybacked DCI may carry information to update the SPS configurations. Missing such information may create misalignment between a UE and a gNB. In some situations, it may be beneficial to prioritize monitoring PDCCH over a piggybacked DCI and its PDSCH when overlapping occurs and they have different QCL typed assumptions. This is to have a unified behaviour on how to treat PDSCH when it overlaps with a CORESET with different QCL typed assumption.

Alternatively, some rules may be applied to determine whether PDSCH is dropped or not when it overlaps with other CORESET(s) that has different QCL assumption TypeD. Specifically, PDSCH carrying piggybacked DCI may be treated in the same way as PDCCH candidate overlapping with other COREST(s) that has different QCL assumption TypeD and the rules above may be applied.

Also, regardless of whether the offset between a piggybacked DCI and a corresponding PDSCH is less or greater than the threshold timeDurationForQCL when overlap occurs between the piggybacked DCI and the corresponding PDSCH and a CORESET with different QCL assumption TypeD, to determine which one to monitor, some embodiments may define prioritization index for piggybacked DCI and its PDSCH. The prioritization index may be similar to legacy prioritization value indicated in the scheduling DCI or configured by RRC, but it may be different in general. The prioritization index may take values such 0 and 1 for low and high priority, respectively. If the piggybacked DCI and its PDSCH are indicated to have high priority, a UE may prioritize their monitoring over a PDCCH. For example, a high-priority indication may prioritize monitoring PDSCH over PDCCH transmitted in USS. If it is indicated as low, then the piggybacked DCI and its PDSCH are dropped when they overlap with PDCCH using different QCL assumption TypeD.

Additionally, the prioritization index may have more than two levels, such as low, medium and high, and they may be interpreted as follows. For low priority, if a piggybacked DCI and its PDSCH are indicated to have low priority, then they are dropped when they overlap with any CORESET with different QCL assumption TypeD. For medium priority, if a piggybacked DCI and its PDSCH are indicated to have medium priority, then they are dropped when they overlap with a CORESET associated with CSS that has a different QCL assumption TypeD. However, they are prioritized when they overlap with a CORESET associated with USS that has a different QCL assumption typed and PDCCH is dropped. For high priority, if a piggybacked DCI and its PDSCH are indicated to have high priority, then they are prioritized when they overlap with any CORESET with different QCL assumption TypeD.

Another issue is related to blind decoding (BD) counting for piggybacked DCI when repetition is configured/indicated for SPS PDSCH carrying a piggybacked DCI using procedures described herein or by any other procedures. This may be meaningful when piggybacked DCIs in the SPS PDSCH repetitions carry the same information. The following techniques or any of combinations thereof may be used.

In some embodiments, overall BD for all piggybacked DCIs in the repeated SPS PDSCHs may be counted as one BD, that is, each piggybacked DCI is counted as 1/number of repetitions of SPS PDSCH. This means that a UE may perform one decode attempt after combining the piggybacked DCIs across the SPS PDSCH repetitions. For the number of counted CCEs for each piggybacked DCI in the SPS PDSCH repetitions, it may be counted as described herein. This is because a UE may conduct separate channel estimation for each piggybacked DCI even if the piggybacked DCIs carry the same information in the repeated SPS PDSCH.

It may also be beneficial for a UE to attempt decoding the piggybacked DCI before the last repetitions. In this case, the overall BD for all piggybacked DCIs in the repeated SPS PDSCHs may be counted as $1+\alpha$ in which $0\leq\alpha\leq$number of SPS PDSCH repetitions and a may be indicated by the UE as part of its capability signalling. When $\alpha=0$, a UE may perform one BD attempt after combining piggybacked DCI repetitions. When $\alpha$=number of SPS PDSCH repetitions, a UE may perform one decoding attempt after each SPS repetitions and another one for combined piggybacked DCI across all the repetitions. For the number of counted CCEs for each piggybacked DCI in the SPS PDSCH repetitions, a BD may be counted as described herein. This is because a UE may conduct separate channel estimation for each piggybacked DCI even if the piggybacked DCIs carry the same information in the repeated SPS PDSCH.

Also, the overall BD for all piggybacked DCIs in the repeated SPS PDSCHs may be counted as $1+\alpha$ in which $0\leq\alpha\leq\beta$ and a may be indicated by a UE as part of its capability signalling. The variable $\beta$ may be greater than the number of SPS repetitions. This may be beneficial if a UE attempts to decode multiple combinations of the piggybacked DCI. For example, if SPS PDSCH is repeated three times, $\beta$=3C2 (combining any two repetitions)+3C1 (each repetition)=6. Note that one in $1+\alpha$ reflects the decoding attempt of the combined piggybacked DCI across all repetitions. The value of $\beta$ may be defined as a function of number of repetitions or be predefined, i.e., provided in the specification.

Also, for CCE counting for piggybacked DCI in PDSCH, as one possibility, in some embodiments CCE for piggybacked DCI may be counted as zero. This may be beneficial when piggybacked DCI uses the same modulation as PDSCH and share its DMRS. In this case, a UE may conduct channel estimation for decoding PDSCH that may be used for the decoding of piggybacked DCI as well. This may be beneficial to avoid using the PDCCH CCE budget when it is unnecessary.

The PDCCH monitoring complexity is closely related to the time unit. If the time unit is slot, then BD/CCE limit are sufficient to address the incurred complexity, as the time units are uniformly distributed over time. On the other hand, if the time units are spans, suitably defined in Rel-16 TS 38.213 in which the spans are time units within a slot with possibly different lengths, the time gap between consecutive spans play a role in the complexity. With a piggybacked PDCCH, the time gap between the MO of the piggybacked PDCCH and other MOs may be considered to reflect the PDCCH monitoring complexity. A UE may run a different processing engine to process the piggybacked PDCCH than regular PDCCH. In that case, it may be needed to provide sufficient amount of time gap between the "regular" MOs defined via the configured SSs and the MO of the piggybacked PDCCH such that regular PDCCH processing by a UE is not disrupted.

In one embodiment, the time gap between the start of the piggybacked MO and the start of a later regular MO may be at least $X_1$ symbols in which $X_1$ is either fixed or defined based on UE capability. In another embodiment, the time gap between the start of a regular MO which starts before the start of the piggybacked MO, and the start of the piggybacked MO is $X_2$ symbols in which $X_2$ is either fixed or defined by the UE capability. Alternatively, if the regular PDCCH processing and a piggybacked PDCCH share the same processing engine, the piggybacked MO and the regular MO may be configured to be on the same set of symbols, or at least having some overlapping symbols.

SPS Collision Handling

Figure 27:
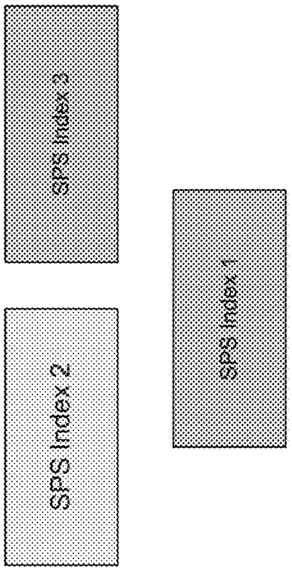
FIG. 27 depicts an example scenario in which a UE applies a pseudo-code and determines the one occasion to receive a SPS index 1 according to the subject matter disclosed herein.

In Rel-16 with multiple active SPS configurations per cell, to mitigate complexity due to reception of multiple occasion per slot, a procedure has been defined to determine the SPS occasions UE is expected to receive among the overlapping occasion in slot. The procedure is to ensure no two time-domains overlapping SPS occasions are received simultaneously by a UE, while prioritizing occasions with smaller SPS configuration indices over larger SPS configurations. It also ensures that the number of received occasions is below the capability of a UE on the number of PDSCHs per slot the UE may receive. Having a common understanding between a UE and a gNB on which occasions a UE receives is also important for applying correct HARQ-ACK payload size. With DCI piggybacked on PDSCH occasions, if DCI indicates no PDSCH reception in the occasion, it may be argued that the PDSCH occasion should be removed from the candidates that are input to the collision handling procedure (pseudo-code) in TS 38.214. In one method, a UE applies the pseudo-code in 214 and determines the SPS occasions it is expected to receive in the slot, irrespective of the piggybacked DCI indication. The UE then applies to the detection of the piggybacked DCIs to determine the SPS PDSCH reception status. For example, as depicted in FIG. 27, a UE applies the pseudo-code and determines the one occasion to receive a SPS index 1. A gNB may further indicate the reception status via the piggybacked DCI on that occasion. Piggybacked DCIs on occasions of SPS index 2 or 3 do not have an impact on the collision handling pseudo-code.

QCL Assumption of the Piggybacked PDCCH

As a piggybacked PDCCH is not explicitly defined in a SS associated with a CORESET, the TCI state assumption for the reception of the PDCCH may be specified. In one embodiment, a UE monitors a piggybacked PDCCH according to the same TCI state that the UE applies to the SPS PDSCH candidate. The TCI state of the SPS PDCSH candidate follows Rel-15/16 behaviour assuming the SPS PDSCH without the PDCCH are scheduled by the activation PDCCH and the time gap is determined from the end of the activation PDCCH to the start of the SPS PDSCH.

To provide a gNB with increased flexibility on the application of a downlink beam and, in general, applicable TCI states, in one embodiment the piggybacked DCI may include a TCI indication field that is similar to a legacy DCI. The indicated TCI is only applicable to future SPS occasions that do not have a piggybacked DCI and when the time gap between the end of the piggybacked PDCCH and the start of those PDSCHs without piggybacked PDCCH is larger than a threshold time gap.

Cross Carrier Indication of Piggybacked DCI

In Rel-15, cross carrier scheduling (CCS) is supported in which a cell, referred to as scheduling cell, transmits downlink control information (DCI) for a different cell, referred to as scheduled cell. In Rel-15 the numerology $\mu_1$ of scheduling cell may be equal to the numerology $\mu_2$ of the scheduled cell. CCS with different numerologies, that is, $\mu_1 \neq \mu_2$, is not supported in Rel-15. There is a strong use case for frequency range (FR1) scheduling FR2. This is because FR1 (i.e., sub6) tends to have better coverage and it is more reliable to deliver DL control information on FR1. Cross-carrier scheduling may be an effective way for delivering DL control information for FR2 on FR1. So CCS with different numerologies between scheduling cell and the scheduled cell may be of practical value at least for the case of lower SCS cell scheduling a higher SCS cell.

The functionality of piggybacking PDCCH in the SPS PDSCH occasions may also be achieved by transmitting the PDCCH on a different cell from the SPS PDSCH cell. Since the PDCCH is not transmitted in the resources of the PDSCHS occasion, the term "piggybacked" PDCCH may not be sufficiently precise in that case anymore. However, the same term may be used for simplicity, referring to the PDCCH as cross-carrier piggybacked (CCP) PDCCH or DCI. With a cross carrier piggybacked DCI, a gNB may configure a dedicated SS with PDCCH candidate to transmit DCI with similar functionality to the same cell piggybacked PDCCH. The association between the two cells may be based on the carrier indicator field in the DCI, the CIF value used for determining the PDCCH candidates or a separate RRC configuration. Once a UE detects a CCP PDCCH, the UE applies the conveyed control information to the associated SPS occasion on the SPS PDSCH cell. The following examples provide considered specific aspects of a cross carrier scheme.

CCP PDCCH to SPS PDSCH Occasion Association.

Unlike the same cell piggybacking in which the PDCCH is piggybacked in an SPS occasion, with cross carrier scheme the cell that transmits the PDCCH may not be configured with SPS PDSCH. Therefore, an association between the PDCCHs and the SPS PDSCH occasions may be used and may be defined according to any of the following methods a) through c).

Figure 28:
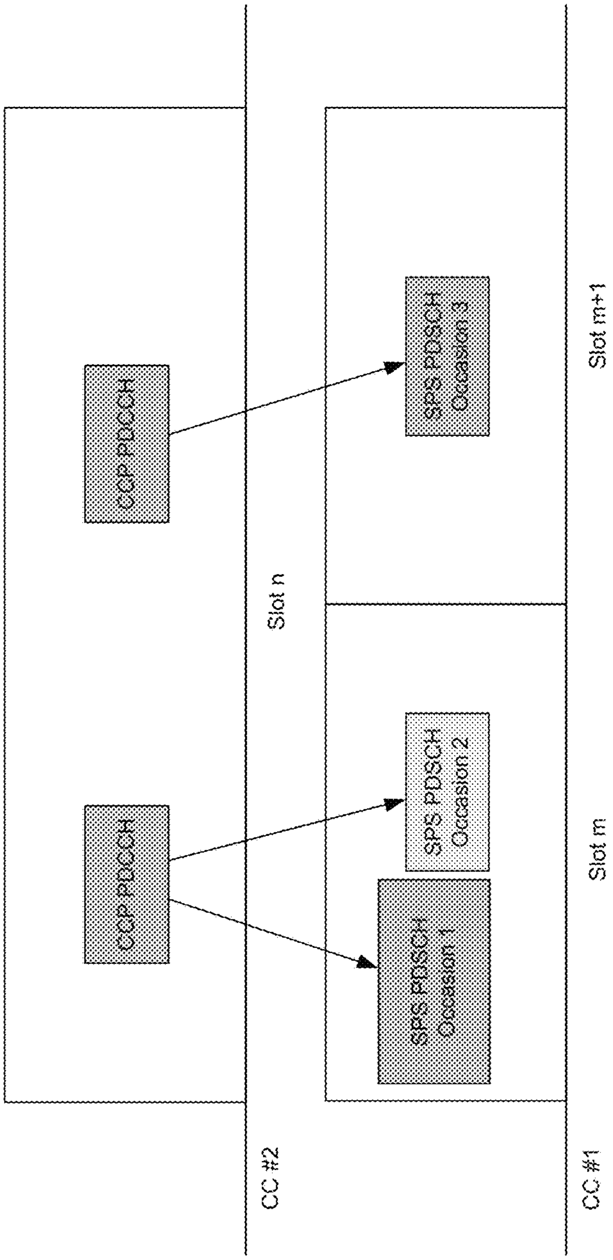
FIG. 28 depicts an example of an association of a CCP PDCCH to a SPS PDSCH occasions according to the subject matter disclosed herein.

Method a) (Overlapping PDSCH occasions): A CCP PDCCH may be associated to the SPS PDSCH occasions on the scheduled cell that overlap with the PDCCH in the time domain. FIG. 28 depicts an example of an association of a CCP PDCCH to a SPS PDSCH occasions according to the subject matter disclosed herein.

Method a) may be the closest method to a same cell DCI piggybacking. A possible issue with this method is that with different numerologies of the PDCCH and PDSCH cells, there may be an extra decoding latency for the PDCCH, which can in turn cause a significant increase in the PDSCH buffering. This issue may be mitigated by introducing a minimum time gap between the PDCCH and the associated PDSCHs.

Method b) (overlapping SPS slots): A CCP PDCCH in the scheduling cell may be associated with all SPS PDSCH occasions in the overlapping slots of the SPS PDSCH cell, when the SCS of the scheduling cell is smaller than or equal to the SCS of the SPS PDSCH cell.

With Method b) a gNB may transmit in the PDCCH in an overlapping slot such that it does not actually overlap with the PDSCH resource. A minimum time gap between the PDCCH and PDSCH may be ensured by a gNB to mitigate the buffering issue.

Method c) (reference time region): A reference time region (RTR) may be defined from the end of the ending symbol of the PDCCH. The time region may also be associated with a time duration, for example, a number of OFDM symbols. Any SPS PDSCH occasion that is contained in or overlaps with the RTR is associated with the PDCCH used to define the RTR.

Figure 29:
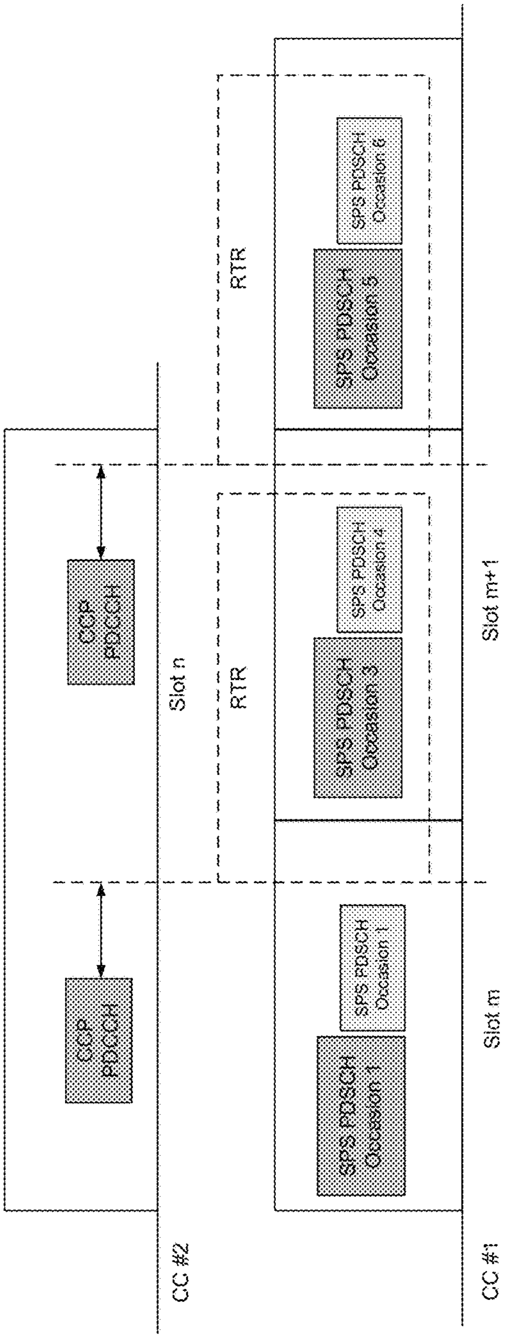
FIG. 29 depicts an example scenario of a method b) according to the subject matter disclosed herein.

FIG. 29 depicts an example scenario of method b) according to the subject matter disclosed herein. With any of the methods a) through c), if two CCP PDCCHs are associated with a SPS PDSCH occasion, to avoid ambiguity between a UE and a gNB as to which SPS setting is applicable, a default rule may be defined. In one embodiment, if a UE detects two CCP DCIs both associated with a given SPS occasion, the UE applies the DCI that starts or ends later (or earlier) in time, to reflect the latest decision by the gNB. If the CCP DCI also indicated the applicable SPS configuration index(es), then the rule may be only applied to the indicated SPS configuration indices. In another embodiment, the issue may be made an error case. That is it is not expected by a UE that a gNB transmits two CCP DCIs both associated with the same SPS occasion.

With any of the methods a) through c), it may also be possible that CCP DCI indicates the SPS configuration index(es). In this case, only the associated SPS occasion may be further filtered to only include occasions with the indicated SPS configuration index(es).

Enhancements Related to HARQ Procedure

CBG Configuration with SPS PDSCH

Up to Rel-17 3GPP 5G NR, SPS PDSCH transmission is TB-based and one HARQ-ACK (A/N) bit is transmitted for each SPS PDSCH occasion, or more precisely for all the occasions within the set of repetition across slots. With larger packet sizes in XR, CBG configuration for SPS PDSCH may be used to handle larger TB sizes. In one embodiment, a gNB may configure a UE with a maximum number of $$N_{CBG,max}^{(sps\#ii)}$$

CBGs for the SPS configuration index i. The actual SPS PDSCH of the configuration may or may not include $$N_{CBG,max}^{(sps\#i)}$$

CBGs depending on the instantaneous amount of resource allocation for the SPS occasion.

HARQ-ACK CB Aspects

Type-1 HARQ-ACK CB

With a Type-1 HARQ-ACK CB, for each serving cell c, a UE reserves one A/N bit for each subgroup of overlapping SLIVs in the slot. Each A/N bit is then replaced by $$N_{CBG,max}^{(c)}$$

in which $$N_{CBG,max}^{(c)}$$

is the maximum number of CBGs that may be received per TB in a PDSCH in the cell c and is RRC configured. With CBG configuration for SPS, HARQ-ACK CB may be modified. The following options a) and b) are possible.

Option a) A UE reserves max $$\left(N_{CBG,max}^{(c)}, N_{CBG,max}^{(SPS)}\right)$$

in which $$N_{CBG,max}^{(SPS)}$$

is the maximum of $$N_{CBG,max}^{(SPS\#i)}$$

over active SPS configuration indices i of the scheduled cell c. Only SPS configurations with at least one occasion having A/N is mapped to the PUCCH slot of the HARQ-ACK CB are considered for taking the maximum.

Although Option a) is simple and may have little specification efforts, it may unnecessarily reserve A/N bits for the Type-1 subgroups that do not contain any SPS PDSCH occasion. For such subgroups, reserving $$N_{CBG,max}^{(c)}$$

would suffice.

Option b) For each subgroup of a Type-1 CB in a slot, which does not include a SPS PDSCH occasion, a UE reserves $$N_{CBG,max}^{(c)}$$

A/N bits. For a subgroup that contains a SPS PDSCH occasion, max $$\left(N_{CBG,max}^{(c)}, N_{CBG,max}^{(SPS)}\right)$$

in which $$N_{CBG,max}^{(SPS)}$$

is the maximum CBG configured for the one SPS occasion in the subgroup, i.e., $$\text{i.e., } N_{CBG,max}^{(SPS\#j)}$$

in which j is the SPS configuration index of the SPS occasion in the subgroup.

Among a set of overlapping SPS PDSCHs in a slot, only SPS PDSCHs that are "survived" participate in the subgroup construction. Survived SPS PDSCHs includes SPS PDSCHs that are expected to be received by a UE. Survived SPS PDSCHs are determined according to a pseudo-code that prioritizes a lower SPS occasion with lower SPS configuration index over one with larger one, see Rel-16 TS 38.214 for more details.

If the serving cell c is configured with a value of $$N_{TB,c}^{DL}$$

equal to the maximum number of TBs (codewords) per PDSCH, $$N_{CBG,max}^{(c)}$$

is replaced by $$N_{TB,c}^{DL} \times N_{CBG,max}^{(c)}.$$

In case a group of SPS occasions form a bundle (refer to the definition of bundled SPS occasions above), then there may be no HARQ feedback bits provided for each of the SPS occasions in the bundle, but rather HARQ feedback may be provided to the bundle itself. In this case, the number of bits reserved by a UE for the bundle may be equal to $$N_{CBG,max}^{(SPS)},$$

which is the maximum CBG across all bundled SPS occasions. It may be equal to one value corresponding to one SPS configuration if all bundled occasions belong to the same SPS configuration. The location of the reserved bits may correspond to the first, last or another specified occasion in the set of bundled occasions.

Type-2 and e-Type-2 HARQ-ACK CB

SPS PDSCHs do not directly participate in Type-2 or enhanced Type-2 (eType-2) CB. Instead, the SPS A/N bits are appended to the dynamic portion of the payload, i.e., A/N bits of the DG PDSCHs. When a SPS configuration is configured with a CBG transmission, for each SPS occasion of the SPS configuration index i participating in the codebook, a UE reserves $$N_{CBG,max}^{(SPS\#i)}$$

A/N bits. The appending of the SPS A/N bits across the SPS configuration indices and serving cell follows Rel-16 behavior, see Rel-16 TS 38.213.

Type-3 HARQ-ACK CB

Type-3 HARQ-ACK CB was introduced in Rel-16 NR-U. The key idea is for a gNB to indicate to a UE to transmit all the A/N bits for all the DL HARQ process IDs (HPIDs) in one shot. Type-3 CB is based on the following behavior in Rel-15/16: For each HPID, a UE is not expected to send A/N of more than two TBs in one PUCCH.

| |
|---|
| "The UE is not expected to receive another PDSCH for a given HARQ process until after the end of the expected transmission of HARQ-ACK for that HARQ process". |

In summary with Type-3 CB in a PUCCH, a UE reports A/N for each serving cell c, each HPID h of the cell c, each TB $t\in\{0,1\}$ of the HPID and each CBG of the TB. Currently, for a given c, a given HPID h, and a given TB index t, a UE generates $$N_{CBG,max}^{(c)}$$

A/N bits. For SPS PDSCH, the one bit A/N is repeated as given by the following in TS 38.213.

| |
|---|
| "If a UE receives a SPS PDSCH, or a PDSCH that is scheduled by a DCI format 1_0 for a serving cell c and if maxCodeBlockGroupsPerTransportBlock is provided for serving cell c, and pdsch-HARQ-ACK-OneShotFeedbackCBG is provided, the UE repeats $N_{HARQ\text{-}ACK,\,c}^{CBG/TB,\,max}$ times the HARQ-ACK information for the transport block in the PDSCH." |

Part of Type-3 HARQ-ACK CB in Rel-16 TS 38.213

"while $c < N_{cells}^{DL}$
while $h < N_{HARQ,c}^{DL}$
if $NDI_{HARQ} = 0$
if $N_{HARQ\text{-}ACK,c}^{CBG/TB,max} > 0$
while $t < N_{TB,c}^{DL}$
while $g < N_{HARQ\text{-}ACK,c}^{CBG/TB,max}$
$\tilde{o}_j^{ACK}$ = HARQ-ACK information bit for CBG g of TB t for HARQ process number h of serving cell c, if any; else, $\tilde{o}_j^{ACK} = 0$
$j = j + 1$
$g = g + 1$
end while
$\tilde{o}_j^{ACK}$ = NDI value indicated in the DCI format corresponding to the HARQ-ACK information bit(s) for TB t for HARQ process number h on serving cell c, if any; else, $\tilde{o}_j^{ACK} = 0$
$g = 0$ -continued $j = j + 1$
$t = t + 1$
end while
else
while $t < N_{TB,c}^{DL}$
$\tilde{o}_j^{ACK}$ = HARQ-ACK information bit for TB t for HARQ process h of serving cell c, if any; else,
$\tilde{o}_j^{ACK} = 0$
$j = j + 1$
$\tilde{o}_j^{ACK}$ = NDI value indicated in the DCI format corresponding to the HARQ-ACK information bit(s) for TB t for HARQ process number h on serving cell c, if any; else, $\tilde{o}_j^{ACK} = 0$
$j = j + 1$
$t = t + 1$
end while
end if
t=0
.
.
.
end if
end while
end while
"

As presented in previous sections, in order for a gNB to be able to cope with packet size uncertainty, multiple TBs per SPS periodicity may be considered. Allowing multiple TBs per SPS periodicity may modify the Type-3 CB as well as some UE implementation complexity considerations.

In Rel-15 NR, "[the] UE is not expected to receive another PDSCH for a given HARQ process until after the end of the expected transmission of HARQ-ACK for that HARQ process". If multiple TBs may be transmitted within the same periodicity of SPS, depending on the SCS of PDSCH cell and PUCCH cell, the A/Ns of multiple TBs may be mapped to the same PUCCH. This is currently an error case according to the statement. Provided that a UE and a gNB have common understanding on details of multiple TBs in the same SPS period, e.g., the first two occasions correspond to TB1 and the second two occasions correspond to TB2 for a SPS configuration with 4 occasions in a period, Type-3 CB may be modified to function properly.

A UE may or may not declare a capability on the number of TBs per SPS periodicity, i.e., per HPID. A gNB may then configure a UE with a maximum number of TBs that are transmitted to the UE in a SPS period. Such a maximum number may be RRC configured for each SPS configurations or may be common across all configurations. From the maximum number(s) and the maximum number of TBs, a UE may receive for the DG PDSCH, and the UE may determine a final maximum number for the number of TB s per HPID and include those many TB s in the Type-3 CB. However, this method may be too complex and too redundant as the maximum number determination may be the summation of those numbers if the periodicity is too large and $K_1$ is small. A simpler method is for a gNB to RRC configure a UE with a single maximum number of L TBs per HPID for the cell c. L may be a function of HPID or c, but there is no clear reason as to why this dependency may be beneficial. In that case, L may be fixed across all HPIDs and/or cells. Accordingly, a Type-3 CB is simply modified by replacing $$N_{TB,c}^{DL}$$

with L in the following loop.

$$\text{while } t < N_{TB,c}^{DL}$$

...

With an increased number of TBs per SPS HPID, and an increased number of SPS configuration per cell, a natural question may be if there should be a limit on the total number of TBs across all the SPS HPID that are received before the HARQ-ACK PUCCH transmission. To maintain the complexity, it may be reasonable to introduce a second limit on the total number of TBs across all HPID that a UE may receive before transmitting the HARQ-ACK PUCCH of the corresponding PDSCHs. In particular, a UE reports a capability $N_1$ on the maximum number of TBs (or PDSCHs), the UE may be expected to receive for the same HPID before the expected transmission of the earliest A/N PUCCHs of the PDSCHs. A UE may also report a capability $N_{total}$ on the maximum number of TBs (or PDSCHs), then the UE may be expected to receive across all the HPIDs before the expected transmission of the earliest A/N PUCCHs of the PDSCHs.

CBG and HARQ ACK Spatial Bundling

When CBG is enabled for SPS PDSCH occasions, a question may arise as to how to handle CBG transmission and HARQ feedback bundling. In some embodiments, a simultaneous enabling of CBG and HARQ feedback may be prevented in the specification. In some embodiments, UE behavior may be defined that combines CBG based transmission and HARQ feedback bundling. Namely, a UE may produce one HARQ feedback bit for the entire set of bundled TB s in which the HARQ feedback bit may be the result of binary addition operation of the individual HARQ feedback bits for each involved CBG.

HARQ Process ID Determination

Various embodiments disclosed in this section may be extended to the case of CG-PUSCH, except for aspects related to DCI piggybacking.

In legacy NR SPS, a single TB may be expected to be transmitted in the SPS period and its HARQ process ID is calculated using the equation defined in Clause 5.3.1 in 38.321. Though multiple SPS PDSCH occasions are configured within the bundled set and a UE expects that only a single TB to be transmitted within the set, the HARQ process ID of this TB may be calculated based on location of first SPS PDSCH occasion in the bundled set.

As another possibility, the HARQ process ID may be calculated based on the location of the actual SPS PDSCH occasion that is used to carry the TB.

When multiple TBs may be transmitted within a bundled set, a DCI piggybacked on PDSCH may be multiplexed on some or all of PDSCHs transmitted on the configured SPS PDSCH occasion. Similar rules to those described herein may be applied to a multiplex DCI on PDSCH. The DCI piggybacked on PDSCH may carry, in addition to the aforementioned information, a HARQ process ID, RV, NDI, and so on. The presence of NDI does not only enable a gNB to retransmit the TBs that have been initially transmitted on SPS, but also retransmit the TBs having an initial transmission that have been dynamically transmitted.

Figure 30:
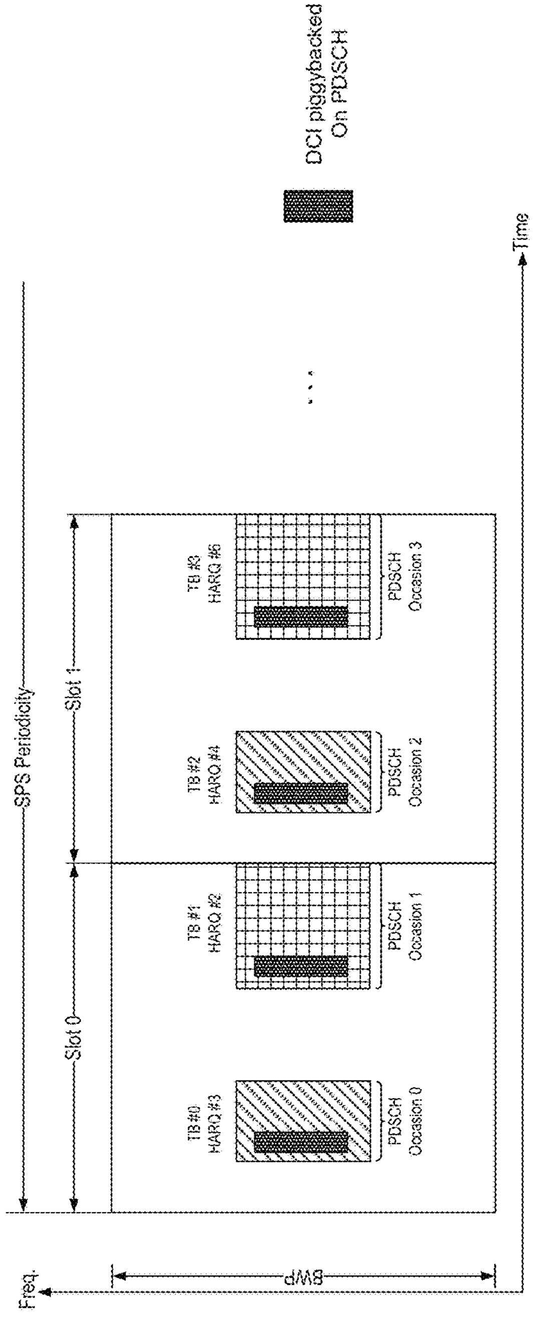
FIG. 30 depicts an example scenario in which four SPS PDSCH occasions are configured within a SPS period according to the subject matter disclosed herein.

FIG. 30 depicts an example scenario in which four SPS PDSCH occasions are configured within a SPS period according to the subject matter disclosed herein. In this case, a gNB transmits four TBs associated with four different HARQ processes without any order and based on the available HARQ processes.

If a UE is provided with a number of repetitions, e.g., by pdsch-AggregationFactor, the UE may assume that SPS PDSCHs carrying the same TB is repeated in the earliest n PDSCH occasions in which n is the indicated number of repetitions and the SPS PDSCH occasions may be configured as described in this disclosure or by any other technique.

A DCI piggybacked on PDSCH may be present on each repetition. This may be beneficial in case a UE fails in decoding the DCI piggybacked on earlier PDSCH. For example, a piggybacked DCI may indicate the RV of SPS PDSCH repetition carrying this DCI.

As another possibility, a piggybacked DCI may be carried only on the first repetition of SPS PDSCH. This may be beneficial to reduce overhead due to transmitting the piggybacked DCI on each PDSCH repetition. In this case, the RV of PDSCH repetitions may follow a certain rule. For example, they may cycle across a sequence of RVs and this sequence may be configured by higher-layer signalling.

Reduced HARQ Feedback

Figure 31:
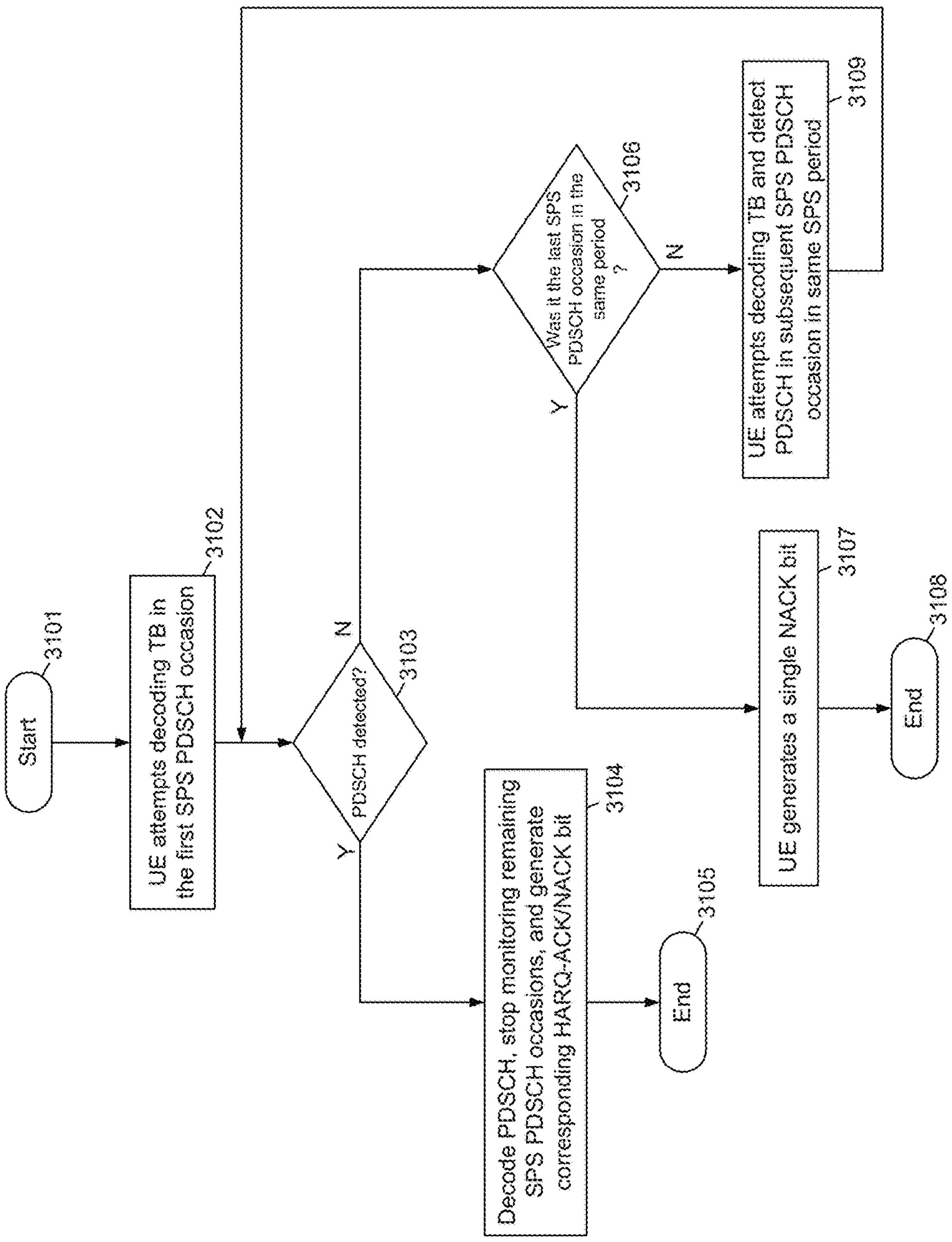
FIG. 31 depicts a flow chart of an example embodiment of a method for a UE when a single TB is expected within the bundled set according to the subject matter disclosed herein.

In the case of dynamic PDSCH decoding of SPS occasions when only one TB is expected within bundled set, a UE may be expected to generate a single HARQ ACK/NACK bit for the TB regardless the number of configured SPS PDSCH occasions within bundled set. FIG. 31 depicts a flow chart of an example embodiment of a method 3100 for a UE when a single TB is expected within the bundled set according to the subject matter disclosed herein.

The method begins as 3101. At 3102, a UE attempts to decode a single TB in the first SPS PDSCH occasion. At 3103, the UE determines whether the PDSCH has been detected. If so, flow continues to 3104 where the PDSCH is decoded and monitoring of the remaining PDSCH occasions ends. A corresponding HARQ-ACK/NACK bit is then generated and flow continues to 3104 where the method ends. If, at 3103, the PDSCH has not been detected, flow continues to 3106 where the UE determines whether the last PDSCH occasion was in the same period. If so, flow continues to 3107 where the UE generates a single NACK bit. Flow then continues to 3018 where the method ends. If, at 3106, the UE determines that the last PDSCH occasion was not in the same period, flow continues to 3109 where the UE attempts to decode a TB and detect a PDSCH in a subsequent SPS PDSCH occasion in the same period. Flow returns to 303.

Although a previous TB may have been transmitted in a single PDSCH occasion out of the configured ones within the SPS period/bundle, a gNB may transmit the same TB multiple times using the configured SPS PDSCH occasions within the SPS period/bundle. The transmissions may occupy consecutive or non-consecutive the configured SPS PDSCH occasions within the SPS period/bundle. Consecutive configured SPS PDSCH occasions may be used to reduce the latency and the latter may be used to obtain diversity. As one possibility, a gNB may indicate to a UE which approach is used (consecutive or non-consecutive) through higher-layer signaling, such as a RRC parameter. Alternatively, the activating DCI may include a 1-bit field to indicate which approach to be applied. The number of these transmissions may be configured by higher-layer signaling or indicated DCI activating the SPS.

The same RV may be used for all the transmissions of the same TB within the same SPS period/bundle that may be indicated by higher-layer signaling or in the DCI activating the SPS, e.g., RV0, or to be predefined (provided in the specification). Alternatively, different RVs may be used for different transmissions of the same TB within the same SPS period/bundle. For example, a RV sequence may be configured through higher-layer signaling, such as 0-2-3-1, and the used RV sequence may be cycled across all transmissions of the same TB within the same SPS period/bundle.

A UE may combine only the occasion in which the same TB is transmitted within the SPS period/bundle. To assist a UE in determining which occasion carries PDSCH, the UE may use some metrics. For example, the UE may use RSRP of DMRS for PDSCH. If it is greater than particular threshold, then the UE may assume that this occasion carries PDSCH. The threshold value may configured through higher-layer signaling. Other metrics may be used to make such a determination, such as RSSI. In this case, RSSI may be measured on the PRBs spanned by the SPS PDSCH occasion that the UE has to determine whether it carries PDSCH or not. Similarly, RSSI threshold may be configured through higher-layer signaling. Other metrics may be used as well and the corresponding threshold value may be configured through higher-layer signaling.

In other scenarios, a UE may combine all the configured occasions regardless they carry PDSCH or not. For example, if no threshold value is configured/provided, a UE may combine all the configured occasions in the attempt of decoding the transmitted PDSCH, if any.

When different TBs are transmitted, a UE may generate HARQ ACK/NACK bit for each SPS PDSCH occasion within SPS period/bundled set. A UE then generates separate HARQ ACK/NACK bits for each occasion within the bundled set. For the transmission of HARQ ACK/NACK bits, procedures similar to legacy SPS may be applied to determine the PUCCH resource, multiplexing with other UCI/PUSCH, and so on.

To reduce the overhead of HARQ ACK/NACK bits of SPS PDSCH occasions and avoid generating separate HARQ ACK/NACK bits for each occasion, some schemes may be applied to bundle the HARQ ACK/NACK bits. For example, only a single HARQ ACK/NACK bit may be transmitted for each SPS period or each SPS bundled set regardless the number of configured SPS PDSCH occasions within this period/set. As one possibility, if the corresponding bit for any SPS PDSCH occasion is NACK, then NACK is transmitted. Alternatively, the majority rule may be used to determine whether ACK or NACK should be transmitted based on decoding outcome for each SPS PDSCH occasion within the SPS period.

As another technique to reduce the number of HARQ ACK/NACK bits of SPS PDSCH occasions may be that a gNB may provide a UE with the number of TBs that the UE should expect to receive within SPS period or within an SPS bundled set through higher-layer signaling (e.g., RRC parameter noofTBs-per-SPSperiod or noofTBs-per-SPS-bundledSet). Note that the number of SPS PDSCH occasions per SPS period/bundled set should be greater than or equal to the number of TBs per SPS period/bundled set. In this case, a UE only generate separate HARQ ACK/NACK bits for each TB regardless the number of configured SPS PDSCH occasion within SPS period/bundled set. If a UE receives the configured number of TBs with SPS period (regardless of the decoding outcome either successful or failure), the UE may stop monitoring the remaining SPS PDSCH occasion with the SPS period/bundled set.

As another alternative, a UE may send one HARQ ACK/NACK either at the end of the bundled set, or at the end of receiving the last TB in a bundled set.

HARQ Process Enhancements Based on SPS Bundles

Regarding TB bundling, HARQ process may be modified to account for TB bundles. More specifically, a HARQ process may be assigned with a TB bundle instead of a single TB. Then, the rest of the HARQ transmission/retransmission mechanism may be applicable to the notion of TB bundle instead of a single TB.

HARQ Enhancements Related to Reception of Dynamic DCI

In some cases, it is beneficial to indicate to a gNB whether the DCI piggybacked on PDSCH is decoded successfully or not. More specifically, it may be beneficial to indicate to a gNB which one of the 3 or 4 events defined previously has occurred. In this case, a UE may report more than 1 bit of HARQ ACK/NACK feedback to a gNB corresponding to the PDSCH occasion with multiplexed DCI. The UE may be indicated, either dynamically or via a RRC, whether to indicate or not HARQ feedback to distinguish between the 3 or 4 events, or to only indicate feedback for the reception of the PDSCH.

The DCI piggybacked on PDSCH may also carry DAI field in each or some of PDSCHs transmitted in SPS PDSCH occasions within SPS period. In this case, the rules of generating Type-2 HARQ codebook may be applied, i.e., the same Type-2 HARQ codebook carries HARQ ACK/NACK bits dynamically scheduled PDSCHs and SPS PDSCH that has a DAI field within the piggybacked DCI.

When a UE may be expected to report HARQ ACK/NACK feedback to distinguish the 3 or 4 events mentioned previously, the DAI field may be used to count the total number of TBs and also the number of piggybacked DCIs. In this case, a UE may be indicated by a gNB that the DAI field is used to count for both number of TBs and piggybacked DCIs. Alternatively, the usage of the DAI field may be left for a gNB, with a UE being transparent as to how the DAI field is used for counting. As another alternative, if a UE is expected to report HARQ ACK/NACK feedback to distinguish the 3 or 4 events, then both the UE and a gNB implicitly assume/use the DAI field to indicate both number of TBs and piggybacked DCIs.

A DCI piggybacked on PDSCH may also carry priority index field to indicate the priority index of SPS PDSCH rather than configuring it statically in legacy SPS. This may beneficial to enable a gNB to dynamically indicate the priority of each SPS PDSCH.

A DCI piggybacked on PDSCH may also carry PUCCH resource indicator (PRI) or/and PDSCH-to-HARQ feedback time indicator (K1) fields to indicate which PUCCH resource that a UE should use to transmit HARQ ACK/NACK and in which slot. This may override the PUCCH resource configured in SPS configurations and the indicated K1 either in activation DCI or through RRC.

Dynamic Grant Enhancement

XR traffic may alternatively be delivered to a UE in DG PDSCHs. A DG solution has the following advantages. A gNB may avoid overprovisioning resources in SPS solution by dynamically indicating the proper amount of resources used for the XR packet. A DG PDSCH may be scheduled in any symbols in the slot by considering both PDSCH mapping type A and mapping type B and with proper SS or monitoring occasion (MO) configuration in slot. A single DCI may schedule multiple TBs in TDM manner according to Rel-17 feature to handle larger XR packet size. With multi-DCI M-TRP, a capable UE may receive two overlapping PDSCHs from the two TRPs. This may be extended to the single TRP scheme to introduce a UE capability to receive two overlapping PDSCHs that may in turn increase the data rate. The packet may be delivered in a shorter amount of time compared to TDM. Overlapping PDSCHs in different serving cells may be used to deliver the XR packet in a shorter amount of time compared to TDM. A gNB may configure frequent MOs in slot to allow for scheduling the XR packet with minimal delay. One important aspect of a DG technique should be reducing the DCI overhead. That is, an XR packet should be delivered with minimum number of DCIs.

Single DCI Scheduling Multiple TBs in TDMed PDSCHs on Same Cell

This feature already exists in Rel-17, and is an effective way to reduce the DCI overhead. To address time varying XR packet size, a gNB may configure a UE with a TDRA table in which a per-row quantity of total number of OFDM symbols varies across the rows to allow for small and large XR packet sizes. If an XR is small such that it fits a few TBs, a gNB may indicate a row with few SLIVs, while if the packet size is large, the gNB may indicate a row with larger number of SLIVs.

HARQ-ACK slot offset $K_1$: To allow for smaller latency, the HARQ-ACK time offset may be defined to from each individual PDSCH slots rather than the last PDSCHs slot.

Variable FDRA: For increased flexibility, a gNB may indicate variable amount of frequency domain resources via a single or multiple FDRA fields. With a single FDRA field, there may be an association between a DCI codepoint and multiple FDRA values.

Aggregation factor: To allow for increased reliability of the XR packet, each individual PDSCH (TB) among the multiple scheduled ones may be repeated in consecutive or non-consecutive slots. Consecutive slot repetition is based on Rel-15 behaviour. Non-consecutive slot repetition may be allowed to prevent dropping due to collision with invalid TDD symbols.

Single DCI Scheduling Multiple TBs in FDMed PDSCHs on Same Cell

Multiple PDSCHs scheduled by a DCI may be alternatively FDMed. Signalling of scheduled resources may be according to the following.

A single TDRA field may indicate one SLIV for all the PDSCHs. A single FDRA field may indicate a row of a "FDRA" table in which each row includes a set of FDRA values. Alternatively, multiple FDRA fields may indicate multiple FDRA fields.

HARQ-ACK CB Aspects

Allowing for multiple overlapping PDSCHs may have impacts on the Type-1 HARQ-ACK CB.

Type-1 HARQ_ACK CB with Overlapping PDSCHs.

Figure 32:
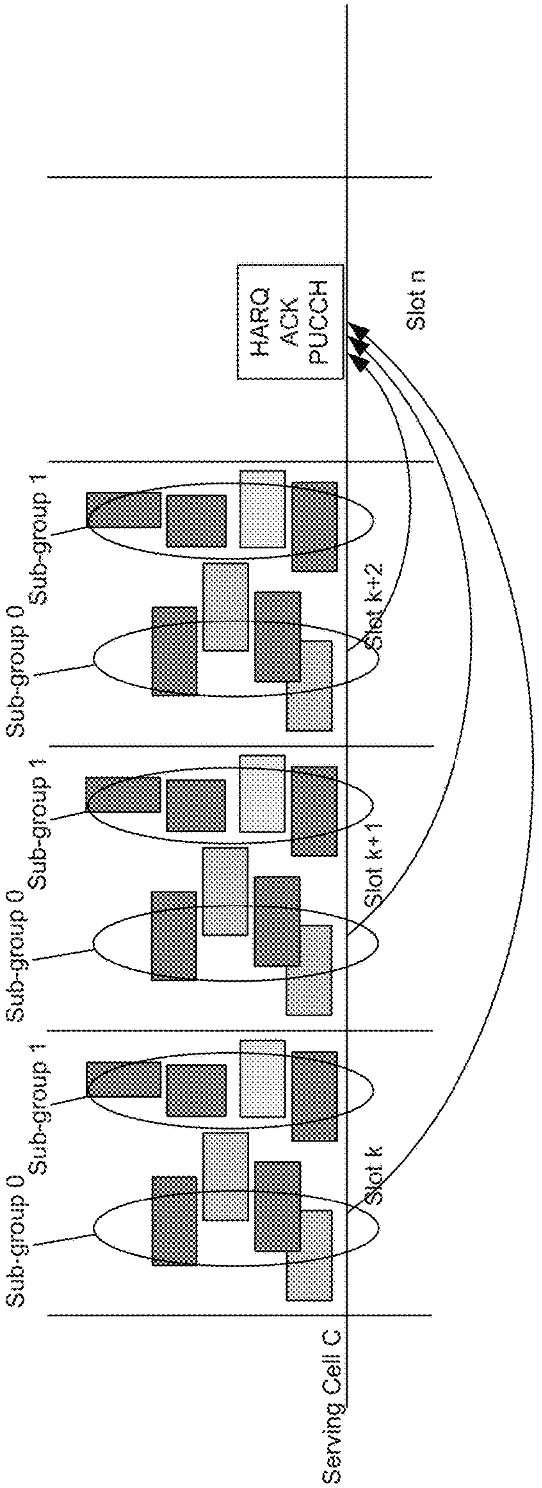
FIG. 32 depicts an example scenario of HARQ-ACK CB with overlapping PDSCHs according to the subject matter disclosed herein.

Type-1 HARQ-ACK CB is based on all possible SLIVs in a set of slots a UE may be scheduled with PDSCH such that the HARQ-ACK feedbacks are all transmitted in the same PUCCH slot. In each subgroup of SLIVs, suitably defined in TS 38.213, a UE reserves one A/N bit prior to CBG configuration considerations. FIG. 32 depicts an example scenario of HARQ-ACK CB with overlapping PDSCHs according to the subject matter disclosed herein.

With overlapping PDSCHs in slots, a subgroup may contain two scheduled PDSCHs. Therefore, the number of reserved bits may be increased. If a UE is configured to receive up to M overlapping PDSCHs, the UE may reserve M bits for each subgroup. Alternatively, a UE may be configured to only reserve T bits per subgroup in which T is RRC configured to the UE. Upon reception of PDSCHs in a subgroup, an ordering for a UE and a gNB may have the same understanding of the A/N bits. One way is to order the A/N bits according to start frequency RB index. That is, A/N of a PDSCH that has smaller/larger lowest RB index is placed before that of a PDSCH with larger/smaller lowest RB index. The A/Ns may also be ordered according to the PDSCH start time (if they are supported to be different through partial overlapping), HPID etc.

Single DCI Scheduling Multiple TBs PDSCHs on Different Cell

XR Packet to PDSCH Delay

To accommodate for a short delay from the time that XR traffic arrives at the MAC layer to the time at which PDSCH starts, the two following approaches may be used.

Frequent MOs in the slot: Since the earliest start time for PDSCH may be restricted by the scheduling PDCCH, a gNB may configure a UE with frequent MOs in the slot to reduce the PDSCH scheduling delay. For PDSCH mapping Type-B, the PDSCH cannot start before the first symbol of the scheduling PDCCH. For PDSCH mapping Type-A, PDSCH may start before the first symbol of the PDCCH, but the PDCCH may be contained within the first three symbol of the slot. In one embodiment, a XR UE is configured with frequent MOs in the slot to ensure low PDSCH scheduling latency. Frequent MOs may be configured based on UE capability on PDCCH monitoring, e.g., the UE reporting applicable pairs for (X, Y) for span-based PDCCH monitoring.

Negative PDCCH-to-PDSCH gap: Since not all UEs may be capable of monitoring frequent MOs in slot, a solution based on less frequent MOs in slot may be desired. In this case, it may be allowed for a UE to receive a PDSCH mapping Type-B in the middle of slot even if the scheduling PDCCH starts later than the start of the PDSCH. A UE may declare a capability on the maximum value of a gap $d \geq 0$ from the start symbol of PDSCH and the start symbol of the PDCCH. A gNB may schedule a UE with a PDSCH that starts at most d symbol before the start of the first symbol of the scheduling PDCCH. A UE may not be expected to be scheduled with a PDSCH that starts earlier than d symbols from the start symbol of the scheduling PDCCH. In a different embodiment, d is not a UE capability and is instead fixed values that may be a function of the SCS of the scheduling and scheduled cell.

Scheduling One or More Frames per DCI

A single DCI may schedule a set of different TBs in a set of PDSCHs. The TBs may belong to a XR packet, and therefore may have some relationship between them. For example, correctly receiving the XR packet may only be achieved by correct reception of certain TBs, and there may be some hierarchical structure of the TBs. This structure may be leveraged to provide enhancements to the scheduling procedure.

To further investigate this aspect, consider the fact that video frames include I-frames, P-frames and B-frames. I-frames are independent frames that include the most amount of information about a video frame, and can be independently decoded. P-frames contain only partial information about the video scene, which can complement earlier I-frames to predict parts of the video frame. They contain smaller amount of information about the I-frame, but may use the previous I-frames to be decoded. B-frames can use past and future I-frames and P-frames for decoding, and therefore contain the least amount of information.

Figure 33:
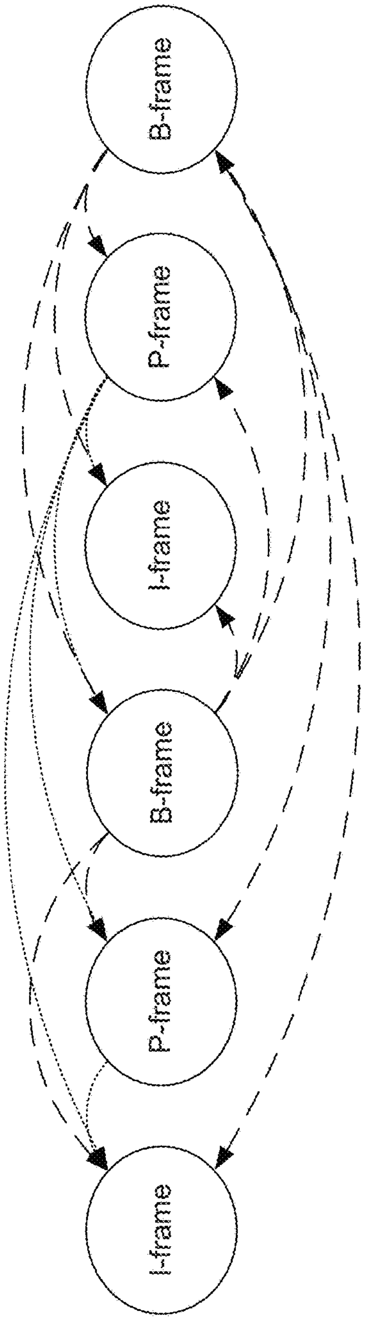
FIG. 33 depicts an example of the dependencies between the different video frames.

FIG. 33 depicts an example of the dependencies between the different video frames. With this structure of I-frames, some cases to consider include the following. A set of TB s may be dedicated to deliver one of the aforementioned frames. The structure of the TB s may be as follows. Decoding a frame may use a decoding of all the transmitted TBs; if any TB was not correctly received the frame decoding is declared as unsuccessful. Decoding a frame may use a decoding of a minimum amount of TBs, while an identity of the decoded TBs may not greatly matter. This may be useful, for example, for TBs that are formed from random sampled data from a frame. Decoding a frame may be that a certain set of important TBs to be all decoded correctly, while a minimum amount of the remaining TBs may be needed. This is a midway situation between the two previously mentioned cases. A set of TBs may be dedicated to deliver one frame, e.g., a P-frame, while successful decoding of the frame may be dependent on a successful decoding of previous frames. Therefore, successfully decoding the TBs in the set of TBs may not mean a successful decoding of the frame, unless earlier frames are successfully decoding as well.

A UE may be scheduled via a single DCI to receive a set of TBs that belong to one frame, or multiple sets of TBs in which each set belong to a frame. The frames may be any kinds of the three types of previously mentioned frames. A DCI indication, therefore, may clearly specify how the TBs are associated with respective frames.

Signaling

In the most flexible method, a DCI may explicitly specify the configuration of the PDSCH carrying each TB. Additionally, a DCI may associate each TB with an indication about which frame to a TB, e.g., a DCI field may indicate the number and/or type of the frame to which the TB belongs. This may use a new DCI format, which may be used to carry this information. Because the number of scheduled frames may be variable, an additional field may be used to indicate how many scheduled TBs are indicated in the DCI.

To reduce the signalling overhead, any one or more of the following limitations may be used. A set of TBs belonging to the same frame may have certain limitations on the configurations of their respective PDSCHs. For example, TBs belonging to the same frame may all be FDMed/TDMed/have the same resource allocations, but belonging to consecutive cells. In any of the configurations, the structure of the allocations for the PDSCHs carrying the TBs may be regulated. For example, if TBs within the same frame are all FDMed, there may be a certain frequency offset which is applied between consecutive PDSCHs. The offset may be RRC configured or dynamically indicated in the DCI.

A DCI may indicate the resource configurations of the first K PDSCHs (e.g., K can be 1), while information about the other PDSCHs may be carried either as MAC CE elements in the PDSCHs or in the payloads of the PDSCHs. In case the PDSCHs are FDMed, a UE may be indicated with the frequency range that carries the PDSCHs so that the UE may buffer the received signal until configuration information may be obtained from the first PDSCHs.

The set of TBs may have some implicit rules for determining association between TBs and frames. For example, a DCI may schedule a set of N TBs in certain resources (time/frequency/cells), and then an implicit rule may be used to tie each TB to the frames. In that scheme, an indication may include information about how many frames are scheduled, and the association may be performed based on that number. When determining association between TBs and frames, a certain ordering may be assumed for the TBs, e.g., frequency first then cells then time. In some cases, a typical structure of frames may be in a certain form, e.g., I-frame then P-frame then B-frame. In that case, the implicit structure may be to schedule $N_I$ TBs first for the I-frame, then $N_P$ TBs second for the P-frame, and lastly $N_B$ TBs for the B-frame. Then, the values of $N_I$, $N_P$ and $N_B$ may be indicated. In one case, the structure may be explicitly indicated via a scheduling DCI, or they may be RRC configured. In another alternative, the values may be fixed, while a DCI indication is used to indicate the (lack of) existence of the frame.

HARQ Feedback Enhancements

As described earlier, correct decoding of a frame may be dependent on the decoding of other frames, as well as the encoding of the frame itself into its constituent TBs.

Within One Frame

In one case, successful decoding of a frame may be achieved in the event of a successful decoding of all TB s of the frame. In that case, assuming N TB s per frame, a UE reports back N ACK/NACK bits per frame (i.e., per scheduling DCI).

Alternatively, successful decoding of a frame may be achieved in the event of a successful decoding of N out of M TBs of the frame. This may be suitable if the content of the TBs are in the form of random sampling of the frame. In this case, a UE may report N ACK/NACK bits per frame (i.e., per scheduling DCI). A gNB may not determine which TBs are successfully decoded, but rather how many of the TBs are successfully decoded.

Decoding of the frame may use both a decoding of, say $N_1$ TBs entirely, and $N_2$ out of M other TBs. In that case, a UE may report a total of $N_1+N_2$ ACK/NACK bits per frame (i.e., per scheduling DCI).

Across Frames

When a DCI schedules the TB s of multiple frames in which decoding of some frames depend on the successful decoding of other frames, reporting ACK/NACK feedback of some frames may be affected by this structure. To demonstrate, consider the scheduling of one I-frame and one P-frame by a DCI, while acknowledging that the concepts here extend to any scheduling of frames with such interdependencies in the decoding of the frames. An assumption may be that the number of TBs for the I-frame and P-frame are $N_I$ and $N_P$, respectively, and for simplicity an assumption may be that the successful decoding of either frames may use the decoding of all constituent TBs.

Reporting a P-frame ACK/NACK bits may depend on decoding of an I-frame. For example, if the I-frame is not decoded correctly, a UE may automatically report NACK feedback to the P-frame. In one option, a UE may send $N_P$ NACK bits corresponding to the P-frame TBs. This may help maintain alignment in the HARQ codebook construction. Alternatively, a UE may send only one NACK bit for an entire P-frame, given that other feedback bits for the I-frame indicate a decoding failure of the I-frame. This one-bit indication may be used to indicate whether the P-frame successfully passed the ECC decoding step and reduces overhead. In order to avoid misalignment in a feedback indication and association with respective TBs, the feedback bits of the I-frame may precede feedback bits of a P-frame such that when a gNB determines from the I-frame feedback that a frame decoding failed, it would implicitly determine that there is one feedback bit for the follow-up P-frame. If the I-frame is correctly decoded, then a UE reports feedback of the P-frame as per the cases above.

Figure 34:
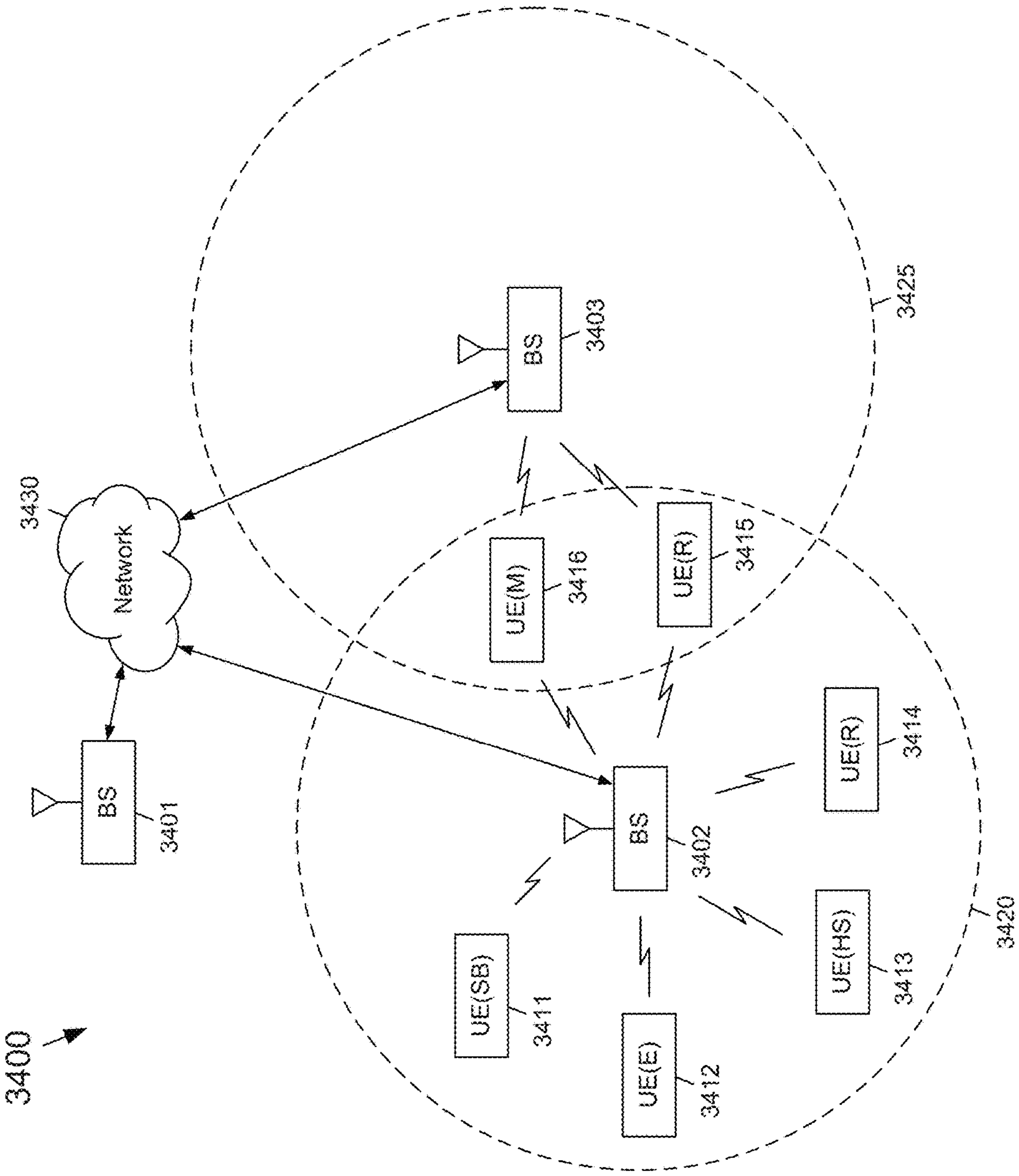
FIG. 34 depicts an example embodiment of a wireless communication network according to the subject matter disclosed herein.
Figure 35:
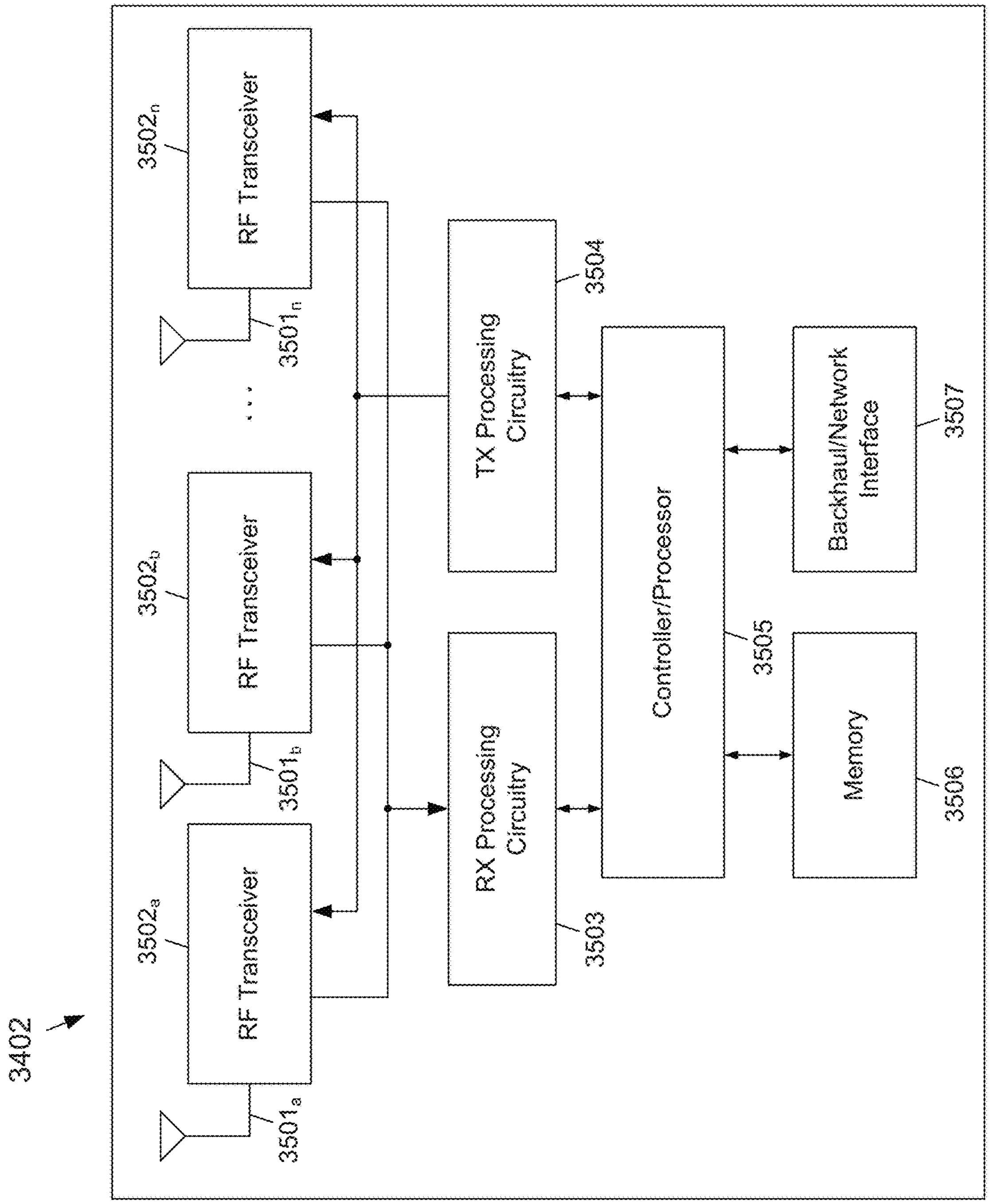
FIG. 35 depicts an example embodiment of a base station according to the subject matter disclosed herein.
Figure 36:
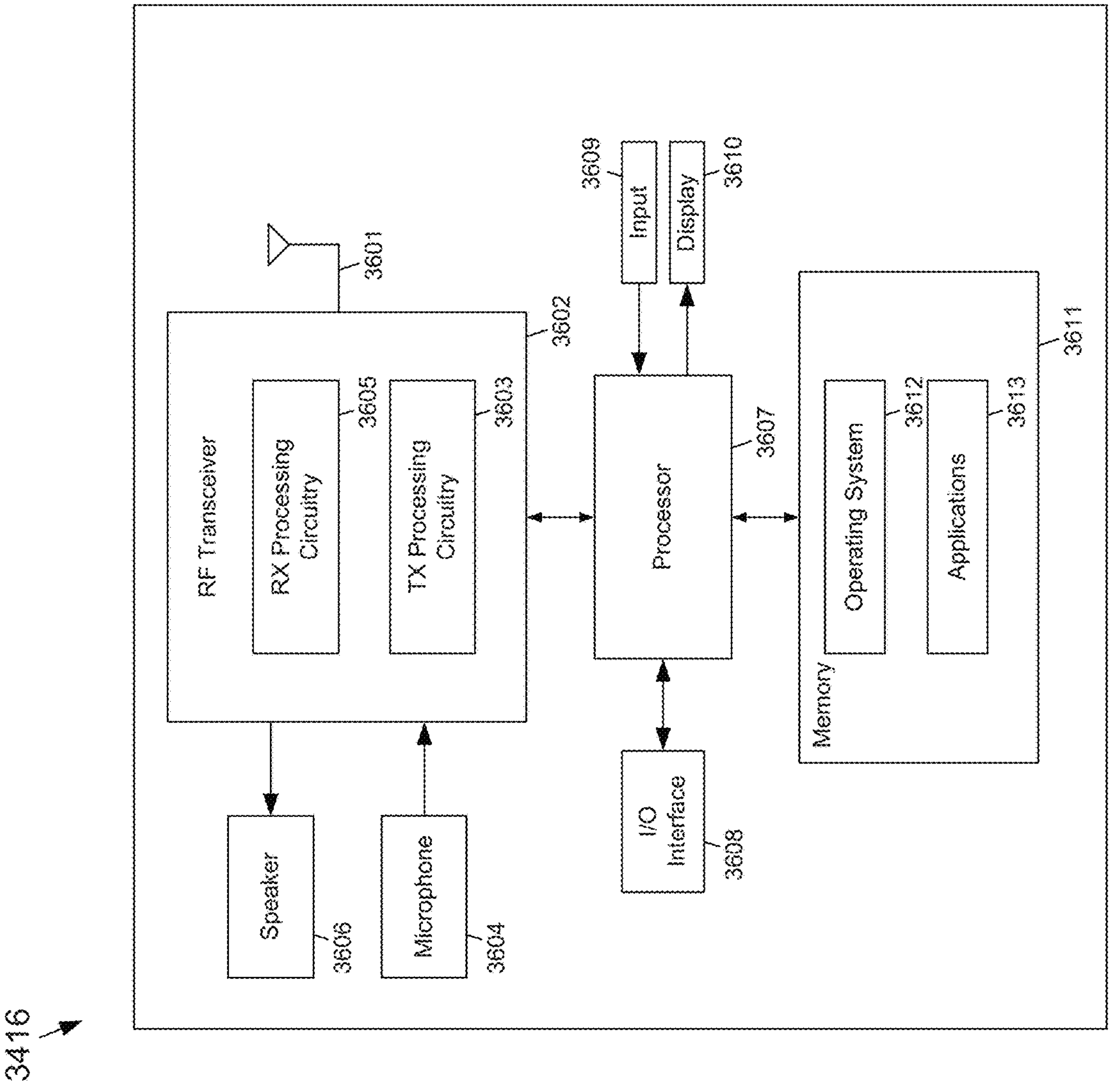
FIG. 36 depicts an example embodiment of a user equipment according to the subject matter disclosed herein.

FIGS. 34-36 depict various example embodiments implemented in wireless communications systems and may be configured to provide physical shared channel enhancements for XR traffic, as described herein. The descriptions of FIGS. 34-36 are not meant to imply physical or architectural limitations to the manner in which different embodiments may be implemented. Different embodiments of the subject matter disclosed herein may be implemented in any suitably-arranged communications system. Additionally, the different functional blocks depicted in FIGS. 35 and 36 may be implemented using one or more modules.

FIG. 34 depicts an example embodiment of a wireless communication network 3400 according to the subject matter disclosed herein. The example embodiment of the wireless network depicted in FIG. 34 is for illustration only. Other embodiments of the wireless network 3400 may be used without departing from the principles of the subject matter disclosed herein.

As depicted in FIG. 34, the wireless network 3400 includes a gNB 3401 (e.g., base station, BS), a gNB 3402, and a gNB 3403. The gNB 3401 may communicate with the gNB 3402 and the gNB 3403. The gNB 3401 may also communicate with at least one network 3430, such as the internet, a proprietary Internet Protocol (IP) network, or other data network.

The gNB 3402 may provide wireless broadband access to the network 3430 for a first plurality of UEs within a coverage area 3420 of the gNB 3402. The first plurality of UEs may include a UE 3411 that may be located in a small business (SB); a UE 3412 that may be located in an enterprise I; a UE 3413 that may be located in a WiFi hotspot (HS); a UE 3414 that may be located in a first residence I; a UE 3415 that may be located in a second residence I; and a UE 3416 that may be a mobile device (M), such as, but not limited to, a cell phone, a wireless laptop, a wireless PDA, or the like. The gNB 3403 may provide wireless broadband access to the network 3430 for a second plurality of UEs within a coverage area 3425 of the gNB 3403. The second plurality of UEs may include the UE 3415 and the UE 3416. In some embodiments, one or more of the gNBs 3401-3403 may communicate with each other and with the UEs 3411-3416 using 5G/NR, LTE, LTE-A, WiMAX, WiFi, and/or other wireless communication techniques.

Depending on the network type, the term "base station" or "BS" may refer to any component (or collection of components) configured to provide wireless access to a network, such as a transmit point (TP), a transmit-receive point (TRP), an enhanced base station (eNodeB or eNB), a 5G/NR base station (gNB), a microcell, a femtocell, a WiFi access point (AP), or other wirelessly enabled devices. Base stations may provide wireless access in accordance with one or more wireless communication protocols, e.g., 5G/NR 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably herein to refer to network infrastructure components that provide wireless access to remote terminals. Also, depending on the network type, the term "user equipment" or "UE" may refer to any component such as "mobile station," "subscriber station," "remote terminal," "wireless terminal," "receive point," or "user device." For the sake of convenience, the terms "user equipment" and "UE" may be used herein to refer to remote wireless equipment that wirelessly accesses a BS, whether the UE is a mobile device (such as, but not limited to, a mobile telephone or smartphone) or is normally considered a stationary device (such as, but not limited to, a desktop computer or vending machine).

Dotted lines depict approximate extents of the coverage areas 3420 and 3425, which are depicted as approximately circular for the purposes of illustration and explanation only. It should be clearly understood that the coverage areas associated with gNBs, such as the coverage areas 3420 and 3425, may have other shapes, including irregular shapes, depending upon the configuration of the gNBs and variations in the radio environment associated with natural and man-made obstructions.

As described in more detail below, one or more of the UEs 3411-3416 may include circuitry, programming, or a combination thereof, for efficient control signaling designed for improved resource utilization. In certain embodiments, and one or more of the gNBs 3401-3403 may include circuitry, programming, or a combination thereof, for efficient control signaling designed for improved resource utilization.

Although FIG. 34 depicts one example of a wireless network, various changes may be made to FIG. 34. For example, the wireless network 3400 may include any number of gNBs and any number of UEs in any suitable arrangement. Also, the gNB 3401 may communicate directly with any number of UEs and provide those UEs with wireless broadband access to the network 3430. Similarly, each gNB 3402-3403 may communicate directly with the network 3430 and provide UEs with direct wireless broadband access to the network 3430. Further, the gNBs 3401, 3402, and/or 3403 may provide access to other or additional external networks, such as, but not limited to, external telephone networks or other types of data networks.

FIG. 35 depicts an example embodiment of the gNB 3402 according to the subject matter disclosed herein. The embodiment of the gNB 3402 depicted in FIG. 35 is for illustration only, and the gNBs 3401 and 3403 of FIG. 34 may have the same or a similar configuration. However, gNBs come in a wide variety of configurations, and it should be understood that FIG. 35 does not limit the scope of the subject matter disclosed herein to any particular implementation of a gNB.

As depicted in FIG. 35, the gNB 3402 may include multiple antennas 3501*a*-3501*n*, multiple radio frequency (RF) transceivers 3502*a*-3502*n*, receive (RX) processing circuitry 3503, and transmit (TX) processing circuitry 3504. The gNB 3502 may also include a controller/processor 3505, a memory 3506, and/or a backhaul or network interface 3507.

The RF transceivers 3502*a*-3502*n* may receive incoming RF signals from the antennas 3501*a*-3501*n*. The received RF signals may be signals transmitted by UEs in the network 3400. The RF transceivers 3502*a*-3502*n* may down-convert the incoming RF signals to generate IF or baseband signals. The IF or baseband signals may be sent to the RX processing circuitry 3503, which generates processed baseband signals by filtering, decoding, and/or digitizing the baseband or IF signals. The RX processing circuitry 3503 may transmit the processed baseband signals to the controller/processor 3505 for further processing.

The TX processing circuitry 3504 may receive analog or digital data (such as, but not limited to, voice data, web data, e-mail, or interactive video game data) from the controller/processor 3505. The TX processing circuitry 3504 may encode, multiplex, and/or digitize the outgoing baseband data to generate processed baseband or IF signals. The RF transceivers 3502*a*-3502*n* may receive the outgoing processed baseband or IF signals from the TX processing circuitry 3504 and may up-convert the baseband or IF signals to RF signals that are transmitted via the antennas 3501*a*-3501*n*.

The controller/processor 3505 may include one or more processors or other processing devices that may control the overall operation of the gNB 3402. For example, the controller/processor 3505 may control the reception of forward channel signals and the transmission of reverse channel signals by the RF transceivers 3502*a*-3502*n*, the RX processing circuitry 3503, and the TX processing circuitry 3504 in accordance with well-known principles. The controller/processor 3505 may support additional functions as well, such as more advanced wireless communication functions. For instance, the controller/processor 3505 may support beamforming or directional-routing operations in which outgoing/incoming signals from/to multiple antennas 3501*a*-3501*n* may be weighted differently to effectively steer the outgoing signals in a desired direction. Any of a wide variety of other functions may be supported in the gNB 3402 by the controller/processor 3505.

The controller/processor 3505 may also be capable of executing programs and other processes resident in the memory 3506, such as an operating system (OS). The controller/processor 3505 may move data into or out of the memory 3506, which may be coupled to the controller/processor 3505, as required by an executing process. Part of the memory 3506 may include a random-access memory (RAM), and another part of the memory 3506 may include a flash memory or other read-only memory (ROM).

The controller/processor 3505 may also be coupled to the backhaul or network interface 3507. The backhaul or network interface 3507 may allow the gNB 3402 to communicate with other devices or systems over a backhaul connection or over a network. The interface 3507 may support communications over any suitable wired or wireless connection(s). For example, when the gNB 3402 is implemented as part of a cellular communication system (such as a gNB supporting 5G/NR, LTE, or LTE-A), the interface 3507 may allow the gNB 3402 to communicate with other gNBs over a wired or wireless backhaul connection. When the gNB 3402 is implemented as an access point, the interface 3507 may allow the gNB 3402 to communicate over a wired or wireless local area network or over a wired or wireless connection to a larger network (such as the internet). The interface 3507 may include any suitable structure supporting communications over a wired or wireless connection, such as an Ethernet or an RF transceiver.

Although FIG. 35 depicts one example of gNB 3502, various changes may be made to FIG. 35. For example, the gNB 3402 may include any number of each component shown in FIG. 35. As a particular example, an access point may include a number of interfaces 3507, and the controller/processor 3505 may support routing functions to route data between different network addresses. As another particular example, while shown as including a single instance of TX processing circuitry 3504 and a single instance of RX processing circuitry 3503, the gNB 3402 may include multiple instances of each (such as one per RF transceiver). Also, various components in FIG. 35 may be combined, further subdivided, or omitted and additional components may be added according to particular needs.

FIG. 36 depicts an example embodiment of UE 3416 according to the subject matter disclosed herein. The embodiment of the UE 3416 depicted in FIG. 36 is for illustration only, and the UEs 3211-3415 of FIG. 34 could have the same or similar configuration. UEs, however, may come in a wide variety of configurations, and FIG. 36 does not limit a UE to be any particular implementation of a UE.

As depicted in FIG. 36, the UE 3416 may include an antenna 3601, an RF transceiver 3602, TX processing circuitry 3603, a microphone 3604, and RX processing circuitry 3605. The UE 3416 may also include a speaker 3660, a processor 3607, an input/output (I/O) interface (IF) 3608, a touchscreen 3609 (or other input device), a display 3610, and a memory 3611. The memory 3611 may include an OS 3612 and one or more applications 3613.

The RF transceiver 3610 may receive an incoming RF signal, from the antenna 3605 that has been transmitted by a gNB of the network 3400. The RF transceiver 3610 may down-convert the incoming RF signal to generate an intermediate frequency (IF) or baseband signal. The IF or baseband signal may be sent to the RX processing circuitry 3625, which generates a processed baseband signal by filtering, decoding, and/or digitizing the baseband or IF signal. The RX processing circuitry 3625 may transmit the processed baseband signal to the speaker 3630 (such as for voice data) or to the processor 3640 for further processing (such as for web browsing data).

The TX processing circuitry 3603 may receive analog or digital voice data from the microphone 3604 or other outgoing baseband data (such as web data, e-mail, or interactive video game data) from the processor 3607. The TX processing circuitry 3603 may encode, multiplex, and/or digitize the outgoing baseband data to generate a processed baseband or IF signal. The RF transceiver 3602 may receive the outgoing processed baseband or IF signal from the TX processing circuitry 3603 and up-convert the baseband or IF signal to an RF signal that is transmitted via the antenna 3601.

The processor 3607 may include one or more processors or other processing devices and may execute the OS 3612 stored in the memory 3611 in order to control the overall operation of the UE 1616. For example, the processor 3607 may control the reception of forward channel signals and the transmission of reverse channel signals by the RF transceiver 3602, the TX processing circuitry 3603, and the RX processing circuitry 3605 in accordance with well-known principles. In some embodiments, the processor 3607 may at least one microprocessor or microcontroller.

The processor 3670 may also be capable of executing other processes and programs resident in the memory 3611, such as processes for beam management. The processor 3607 may move data into or out of the memory 3611 as required by an executing process. In some embodiments, the processor 3607 may be configured to execute the applications 3613 based on the OS 3661 or in response to signals received from gNBs or from an operator. The processor 3607 may also be coupled to the I/O interface 3608, which may provide the UE 3416 with the ability to connect to other devices, such as, but not limited to, laptop computers and handheld computers. The I/O interface 3608 is the communication path between these accessories and the processor 3607.

The processor 3607 may also be coupled to the touchscreen 3609 and the display 3610. An operator of the UE 3416 may use the touchscreen 3609 to enter data into the UE 3416. The display 3610 may be a liquid crystal display, light emitting diode display, or other display capable of rendering text and/or at least limited graphics, such as from web sites.

The memory 3611 may be coupled to the processor 3607. Part of the memory 3611 may include RAM and another part of the memory 3611 may include a Flash memory or other ROM.

Although FIG. 36 depicts one example embodiment of the UE 3416, various changes may be made to FIG. 36. For example, various components in FIG. 36 may be combined, further subdivided, or omitted and additional components may be added according to particular needs. As a particular example, the processor 3640 may be divided into multiple processors, such as one or more central processing units (CPUs) and one or more graphics processing units (GPUs). Also, while FIG. 36 depicts the UE 3416 configured as a mobile telephone or smartphone, UEs may be configured to operate as other types of mobile or stationary devices.

To meet the demand for wireless data traffic that has increased since deployment of 4G communication systems, efforts have been made to develop an improved 5G/NR or pre-5G/NR communication system. Therefore, the 5G/NR or pre-5G/NR communication system may be also referred to as a "beyond 4G network" or a "post LTE system." The 5G/NR communication system may be considered to be implemented in higher frequency (mmWave) bands, e.g., 28 GHz or 60 GHz bands or, in general, above 6 GHz bands, to accomplish higher data rates or in lower frequency bands, such as below 6 GHz, to enable robust coverage and mobility support. To decrease propagation loss of the radio waves and increase the transmission distance, the beam-forming, massive multiple-input multiple-output (MIMO), full dimensional MIMO (FD-MIMO), array antenna, an analog beam forming, large scale antenna techniques as used in 5G/NR communication systems. Additionally, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system may include a downlink (DL) that refers to transmissions from a base station or one or more transmission points to UEs and an uplink (UL) that refers to transmissions from UEs to a base station or to one or more reception points.

A unit for DL signaling or for UL signaling on a cell may be referred to as a slot and may include one or more symbols. A symbol may also serve as an additional time unit. A frequency (or bandwidth (BW)) unit may be referred to as a resource block (RB). One RB may include a number of sub-carriers (SCs). For example, a slot may have duration of 0.5 milliseconds or 1 millisecond, include 14 symbols, and an RB may include 12 SCs with inter-SC spacing of 30 kHz or 15 kHz, respectively. A unit of one RB in frequency and one symbol in time may be referred to as physical RB (PRB).

DL signals may include data signals conveying information content, control signals conveying DL control information (DCI), and reference signals (RS) that may also be known as pilot signals. A gNB transmits data information or DCI through respective physical DL shared channels (PDSCHs) or physical DL control channels (PDCCHs). A PDSCH or a PDCCH may be transmitted over a variable number of slot symbols including one slot symbol. For brevity, a DCI format scheduling a PDSCH reception by a UE may be referred to as a DL DCI format and a DCI format scheduling a PUSCH transmission from a UE is referred to as an UL DCI format.

A gNB may transmit one or more of multiple types of RS including channel state information RS (CSI-RS) and demodulation RS (DM-RS). A CSI-RS may be primarily intended for UEs to perform measurements and provide channel state information (CSI) to a gNB. For channel measurement, non-zero power CSI-RS (NZP CSI-RS) resources may be used. For interference measurement reports (IMRs), CSI interference measurement (CSI-IM) resources may be used. A CSI process may include NZP CSI-RS and CSI-IM resources.

A UE may determine CSI-RS transmission parameters through DL control signaling or higher-layer signaling, such as radio resource control (RRC) signaling, from a gNB. Transmission instances of a CSI-RS may be indicated by DL control signaling or be configured by higher layer signaling. A DM-RS may be typically transmitted only within a BW of a respective PDCCH or PDSCH and a UE may use the DM-RS to demodulate data or control information.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may include many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method for receiving traffic in a wireless network, the method comprising:

receiving, by a wireless device in the wireless network, a Semi-Persistent Scheduling (SPS) configuration for one or more occasions in a Physical Downlink Shared Channel (PDSCH) of the wireless network for traffic for the wireless device, the SPS configuration indicating a target periodicity of the traffic that is not aligned with one or more slot or symbol boundaries;

determining, by the wireless device, for an SPS occasion, a point in time corresponding to the target periodicity;

selecting, by the wireless device, an actual slot carrying the SPS occasion based on the point in time;

determining, by the wireless device, time-domain resources of the SPS occasion within the selected actual slot, including a starting symbol of the SPS occasion; and receiving, by the wireless device, the traffic in the SPS occasion.

2. The method of claim 1, further comprising receiving by the wireless device, an another SPS configuration, wherein the another SPS configuration comprises one or more occasions in at least one time slot in a SPS period.

3. The method of claim 2, wherein the another SPS configuration comprises a plurality of different configuration states, the method further comprising receiving, by the wireless device, a Downlink Control Information (DCI) message that indicates to the wireless device which SPS configuration state of the plurality of different configuration states to use to receive the traffic.

4. The method of claim 3, wherein the wireless device receives the DCI message a predetermined period of time prior to receiving the traffic that is within a delay limit of the traffic.

5. The method of claim 2, wherein the another SPS configuration comprises a configuration for each slot of a plurality of slots of a SPS period, the method further comprising receiving, by the wireless device, a Downlink Control Information (DCI) message that indicates one or more occasions in at least one slot for the wireless device to receive traffic.

6. The method of claim 5, wherein the wireless device receives the DCI message a predetermined period of time prior to receiving the traffic that is within a delay limit of the traffic.

7. The method of claim 5, wherein the DCI message comprises a field of bits in which a position of a bit in the field of bits corresponds to a slot of the plurality of slots of the SPS period, and wherein a predetermined value of a bit in the field of bits indicates whether the wireless device is to use the one or more occasions in the slot corresponding to the position of the bit in the field of bits.

8. The method of claim 2, wherein the another SPS configuration comprises a configuration for at least one slot of a plurality of slots of a SPS period, and wherein at least one Downlink Control Information (DCI) message for the wireless device is multiplexed with the SPS configuration.

9. The method of claim 1, wherein the traffic comprises one or more packets of traffic in which each packet comprises a same packet size, or a packet size that is different from another packet.

10. A method for receiving traffic in a wireless network, the method comprising:

receiving, by a wireless device in the wireless network, a Semi-Persistent Scheduling (SPS) configuration for one or more occasions in at least one slot of a plurality of slots having an SPS period in a Physical Downlink Shared Channel (PDSCH) of the wireless network for traffic for the wireless device;

receiving, by the wireless device, the traffic in the one or more occasions; and generating, by the wireless device, a feedback message indicating a type of success of decoding a packet of the traffic based on the wireless device decoding the packet of the traffic in the at least one slot;

wherein generating, by the wireless device, the feedback message further comprises:

reserving, by the wireless device, a first predetermined number of bits for each subgroup in a slot that does not include an SPS occasion; and reserving, by the wireless device, a second predetermined number of bits for each subgroup that contains an SPS occasion.

11. The method of claim 10, wherein generating, by the wireless device, the feedback message further comprises:

reserving, by the wireless device, for each serving cell one bit for each subgroup over overlapping Start and Length Indicators for a time-domain allocation for a PDSCH; and receiving, by the wireless device, a maximum number of Code Block Groups (CBGs) that may be received per Transport Block (TB) in a PDSCH in each serving cell.

12. The method of claim 10, wherein generating, by the wireless device, the feedback message further comprises:

reserving, by the wireless device, a first predetermined number of bits for each SPS occasion of an SPS configuration index participating in a codebook.

13. The method of claim 10, wherein generating, by the wireless device, the feedback message further comprises:

mapping, by the wireless device, a feedback message into a Physical Uplink Control Channel (PUCCH) for each Transport Block that is received by the wireless device in a same periodicity of the SPS configuration; and transmitting, by the wireless device, each feedback message in the PUCCH.

14. The method of claim 10, wherein generating, by the wireless device, the feedback message further comprises:

determining, by the wireless device, a feedback message identification for a single Transport Block received in an SPS PDSCH occasion based on a location of a first SPS PDSCH occasion in a bundled set of SPS PDSCH occasions.

15. The method of claim 10, wherein generating, by the wireless device, the feedback message further comprises:

determining, by the wireless device, a feedback message identification based on at least one Downlink Control Information (DCI) message for the wireless device that is multiplexed with the SPS configuration.

* * * * *